US012078746B2

(12) United States Patent
Kishigami

(10) Patent No.: US 12,078,746 B2
(45) Date of Patent: Sep. 3, 2024

(54) RADAR APPARATUS

(71) Applicant: Panasonic Automotive Systems Co., Ltd., Kanagawa (JP)

(72) Inventor: Takaaki Kishigami, Tokyo (JP)

(73) Assignee: Panasonic Automotive Systems Co., Ltd., Kanagawa (JP)

( * ) Notice: Subject to any disclaimer, the term of this patent is extended or adjusted under 35 U.S.C. 154(b) by 330 days.

(21) Appl. No.: 17/500,808

(22) Filed: Oct. 13, 2021

(65) Prior Publication Data

US 2022/0120849 A1   Apr. 21, 2022

(30) Foreign Application Priority Data

Oct. 15, 2020  (JP) .................................. 2020-174017

(51) Int. Cl.
G01S 7/03      (2006.01)
G01S 13/42     (2006.01)
(Continued)

(52) U.S. Cl.
CPC .............. *G01S 7/032* (2013.01); *G01S 13/42* (2013.01); *H01Q 21/065* (2013.01);
(Continued)

(58) Field of Classification Search
CPC ........ G01S 7/032; G01S 13/42; G01S 13/325; G01S 13/343; G01S 13/44; G01S 13/449;
(Continued)

(56) References Cited

U.S. PATENT DOCUMENTS 6,762,711 B1 * 7/2004 Doerfler .............. G01S 13/4409
342/149
2017/0082730 A1 * 3/2017 Kishigami ........... H01Q 21/061
(Continued)

FOREIGN PATENT DOCUMENTS

JP   2015-061980 A    4/2015
JP   2019-512081 A    5/2019
(Continued)

OTHER PUBLICATIONS

Cadzow, "Direction-of-Arrival Estimation Using Signal Subspace Modeling," IEEE Transactions on Aerospace and Electronic Systems, 28(1), Jan. 1992, pp. 64-79 (16 total pages).
(Continued)

*Primary Examiner* — Timothy A Brainard
*Assistant Examiner* — Ismaaeel A. Siddiquee
(74) *Attorney, Agent, or Firm* — Seed IP Law Group LLP

(57) ABSTRACT

Reception antennas include first antennas at positions different in a first direction, second antennas at positions different in a second direction perpendicular to the first direction, and a third antenna different from the first or second antenna. The first and second antennas include one overlapping antenna. The third antenna is arranged at a position different in the second direction from a position of the first antennas. The third antenna is arranged at a position a prescribed spacing apart in the first direction from a position of the second antennas. At least one spacing of the first antennas is the prescribed spacing. Transmission antennas include fourth antennas arranged in the first direction and fifth antennas arranged in the second direction. The fourth antennas and the fifth antennas include one overlapping antenna. A spacing of the fourth antennas is wider in the first direction than an aperture length of the first antennas.

17 Claims, 29 Drawing Sheets

(51) Int. Cl.
*H01Q 21/06* (2006.01)
*H01Q 21/28* (2006.01)
*G01S 7/285* (2006.01)
*G01S 13/06* (2006.01)
*G01S 13/32* (2006.01)
*G01S 13/34* (2006.01)
*G01S 13/44* (2006.01)
*G01S 13/58* (2006.01)
*G01S 13/931* (2020.01)

(52) U.S. Cl.
CPC .............. *H01Q 21/28* (2013.01); *G01S 7/285* (2013.01); *G01S 13/06* (2013.01); *G01S 13/325* (2013.01); *G01S 13/343* (2013.01); *G01S 13/44* (2013.01); *G01S 13/449* (2013.01); *G01S 13/584* (2013.01); *G01S 13/931* (2013.01)

(58) Field of Classification Search
CPC ...... G01S 13/584; G01S 13/931; G01S 7/285; G01S 13/06; H01Q 21/065; H01Q 21/28
See application file for complete search history.

(56) References Cited

U.S. PATENT DOCUMENTS

| | | | |
|---|---|---|---|
| 2019/0011532 A1 | 1/2019 | Loesch et al. | |
| 2019/0115670 A1* | 4/2019 | Kishigami | ......... H01Q 21/0025 |
| 2019/0379137 A1* | 12/2019 | Ohguchi | ................. G01S 7/352 |
| 2020/0003884 A1 | 1/2020 | Arkind et al. | |
| 2022/0163623 A1 | 5/2022 | Kishigami et al. | |

FOREIGN PATENT DOCUMENTS

| | | |
|---|---|---|
| JP | 2020153871 A | 9/2020 |
| WO | 2018/142396 A1 | 9/2018 |

OTHER PUBLICATIONS

Kronauge et al., "Fast two-dimensional CFAR procedure." IEEE Transactions on Aerospace and Electronic Systems 49(3), Jul. 2013, pp. 1817-1823.

Kazuo Shirakawa et al., "3D-Scan Millimeter-Wave Radar for Automotive Application", Fujitsu Ten Technical report 30(1), Dec. 2012, pp. 3-7.

Li et al., "MIMO Radar with Colocated Antennas," IEEE Signal Processing Magazine, vol. 24, Issue: 5, 2007, pp. 106-114. (9 pages).

English Translation of Notice of Reasons for Refusal, dated Feb. 27, 2024, for Japanese Patent Application No. 2020-174017, 6 pages.

* cited by examiner

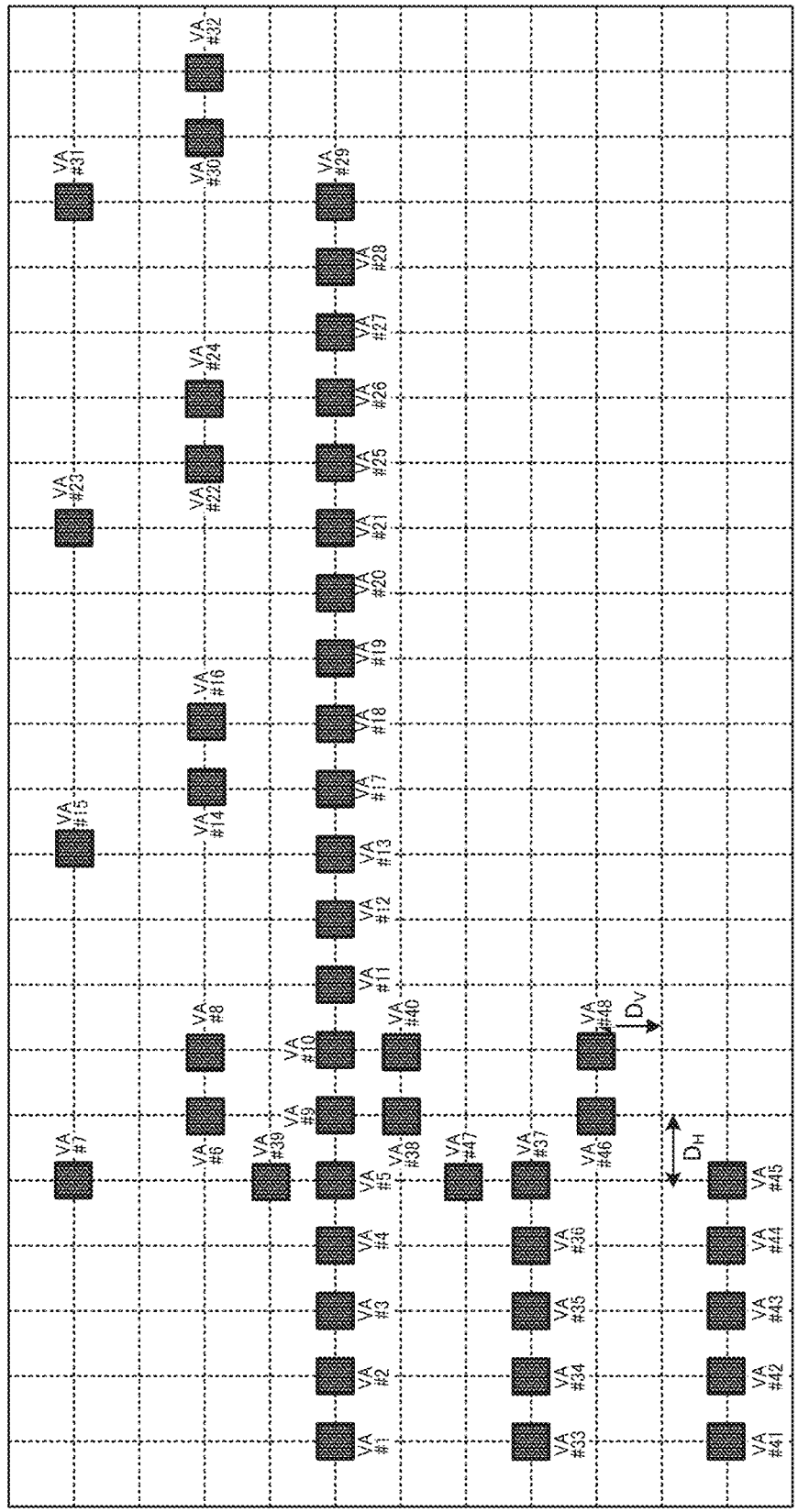

RADAR APPARATUS

TECHNICAL FIELD

The present disclosure relates to a radar apparatus.

BACKGROUND ART

In recent years, a study of radar apparatuses using a short-wavelength radar transmission signal including a microwave or a millimeter wave that provides high resolution has been carried out. To improve safety outdoors, development of radar apparatuses that detect small objects, such as pedestrians, in addition to vehicles in a wide range of angles (for example, referred to as wide-angle radar apparatuses) is desired.

One of the configurations of radar apparatuses with a wide-angle detection range is to, for example, use a method of receiving a reflected wave from a target with an array antenna made up of a plurality of antennas (or referred to as antenna elements) and estimating a direction in which a reflected wave comes (or referred to as angle of arrival) in accordance with reception phase differences for interelement spacings (antenna spacings) (angle of arrival estimation method, direction of arrival (DOA) estimation).

An example of the angle of arrival estimation method is a Fourier method (FFT (fast Fourier transform) method), or a Capon method, or MUSIC (multiple signal classification) and ESPRIT (estimation of signal parameters via rotational invariance techniques) as a method that provides high resolution.

A configuration that includes a plurality of antennas (array antenna) is provided in not only a radar receiver but also a radar transmitter and that performs beam scanning through signal processing using transmission and reception array antennas (which may be called MIMO (multiple input multiple output) radar) is proposed as a radar apparatus (see, for example, NPL 1).

CITATION LIST

Patent Literature

PTL 1
WO 2018/142396

Non Patent Literature

NPL 1
J. Li, and P. Stoica, "MIMO Radar with Colocated Antennas", Signal Processing Magazine, IEEE Vol. 24, Issue: 5, pp. 106-114, 2007
NPL 2
Kazuo SHIRAKAWA et al., 3D-Scan Millimeter-Wave Radar for Automotive Application, Fujitsu Ten technical report, Vol. 30, No. 1, 2012.
NPL 3
M. Kronauge, H. Rohling, "Fast two-dimensional CFAR procedure", IEEE Trans. Aerosp. Electron. Syst., 2013, 49, (3), pp. 1817-1823
NPL 4
Direction-of-arrival estimation using signal subspace modeling Cadzow, J. A.; Aerospace and Electronic Systems, IEEE Transactions on Volume: 28, Issue: 1 Publication Year: 1992, Page(s): 64-79

SUMMARY OF INVENTION

However, as concerns about a method of improving angle measurement performance in a radar apparatus (for example, MIMO radar), there is room for study.

Non-limiting embodiments of the present disclosure facilitate providing a radar apparatus that improves angle measurement performance.

A radar apparatus according to one example of the present disclosure includes: transmission circuitry, which, in operation, transmits a transmission signal by using a plurality of transmission antennas; and reception circuitry, which, in operation, receives a reflected wave signal that is the transmission signal reflected from an object by using a plurality of reception antennas, in which either one of the plurality of transmission antennas or the plurality of reception antennas includes a plurality of first antennas arranged at different positions in a first direction, a plurality of second antennas arranged at different positions in a second direction perpendicular to the first direction, and a third antenna different from the first antenna or the second antenna, the first antennas and the second antennas include one overlapping antenna, the third antenna is arranged at a position different in the second direction from a position at which the plurality of first antennas is arranged and is arranged at a position that is a prescribed spacing apart in the first direction from a position at which the plurality of second antennas is arranged, at least one spacing of the plurality of first antennas is the prescribed spacing, the other one of the plurality of transmission antennas or the plurality of reception antennas includes a plurality of fourth antennas arranged in the first direction, and a plurality of fifth antennas arranged in the second direction, the plurality of fourth antennas and the plurality of fifth antennas include one overlapping antenna, and a spacing of the plurality fourth antennas in the first direction is wider than an aperture length of the plurality of first antennas.

Additional benefits and advantages of one example of the present disclosure will become apparent from the specification and drawings. The benefits and/or advantages may be individually obtained by the various embodiments and features of the specification and drawings, which need not all be provided in order to obtain one or more of such benefits and/or advantages.

According to one general example of the present disclosure, the angle measurement performance of the radar apparatus is improved.

Additional benefits and advantages of one general example of the present disclosure will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF DRAWINGS

FIG. 29 is a diagram showing an example of an arrangement of a virtual reception array according to Arrangement Example 2.

DESCRIPTION OF EMBODIMENTS

A MIMO radar, for example, transmits a radar transmission signal (or referred to as a radar transmission wave) multiplexed by using time division, frequency division, or code division from a plurality of transmission antennas (or referred to as a transmission array antenna). The MIMO radar, for example, receives a signal reflected from a surrounding object (for example, referred to as a radar reflected wave) by using a plurality of reception antennas (or referred to as a reception array antenna) and receives the multiplexed transmission signal by separating the transmission signal from the received signals. With such processing, the MIMO radar is able to extract a propagation path response indicated by the product of the number of transmission antennas and the number of reception antennas and performs array signal processing by using these received signals as a virtual reception array.

With the MIMO radar, a virtual reception array antenna (hereinafter, referred to as a virtual reception array) equal in number up to the product of the number of transmission antenna elements and the number of reception antenna elements can be configured by devising the arrangement of the antenna elements in the transmission and reception array antennas. With this configuration, the effect of increasing the effective aperture length of the array antenna with a small number of elements is obtained, so angular resolution is improved.

MIMO radars are applicable to not only one-dimensional scanning (angle measurement) in a vertical direction or a horizontal direction but also two-dimensional beam scanning in the vertical direction and the horizontal direction (see, for example, NPL 2).

Figure 1:
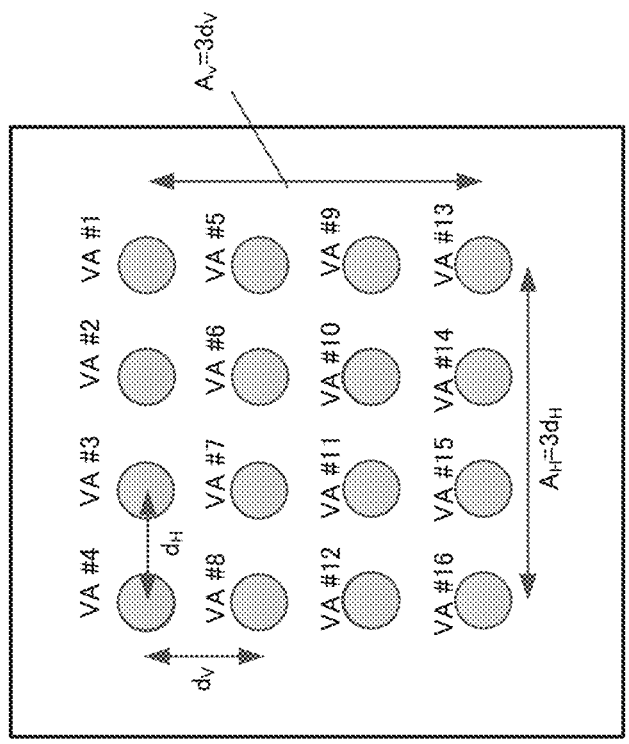
FIG. 1 illustrates a diagram showing an example of an arrangement of transmission and reception antennas and a diagram showing an example of an arrangement of a virtual reception array.
Figure 1:
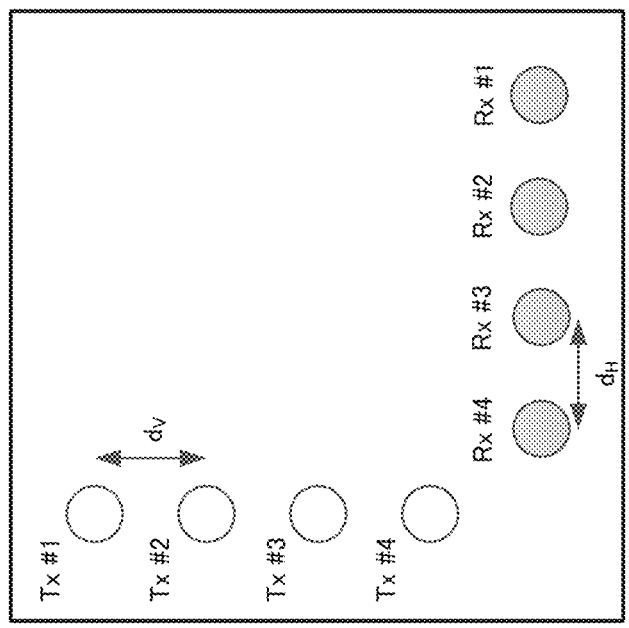

For example, (a) of FIG. 1 shows a transmission array antenna including four transmission antennas (Tx #1 to Tx #4) arranged in a vertical direction (longitudinal direction in (a) of FIG. 1) and a reception array antenna including four reception antennas (Rx #1 to Rx #4) arranged in a horizontal direction (cross direction in (a) of FIG. 1). As shown in (a) of FIG. 1, the transmission antennas are arranged at equal spacings ($d_V$) in the vertical direction, and the reception antennas are arranged at equal spacings ($d_H$) in the horizontal direction (see, for example, NPL 2).

(b) of FIG. 1 shows a virtual reception array including transmission and reception array antennas of an antenna arrangement shown in (a) of FIG. 1. The virtual reception array shown in (b) of FIG. 1 is made up of 16-element virtual reception antennas (VA #1 to VA #16) in which four antennas in the horizontal direction and four antennas in the vertical direction are arranged in a rectangular shape. In (b) of FIG. 1, the horizontal interelement spacing of the virtual reception array is $d_H$, and the vertical interelement spacing of the virtual reception array is $d_V$. The horizontal aperture length $A_H$ of the virtual reception array is $3d_H$, and the vertical aperture length $A_V$ of the virtual reception array is $3d_V$.

Figure 2:
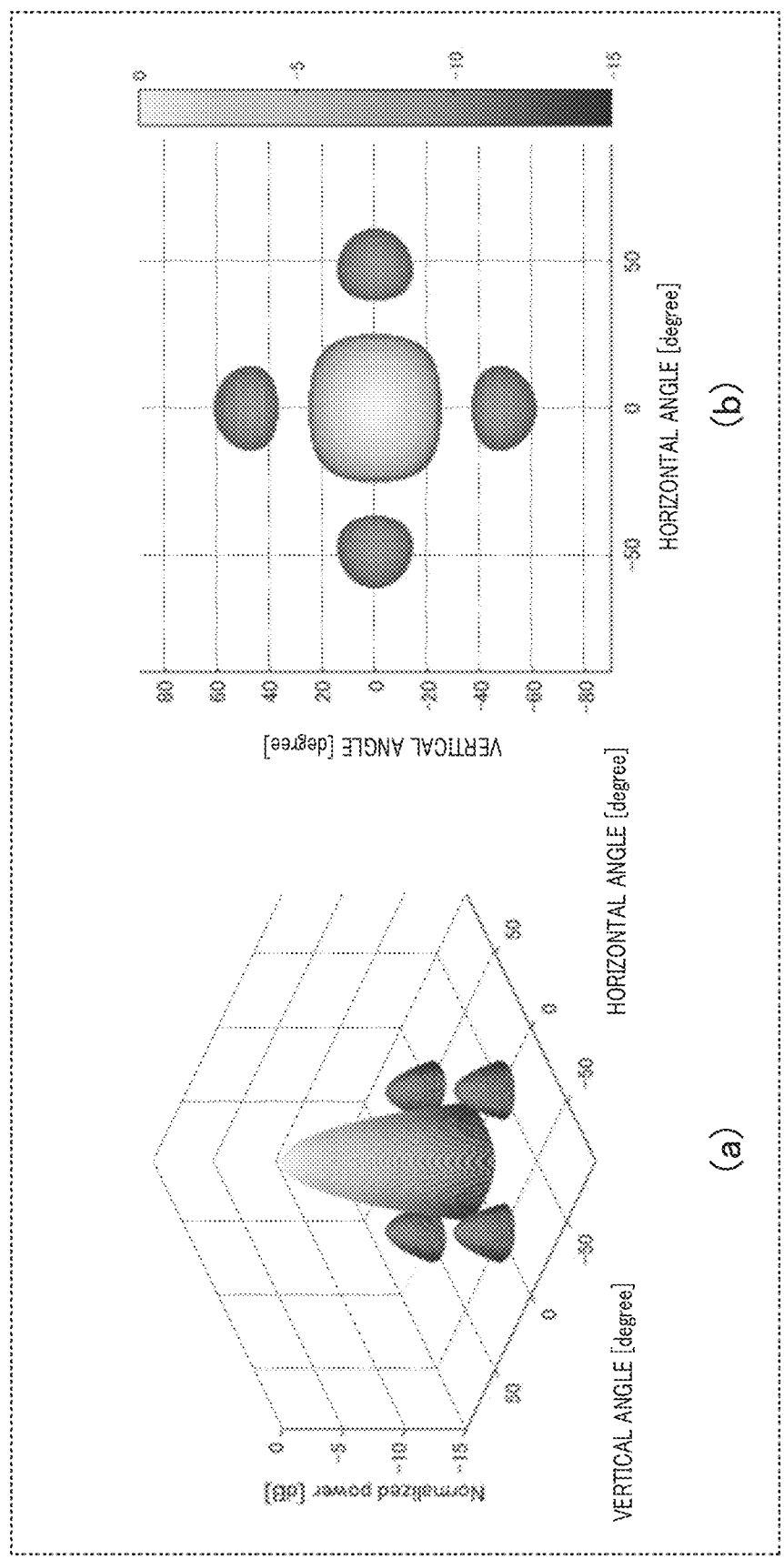
FIG. 2 illustrates diagrams showing an example of a computer simulation result of direction estimation process.

(a) and (b) of FIG. 2 illustrates a Fourier beam pattern oriented at 0° in the horizontal direction and 0° in the vertical direction where, in the antenna arrangement of the MIMO radar shown in (a) of FIG. 1, the horizontal interelement spacing $d_H$=0.5λ and the vertical interelement spacing $d_V$=0.5λ. λ represents the wavelength of a radar carrier wave.

As shown in (a) and (b) of FIG. 2, a main beam (main lobe) is formed at 0° in the horizontal direction and 0° in the vertical direction. Here, as the beam width of a main beam narrows, angular separation performance for a plurality of targets improves. For example, in (a) and (b) of FIG. 2, the beam width at a power level of 3 dB is about 26°. As shown in (a) and (b) of FIG. 2, side lobes are generated around the main beam. In a radar apparatus, a side lobe becomes a factor of erroneous detection as a virtual image. For this reason, as the peak level of a side lobe decreases, the probability that the side lobe is erroneously detected as a virtual image in a radar apparatus is reduced. In (a) and (b) of FIG. 2, for example, a power ratio to the peak level of each side lobe, normalized by the peak level of the main beam, (peak sidelobe level ratio (PSLR)) is about −13 dB (where equal amplitude beam weights are used).

In PTL 1, in transmission antennas, antenna elements (for example, an element group) arranged at equal spacings in a vertical direction are arranged so as to be opposed at equal spacings in at least two rows in a horizontal direction, and, in reception antennas, antenna elements (for example, an element group) arranged at equal spacings in the horizontal direction are arranged so as to be opposed at equal spacings in at least two rows in the vertical direction with such a spacing that the rows of the transmission antennas are included. With this antenna arrangement, a rectangular, planar, densely arranged virtual array arrangement is obtained as in the case of NPL 2. In this case as well, for example, a power ratio to the peak level of each side lobe, normalized by the peak level of the main beam, (PSLR) is about −13 dB (where equal amplitude beam weights are used).

With the antenna arrangement of the MIMO radar shown in (a) of FIG. 1, virtual reception antennas are arranged uniformly in a plane as shown in (b) of FIG. 1. Here, the vertical aperture of the virtual reception antennas shown in (b) of FIG. 1 is the same as the aperture of the transmission antennas. In other words, the number of elements of the virtual reception antennas arranged in the vertical direction is the same as the number of elements (for example, Nt) of the transmission antennas arranged in the vertical direction. Similarly, the horizontal aperture of the virtual reception antennas shown in (b) of FIG. 1 is the same as the aperture of the reception antennas. In other words, the number of elements of the virtual reception antennas arranged in the horizontal direction is the same as the number of elements (for example, Nr) of the reception antennas arranged in the horizontal direction.

Therefore, the product of the number of elements (Nt) of the virtual reception antennas arranged in the vertical direction and the number of elements (Nr) of the virtual reception antennas arranged in the horizontal direction is Nt×Nr and is equal to the product Nt×Nr of the number of transmission antennas and the number of reception antennas, and an expansion of the aperture of the virtual reception antennas is set (in other words, limited or restricted) to a value up to Nt×Nr.

For example, in PTL 1, in the transmission antennas, at least two rows of antenna elements arranged at equal spacings in the vertical direction are arranged so as to be opposed in the horizontal direction, so the horizontal aperture of the virtual reception antennas increases to at least twice as large as the number of reception antenna elements arranged between the rows of the transmission antenna elements. In other words, the number of elements of the virtual reception antennas arranged in the horizontal direction is at least twice as large as the number of elements of the reception antennas in the horizontal direction.

Similarly, for example, in PTL 1, in the reception antennas, at least two rows of antenna elements arranged at equal spacings in the horizontal direction are arranged so as to be opposed in the vertical direction with such a spacing that the rows of the transmission antennas are included, so the vertical aperture of the virtual reception antennas increases to at least twice as large as the number of transmission antenna elements arranged between the rows of the reception antenna elements. In other words, the number of elements of the virtual reception antennas arranged in the vertical direction is at least twice as large as the number of elements of the transmission antennas in the vertical direction.

Here, it is assumed that the number of transmission antennas (or the number of antenna elements) arranged in the vertical direction is "Nta" and "Ntb" rows of the Nta antennas are arranged so as to be opposed in the horizontal direction. Here, it is assumed that the number of reception antennas (or the number of antenna elements) arranged in the horizontal direction is "Nra" and "Nrb" rows of the Nra antennas are arranged so as to be opposed in the vertical direction. In other words, the number Nt of transmission antennas is Nta×Ntb, and the number Nr of reception antennas is Nra×Nrb.

In this case, the number of elements of the virtual reception antennas arranged in the vertical direction is Nrb times as the number Nta of elements of the transmission antennas in the vertical direction (=Nta×Nrb). The number of elements of the virtual reception antennas arranged in the horizontal direction is Ntb times as the number Nra of elements of the reception antennas in the horizontal direction (=Nra×Ntb). Therefore, the product of the number of elements of the virtual reception antennas arranged in the vertical direction and the number of elements of the virtual reception antennas arranged in the horizontal direction is Nta×Nrb×Nra×Ntb=Nt×Nr, and the product Nt×Nr of the number of transmission antennas and the number of reception antennas, and this is, for example, similar to the antenna arrangement shown in (a) and (b) of FIG. 1.

As described above, in the antenna arrangement described in PTL 1, the effect of increasing the number of elements of the virtual reception antennas arranged in the vertical direction and the number of elements of the virtual reception antennas arranged in the horizontal direction is restrictive, and, as a result, an increase in the antenna aperture length is limited, so the improvement of angle measurement performance in the radar apparatus can also be limited.

For example, in one MIMO array arrangement, there is a possibility that a radar apparatus erroneously detects the angles of arrival of multiple waves at a specific angle with a reception level difference. As an example, (a) of FIG. 3 shows an example in which each of a set of transmission antennas and a set of reception antennas is arranged in an L shape (for example, referred to as "transmission and reception L-shape arrangement"), and (b) of FIG. 3 shows a virtual reception array including transmission and reception array antennas of the antenna arrangement shown in (a) of FIG. 3.

Figure 3:
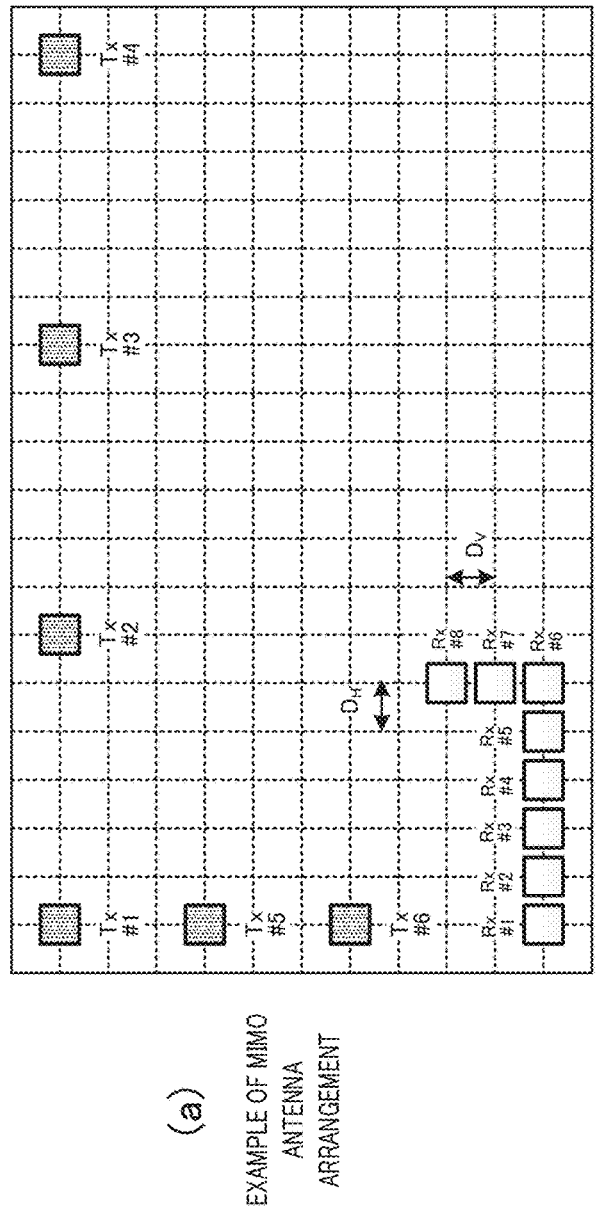
FIG. 3 illustrates a diagram showing an example of an arrangement of transmission and reception antennas and a diagram showing an example of an arrangement of a virtual reception array.
Figure 3:
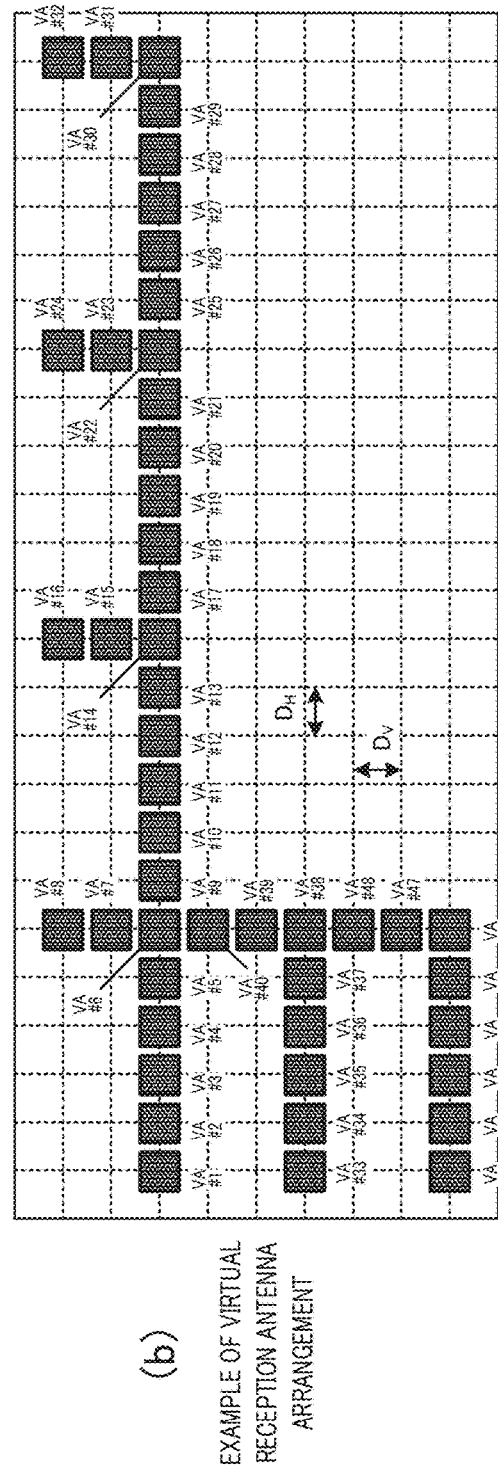

For example, in the virtual reception antenna arrangement shown in (b) of FIG. 3, when one virtual antenna (for example, VA #39, VA #40, VA #47, and VA #48 (or VA #9 to VA #13, VA #17 to VA #21, and VA #25 to VA #29)) is arranged in the vertical (or horizontal) direction, there is a possibility that a radar apparatus is difficult to separate multiple horizontal (or vertical) waves.

For example, in the virtual reception antenna arrangement shown in (b) of FIG. 3, when a plurality of virtual antennas is arranged at vertical (or horizontal) positions, a radar apparatus is capable of separating multiple horizontal (or vertical) waves. However, when the spacing of the virtual antennas at the horizontal (or vertical) positions is greater than or equal to one wavelength, there is a possibility that a radar apparatus is difficult to separate multiple waves at specific horizontal (or vertical) spacings (for example, azimuth (or elevation) spacings at which grating lobes occur).

Figure 4:
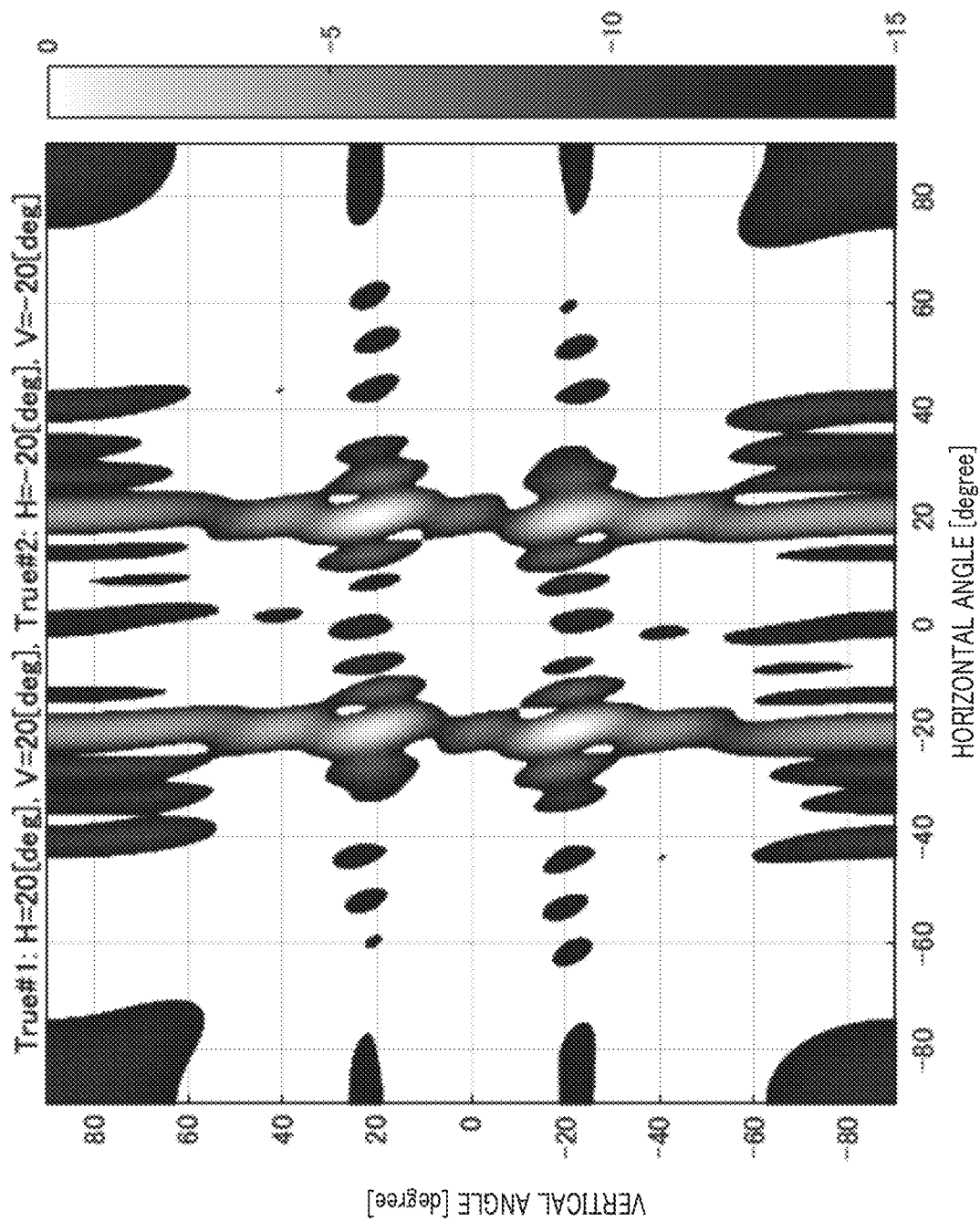
FIG. 4 is a view showing an example of a computer simulation result of direction estimation process.

FIG. 4 shows a Fourier beam pattern (computer simulation of an estimated result) when the angles of arrival (H, V) of two waves having equal received power are respectively (20°, 20°) and (−20°, −20°) in the antenna arrangement of the MIMO radar, shown in (a) and (b) of FIG. 3.

As shown in FIG. 4, a false peak can appear at a high level (for example, a level as in the case of a true value) in directions different from true value directions (20°, 20°) and (−20°, −20°), for example, directions (20°, −20°) and (−20°, 20°).

In one general example of the present disclosure, a method of improving two-dimensional angle measurement performance by using a MIMO array arrangement capable of separating multiple waves will be described. In one general example of the present disclosure, a method of improving two-dimensional angle measurement performance by using a MIMO array arrangement in which the aperture of the virtual reception antennas is expanded in two dimensions, for example, the vertical direction and the horizontal direction, will be described.

Hereinafter, embodiments according to one general example of the present disclosure will be described in detail with reference to the drawings. In the embodiments, like reference signs are assigned to the same component elements, and the description thereof will not be repeated.

Hereinafter, a radar apparatus with a configuration (in other words, MIMO radar configuration) in which a transmission branch sends code division multiplexed different transmission signals from a plurality of transmission antennas and a reception branch performs a process of separately receiving the transmission signals will be described. The configuration of the radar apparatus is not limited thereto and may be a configuration in which a transmission branch sends frequency division multiplexed different transmission signals from a plurality of transmission antennas and a reception branch performs a process of separately receiving the transmission signals. Similarly, the configuration of the radar apparatus may be a configuration in which a transmission branch sends time division multiplexed transmission signals from a plurality of transmission antennas and a reception branch performs a receiving process.

Similarly, the configuration of the radar apparatus may be a configuration in which a transmission branch sends Doppler division multiplexed different transmission signals from a plurality of transmission antennas and a reception branch performs a process of separately receiving the transmission signals. Similarly, the configuration of the radar apparatus may be a configuration in which a transmission branch sends transmission signals multiplexed by a combination of at least two of code division multiplexing, time division multiplexing, and Doppler division multiplexing from a plurality of transmission antennas and a reception branch performs a process of separately receiving the transmission signals.

Hereinafter, as an example, the configuration of a radar system (which is also called, for example, chirp pulse transmission (fast chirp modulation)) using a frequency-modulated pulse wave, such as a chirp pulse, will be described. A modulation scheme is not limited to frequency modulation. For example, one general example of the present disclosure is also applicable to a radar system using a monopulse or a coded pulse.

[Configuration of Radar Apparatus]

Figure 5:
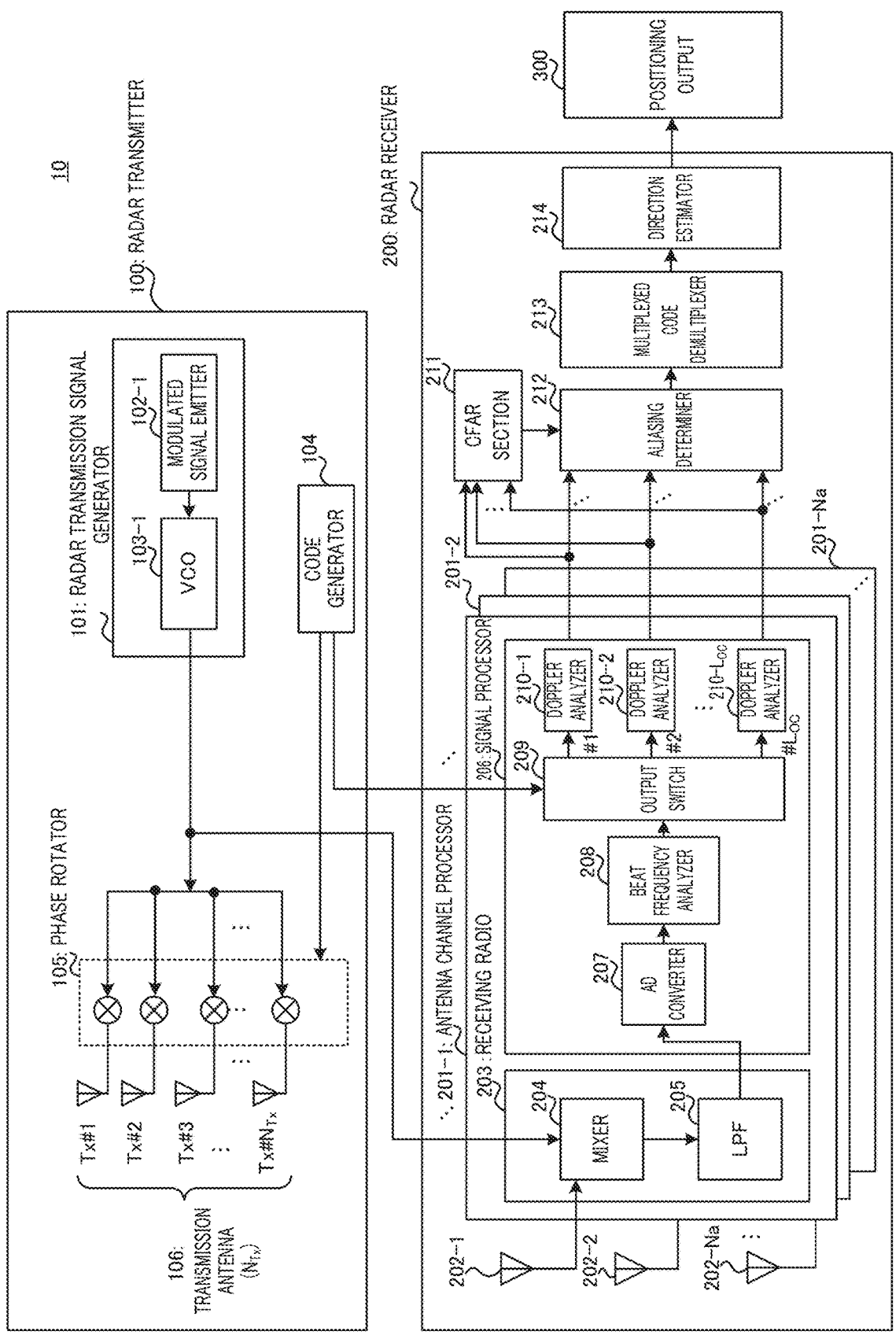
FIG. 5 is a block diagram showing an example of a configuration of a radar apparatus.

FIG. 5 is a block diagram showing a configuration example of radar apparatus 10 according to the present embodiment.

Radar apparatus 10 includes radar transmitter (transmission branch) 100, radar receiver (reception branch) 200, and positioning output 300.

Radar transmitter 100 (which corresponds to, for example, transmission circuitry), for example, generates a radar signal (radar transmission signal) and transmits the radar transmission signal at a prescribed transmission period by using a transmission array antenna made up of a plurality of transmission antennas 106.

Radar receiver 200 (which corresponds to, for example, reception circuitry), for example, receives a reflected wave signal that is a radar transmission signal reflected from a target (not shown) by using a reception array antenna including a plurality of (for example, Na) reception antennas 202. Radar receiver 200 performs signal processing on the reflected wave signal received by each reception antenna 202, for example, detects presence or absence of a target or estimates a distance of arrival, Doppler frequency (in other words, relative speed), and direction of arrival of the reflected wave signal, and outputs information on an estimated result (in other words, positioning information).

Positioning output 300 performs a positioning output process in accordance with information on an estimated result of the direction of arrival input from radar receiver 200.

Radar apparatus 10 may be mounted on, for example, a mobile unit, such as a vehicle. Radar receiver 200 or positioning output 300 may be connected to a control apparatus electronic control unit (ECU) (not shown), such as an advanced driver assistance system (ADAS), which enhances crash safety, and an autonomous driving system, and positioning output (information on an estimated result) may be used for vehicle drive control or alarm calling control.

Radar apparatus 10 may be attached to, for example, a relatively elevated structure (not shown), such as a roadside utility pole or a traffic light. Radar apparatus 10 may be used as, for example, a sensor in a support system or suspicious individual intrusion prevention system (not shown) that enhances the safety of a passing vehicle or pedestrian. Radar receiver 200 or positioning output 300 may be connected to a control apparatus (not shown) in, for example, a support system or suspicious individual intrusion prevention system that enhances safety, and positioning output may be used for alarm calling control or abnormality detection control. The uses of radar apparatus 10 are not limited thereto and may be used for other purposes.

The target is an object to be detected by radar apparatus 10. Examples of the target include a vehicle (including a four-wheel vehicle and a two-wheel vehicle), a person, a block, and a curb.

[Configuration of Radar Transmitter 100]

Radar transmitter 100 includes radar transmission signal generator 101, code generator 104, phase rotator 105, and transmission antennas 106.

Radar transmission signal generator 101, for example, generates a radar transmission signal (in other words, base-band signal). Radar transmission signal generator 101 includes, for example, modulated signal emitter 102 and voltage controlled oscillator (VCO) 103. Hereinafter, components in radar transmission signal generator 101 will be described.

Figure 6:
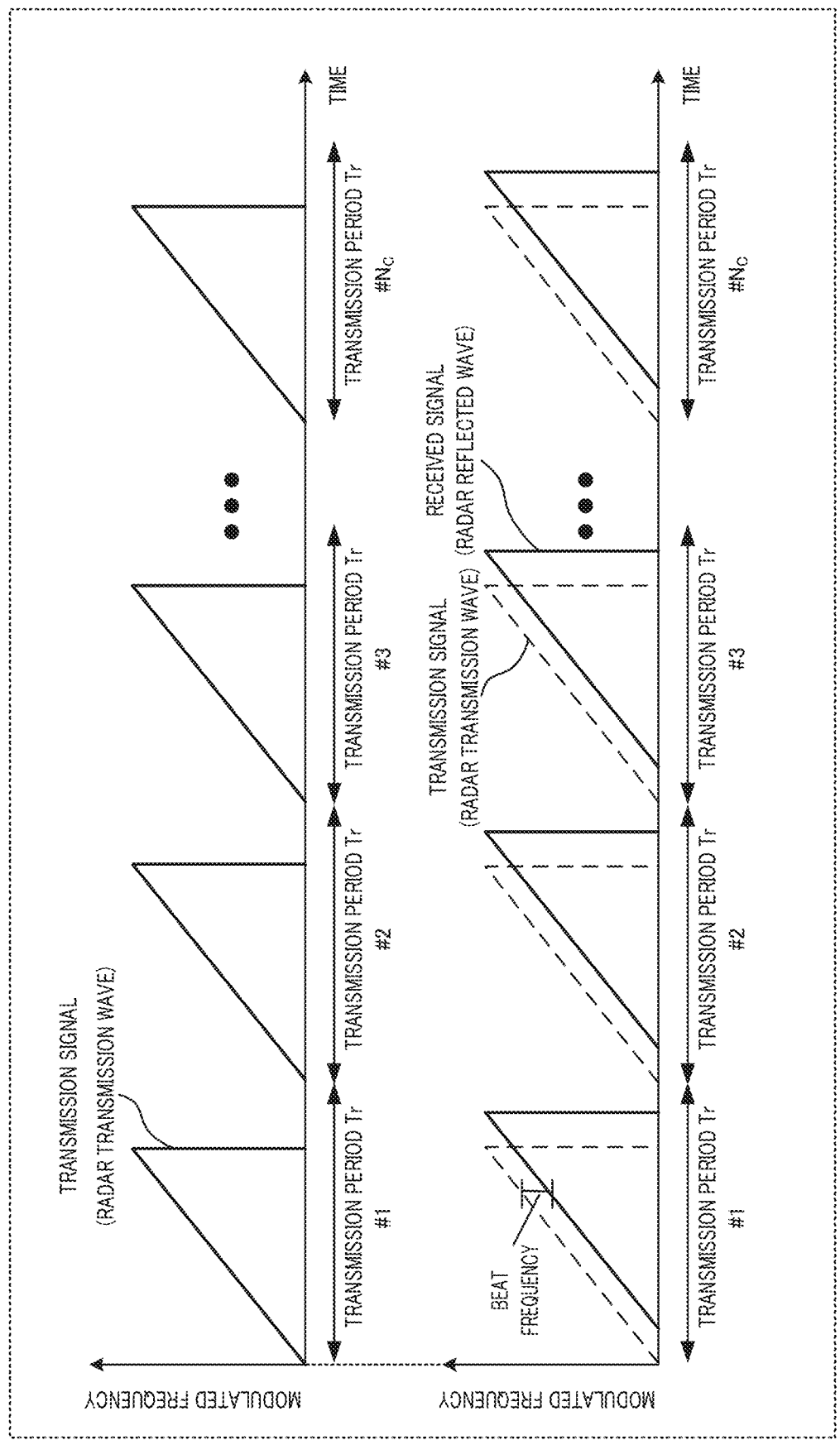
FIG. 6 is a timing chart showing an example of a transmission signal and a reflected wave signal when a chirp pulse is used.

Modulated signal emitter 102, for example, emits a sawtooth-shaped modulated signal (in other words, a modulated signal for VCO control) at each radar transmission period Tr as shown at the top in FIG. 6.

VCO 103 outputs a frequency modulated signal (hereinafter, referred to as, for example, a frequency chirp signal or a chirp signal) to phase rotator 105 in accordance with a radar transmission signal (modulated signal) output from modulated signal emitter 102.

A chirp signal generated by radar transmission signal generator 101 is output to radar receiver 200 (mixer 204 (described later)).

Code generator 104 generates different codes respectively for transmission antennas 106 that perform code multiplex transmission. Code generator 104 outputs phase rotation amounts respectively associated with the generated codes to phase rotator 105. Code generator 104 outputs information on the generated codes to radar receiver 200 (output switch 209 (described later)).

Phase rotator 105, for example, assigns the phase rotation amounts input from code generator 104 to a chirp signal input from radar transmission signal generator 101 and outputs phase-rotated signals to transmission antennas 106 (for example, first transmission antenna 106-1 and second transmission antenna 106-2). For example, phase rotator 105 may include phasers or phase modulators (not shown).

Output signals of phase rotator 105 are amplified to a prescribed transmission power and radiated from transmission antennas 106 to the air. In other words, radar transmission signals are assigned with the phase rotation amounts associated with the codes and transmitted from transmission antennas 106 by means of code multiplexing.

Next, an example of codes (for example, orthogonal codes) set in radar apparatus 10 will be described.

Code generator 104 may, for example, generate different codes respectively for transmission antennas 106 that perform code multiplex transmission.

For example, hereinafter, the number of transmission antennas 106 is "$N_{Tx}$". Here, $N_{Tx} \geq 2$.

The number of multiplexed codes is "$N_{CM}$". FIG. 5 illustrates the case where $N_{CM}=N_{Tx}$; however, the configuration is not limited thereto. For example, the same code may be transmitted (for example, array transmission or beamforming transmission) by a set of transmission antennas 106. In this case, $N_{CM}<N_{Tx}$.

Code generator 104, for example, sets $N_{CM}$ orthogonal codes of $N_{allcode}$ (or which may be represented by $N_{allcode}$(Loc)) orthogonal codes included in code sequences (for example, orthogonal code sequences (or simply codes or orthogonal codes) in mutually orthogonal relation) with a code length (in other words, the number of code elements) Loc for codes for code multiplex transmission.

For example, the number $N_{CM}$ of multiplexed codes is less than the number $N_{allcode}$ of orthogonal codes, and $N_{CM}<N_{allcode}$. In other words, the code length Loc of an orthogonal code is greater than the number of multiplexed codes $N_{CM}$. For example, $N_{CM}$ orthogonal codes with the code length Loc are represented by $Code_{ncm}=[OC_{ncm}(1), OC_{ncm}(2), \ldots, OC_{ncm}(Loc)]$. Here, "$OC_{ncm}(noc)$" represents the noc-th code element in the ncm-th orthogonal code $Code_{ncm}$. "ncm" indicates the index of an orthogonal code used for code multiplexing, and ncm=1, ..., $N_{CM}$. "noc" is the index of a code element, and noc=1, ..., Loc.

Here, of the $N_{allcode}$ orthogonal codes with the code length Loc, ($N_{allcode}-N_{CM}$) orthogonal codes are not used in code generator 104 (in other words, not used for code multiplex transmission). Hereinafter, ($N_{allcode}-N_{CM}$) orthogonal codes not used in code generator 104 are referred to as "unused orthogonal codes". At least one of the unused orthogonal codes is, for example, used for Doppler frequency aliasing determination in aliasing determiner 212 of radar receiver 200 (described later) (one example will be described later).

By using unused orthogonal codes, radar apparatus 10 is able to, for example, receive a signal transmitted through code multiplexing from transmission antennas 106 by separating the signal into individual signals and expand the range of a detectable Doppler frequency in a state where inter-code interference is suppressed (one example will be described later).

As described above, $N_{CM}$ orthogonal codes generated by code generator 104 are, for example, mutually orthogonal codes (in other words, uncorrelated codes). For example, a Walsh-Hadamard code may be used for an orthogonal code sequence. The code length of a Walsh-Hadamard code is power of two, and a Walsh-Hadamard code with each code length includes orthogonal codes equal in number to the code length. For example, a Walsh-Hadamard code with a code length of two, four, eight, or 16 each includes two, four, eight, or 16 orthogonal codes.

Hereinafter, as an example, the code length Loc of each of the $N_{CM}$ orthogonal code sequences may be set so as to satisfy the following expression 1.

$$Loc \geq 2^{ceil[log2(N_{CM}+1)]} \qquad \text{(Equation 1)}$$

Here, ceil[x] is an operator that outputs a minimum integer greater than or equal to real number x (ceiling function). In the case of a Walsh-Hadamard code with the code length Loc, the relation $N_{allcode}(Loc)=Loc$ holds. For example, since a Walsh-Hadamard code with the code length Loc=2, 4, 8, or 16 includes two, four, eight, or 16 orthogonal codes, $N_{allcode}(2)=2$, $N_{allcode}(4)=4$, $N_{allcode}(8)=8$, and $N_{allcode}(16)=16$ hold. Code generator 104 may, for example, use $N_{CM}$ orthogonal codes out of $N_{allcode}(Loc)$ orthogonal codes included in a Walsh-Hadamard code with the code length Loc.

Here, the code length will be described. For example, when the moving speed of a target or radar apparatus 10 includes an acceleration, codes are more susceptible to inter-code interference as the code length increases. As the code length increases, candidates in a Doppler aliasing range at the time of Doppler aliasing determination (described later) increase. For this reason, when there are targets of multiple Doppler frequencies over different aliasing ranges in the same distance index, the probability that Doppler frequency indexes respectively detected in different aliasing ranges overlap increases, so the probability that radar apparatus 10 is difficult to appropriately determine aliasing can increase.

For this reason, radar apparatus 10 may use codes with a shorter code length from the viewpoint of performance and computation of aliasing determination in aliasing determiner 212 of radar receiver 200 (described later). As an example, radar apparatus 10 may use orthogonal code sequences with the shortest code length out of the code lengths Loc that satisfy the expression 1.

When a Walsh-Hadamard code with the code length Loc includes, for example, a code $[OC_{ncm}(1), OC_{ncm}(2), \ldots,$ $OC_{ncm}(Loc-1)$, $OC_{ncm}(Loc)$] with the code length Loc, the Walsh-Hadamard code with the code length Loc also includes a code [$OC_{ncm}(1)$, $-OC_{ncm}(2)$, ..., $OC_{ncm}(Loc-1)$, $-OC_{ncm}(Loc)$] of which the odd-numbered code elements are the same and the even-numbered code elements are inverted in sign.

When another code different from a Walsh-Hadamard code with the code length Loc includes, for example, a code [$OC_{ncm}(1)$, $OC_{ncm}(2)$, ..., $OC_{ncm}(Loc-1)$, $OC_{ncm}(Loc)$] with the code length Loc, a code with the code length Loc may be a code [$OC_{ncm}(1)$, $-OC_{ncm}(2)$, ..., $OC_{ncm}(Loc-1)$, $-OC_{ncm}(Loc)$] of which the odd-numbered code elements are the same and the even-numbered code elements are inverted in sign or a code [$-OC_{ncm}(1)$, $OC_{ncm}(2)$, ..., $-OC_{ncm}(Loc-1)$, $OC_{ncm}(Loc)$] of which the even-numbered code elements are the same and the odd-numbered code elements are inverted in sign.

When the number of unused orthogonal codes ($N_{allcode}-N_{CM}$) is greater than or equal to two, radar apparatus 10 may, for example, select codes such that the code set in any one of the above-described relations is not included in the unused orthogonal codes. For example, one of the codes in each of the code sets in the above-described relations may be used for code multiplex transmission, and the other one of the codes may be included in unused orthogonal codes. By selecting unused orthogonal codes, the accuracy of Doppler frequency aliasing determination in aliasing determiner 212 of radar receiver 200 (described later) is improved (one example will be described later).

Next, an example of an orthogonal code in each of the numbers $N_{CM}$ of multiplexed codes will be described.

<$N_{CM}$=2 or 3>

When $N_{CM}$=2 or 3, for example, a Walsh-Hadamard code with the code length Loc=4, 8, 16, 32, ... may be applied. In the case of these code lengths Loc, $N_{CM}<N_{allcode}$(Loc). When the number $N_{CM}$ of multiplexed codes=2 or 3, the case where a Walsh-Hadamard code with the shortest code length (for example, Loc=4) out of these code lengths Loc is used will be described.

For example, a Walsh-Hadamard code with the code length Loc is represented by $WH_{Loc}$(nwhc). nwhc indicates a code index included in the Walsh-Hadamard code with the code length Loc, and nwhc=1, ..., Loc. For example, a Walsh-Hadamard code with the code length Loc=4 includes orthogonal codes $WH_4(1)$=[1, 1, 1, 1], $WH_4(2)$=[1, −1, 1, −1], $WH_4(3)$=[1, 1, −1, −1], and $WH_4(4)$=[1, −1, −1, 1].

Here, in the Walsh-Hadamard code with the code length Loc=4, $WH_4(1)$=[1, 1, 1, 1] and $WH_4(2)$=[1, −1, 1, −1] are a set of codes of which the odd-numbered code elements are the same and the even-numbered code elements are inverted in sign. $WH_4(3)$=[1, 1, −1, −1] and $WH_4(4)$=[1, −1, −1, 1] are also a set of codes in a similar relation to the set of $WH_4(1)$ and $WH_4(2)$.

When, for example, the number ($N_{allcode}-N_{CM}$) of unused orthogonal codes is greater than or equal to two, radar apparatus 10 may select codes such that the code sets in such relations are not included in the unused orthogonal codes.

When, for example, the number $N_{CM}$ of multiplexed codes is two, code generator 104 determines two orthogonal codes of a Walsh-Hadamard code with the code length Loc=4 as codes for code multiplex transmission. In this case, the number ($N_{allcode}-N_{CM}$) of unused orthogonal codes is two.

For example, code generator 104 may select codes for code multiplex transmission such that a set of codes $WH_4(1)$ and $WH_4(2)$ or a set of codes $WH_4(3)$ and $WH_4(4)$ is not included in unused orthogonal codes. For example, a combination of codes ($Code_1$ and $Code_2$) for code multiplex transmission may be a combination of $Code_1=WH_4(1)$ (=[1, 1, 1, 1]) and $Code_2=WH_4(3)$ (=[1, 1, −1, −1]), a combination of $Code_1=WH_4(1)$ and $Code_2=WH_4(4)$, a combination of $Code_1=WH_4(2)$ and $Code_2=WH_4(3)$, or a combination of $Code_1=WH_4(2)$ and $Code_2=WH_4(4)$.

When the number $N_{CM}$ of multiplexed codes is two, aliasing determiner 212 in radar receiver 200 may use, for example, at least one of two (=$N_{allcode}-N_{CM}$) unused orthogonal codes not used in code generator 104 (in other words, not used for code multiplex transmission) out of $N_{allcode}$ (=4) Walsh-Hadamard codes with the code length Loc=4 for aliasing determination (one example will be described later).

Hereinafter, of $N_{allcode}$ orthogonal codes with the code length Loc, unused orthogonal codes are represented by "$UnCode_{nuc}$=[$UOC_{nuc}(1)$, $UOC_{nuc}(2)$, ..., $UOC_{nuc}(Loc)$]. $UnCode_{nuc}$ represents the nuc-th unused orthogonal code. nuc represents the index of an unused orthogonal code, and nuc=1, ..., ($N_{allcode}-N_{CM}$). $UOC_{nuc}$(noc) represents the noc-th code element in the nuc-th unused orthogonal code $UnCode_{nuc}$. noc represents the index of a code element, and noc=1, ..., Loc.

When, for example, the number $N_{CM}$ of multiplexed codes is two and codes for code multiplex transmission, determined by code generator 104, are $Code_1=WH_4(1)$ (=[1, 1, 1, 1]) and $Code_2=WH_4(3)$ (=[1, 1, −1, −1]), unused orthogonal codes are $UnCode_1=WH_4(2)$ (=[1, −1, 1, −1]) and $UnCode_2=WH_4(4)$ (=[1, −1, −1, 1]). A combination of unused orthogonal codes ($UnCode_1$ and $UnCode_2$) is not limited to a combination of $WH_4(2)$ and $WH_4(4)$ and may be a combination of other codes.

Similarly, when the number $N_{CM}$ of multiplexed codes is three, code generator 104, for example, determines three orthogonal codes out of Walsh-Hadamard codes with the code length Loc=4 as codes for code multiplex transmission. In this case, the number ($N_{allcode}-N_{CM}$) of unused orthogonal codes is one.

For example, code generator 104 may select $Code_1=WH_4(3)$=[1, 1, −1, −1], $Code_2=WH_4(4)$=[1, −1, −1, 1], and $Code_3=WH_4(2)$=[1, −1, 1, −1].

Aliasing determiner 212 of radar receiver 200 may use one (=$N_{allcode}-N_{CM}$) unused orthogonal code out of $N_{allcode}$ (=4) Walsh-Hadamard codes with the code length Loc=4 for aliasing determination (one example will be described later). When, for example, the number $N_{CM}$ of multiplexed codes is three and codes for code multiplex transmission, determined by code generator 104, are $Code_1=WH_4(3)$=[1, 1, −1, −1], $Code_2=WH_4(4)$=[1, −1, −1, 1], and $Code_3=WH_4(2)$=[1, −1, 1, −1], an unused orthogonal code is $UnCode_1=WH_4(1)$=[1, 1, 1, 1]. A combination of codes for code multiplex transmission ($Code_1$, $Code_2$, and $Code_3$) and unused orthogonal codes ($UnCode_1$) is not limited thereto and may be another combination of codes.

When the number $N_{CM}$ of multiplexed codes is five or greater as well, radar apparatus 10 may determine codes for code multiplex transmission and unused orthogonal codes as in the case where the number $N_{CM}$ of multiplexed codes is any one of two to four.

For example, code generator 104 may select $N_{CM}$ orthogonal codes out of Walsh-Hadamard codes with the code length Loc, expressed by the expression 2, as codes for code multiplex transmission. In this case, $N_{CM}<Loc=N_{allcode}$.

$$Loc=2^{ceil[log2(N_{CM}+1)]} \quad \text{(Equation 2)}$$

Aliasing determiner 212 of radar receiver 200 may use ($N_{allcode}$−$N_{CM}$) unused orthogonal codes out of $N_{allcode}$ (=Loc) Walsh-Hadamard codes with the code length Loc for aliasing determination (one example will be described later). When the number ($N_{allcode}$−$N_{CM}$) of unused orthogonal codes is greater than or equal to two, code generator 104 may, for example, select codes for code multiplex transmission out of Walsh-Hadamard codes with the code length Loc such that a set of codes of which any one of the odd-numbered code elements and the even-numbered code elements are the same and the other one of the odd-numbered code elements and the even-numbered code elements are inverted in sign between mutual codes are not included in unused orthogonal codes.

In other words, code generator 104 may, for example, select codes for code multiplex transmission out of Walsh-Hadamard codes with the code length Loc such that any one of a set of codes of which any one of the odd-numbered code elements and the even-numbered code elements are the same and the other one of the odd-numbered code elements and the even-numbered code elements are inverted in sign between mutual codes is included in unused orthogonal codes and the other one of the set is not included in the unused orthogonal codes.

Elements that make up an orthogonal code sequence are not limited to real numbers and may include a complex value.

A code may be another orthogonal code different from a Walsh-Hadamard code. For example, a code may be an orthogonal M-sequence code or a pseudo-orthogonal code.

An example of orthogonal codes in each number $N_{CM}$ of multiplexed codes has been described.

Next, an example of phase rotation amounts based on codes for code multiplex transmission, generated by code generator 104, will be described.

Radar apparatus 10, for example, performs code multiplex transmission using different orthogonal codes respectively for transmission antennas Tx #1 to Tx #$N_{Tx}$ that perform code multiplex transmission. Code generator 104, for example, sets a phase rotation amount $\psi_{ncm}(m)$ based on an orthogonal code $Code_{ncm}$ to be assigned to the ncm-th transmission antenna Tx #ncm at the m-th transmission period Tr and outputs the phase rotation amount $\psi_{ncm}(m)$ to phase rotator 105. Here, ncm=1, . . . , $N_{CM}$.

For example, code generator 104 cyclically assigns phase amounts corresponding to Loc code elements $OC_{ncm}(1)$, . . . , $OC_{ncm}(Loc)$ of an orthogonal code $Code_{ncm}$ in each duration of transmission periods of the number of times corresponding to the code length Loc as expressed by the following expression 3 as a phase rotation amount $\psi_{ncm}(m)$.

$$\psi_{ncm}(m) = \text{angle}[OC_{ncm}(OC\_INDEX)] \quad \text{(Equation 3)}$$

Here, angle(x) is an operator that outputs the radian phase of real number x, and angle(1)=0, angle(−1)=π, angle(j)=π/2, and angle(−j)=−π/2. j is an imaginary unit. OC_INDEX is an orthogonal code element index that designates an element of the orthogonal code sequence $Code_{ncm}$ and cyclically varies in the range from one to Loc as expressed by the following expression 4 at each transmission period (Tr).

$$OC\_INDEX = \text{mod}(m-1, Loc) + 1 \quad \text{(Equation 4)}$$

Here, mod(x, y) is a modulus operator and is a function that outputs a remainder after x is divided by y. m=1, . . . , Nc. Nc is a predetermined number of transmission periods that radar apparatus 10 uses for radar positioning (hereinafter, referred to as "radar transmission signal transmission number"). Radar apparatus 10, for example, performs transmission in radar transmission signal transmission number Nc that is an integer multiple (for example, Ncode multiple) of Loc. For example, Nc=Loc×Ncode.

Code generator 104 outputs an orthogonal code element index OC_INDEX to output switch 209 of radar receiver 200 at each transmission period (Tr).

Phase rotator 105 includes, for example, phasers or phase modulators corresponding to $N_{Tx}$ transmission antennas 106. Phase rotator 105, for example, assigns a phase rotation amount $\psi_{ncm}(m)$ input from code generator 104 to each chirp signal input from radar transmission signal generator 101 at each transmission period Tr.

For example, phase rotator 105 assigns a phase rotation amount $\psi_{ncm}(m)$ based on an orthogonal code $Code_{ncm}$, to be assigned to the ncm-th transmission antenna Tx #ncm, to a chirp signal input from radar transmission signal generator 101 at each transmission period Tr. Here, ncm=1, . . . , $N_{CM}$, and m=1, . . . , Nc.

Outputs from phase rotator 105 to $N_{Tx}$ transmission antennas 106 are, for example, radiated from $N_{Tx}$ transmission antennas 106 (for example, transmission array antenna) to the air after being amplified to a predetermined transmission power.

As an example, the case where the number $N_{Tx}$ of transmission antennas 106 is three and code multiplex transmission with the number $N_{CM}$ of multiplexed codes is three is performed will be described. The number $N_{Tx}$ of transmission antennas and the number $N_{CM}$ of multiplexed codes are not limited to these values.

For example, phase rotation amounts $\psi_1(m)$, $\psi_2(m)$, $\psi_3(m)$ are output from code generator 104 to phase rotator 105 at each m-th transmission period Tr.

A first section (ncm=1) of phase rotator 105 (in other words, the phaser corresponding to transmission antenna 106 (for example, Tx #1)) assigns a phase rotation amount as expressed by the following expression 5 at each transmission period Tr to a chirp signal generated by radar transmission signal generator 101 at each transmission period Tr. An output of the first section of phase rotator 105 is transmitted from transmission antenna 106 (Tx #1). Here, cp(t) represents a chirp signal at each transmission period Tr, output from radar transmission signal generator 101.

$$\exp[j\psi_1(1)]cp(t), \exp[j\psi_1(2)]cp(t), \exp[j\psi_1(3)]cp(t), \ldots, \exp[j\psi_1(Nc)]cp(t) \quad \text{(Equation 5)}$$

Similarly, a second section (ncm=2) of phase rotator 105 assigns a phase rotation amount as expressed by the following expression 6 at each transmission period Tr to a chirp signal generated by radar transmission signal generator 101 at each transmission period Tr. An output of the second section of phase rotator 105 is transmitted from transmission antenna 106 (for example, Tx #2).

$$\exp[j\psi_2(1)]cp(t), \exp[j\psi_2(2)]cp(t), \exp[j\psi_2(3)]cp(t), \ldots, \exp[j\psi_2(Nc)]cp(t) \quad \text{(Equation 6)}$$

Similarly, a third section (ncm=3) of phase rotator 105 assigns a phase rotation amount as expressed by the following expression 7 at each transmission period Tr to a chirp signal generated by radar transmission signal generator 101 at each transmission period Tr. An output of the third section of phase rotator 105 is transmitted from transmission antenna 106 (for example, Tx #3).

$$\exp[j\psi_3(1)]cp(t), \exp[j\psi_3(2)]cp(t), \exp[j\psi_3(3)]cp(t), \ldots, \exp[j\psi_3(Nc)]cp(t) \quad \text{(Equation 7)}$$

When radar apparatus 10 continuously performs radar positioning, radar apparatus 10 may variably set a code used for the orthogonal code Code$_{ncm}$ at each radar positioning (for example, each of Nc transmission periods (Nc×Tr)).

Radar apparatus 10 may, for example, variably set transmission antennas 106 to transmit the N$_{Tx}$ outputs of phase rotator 105 (in other words, transmission antennas 106 respectively associated with the outputs of phase rotator 105). For example, association of transmission antennas 106 with code sequences for code multiplex transmission may be varied for each radar positioning in radar apparatus 10. When radar apparatus 10, for example, receives a signal while receiving the influence of interference different for each transmission antenna 106 from another radar, a code multiplexed signal output from transmission antennas 106 varies for each radar positioning, so the effect of randomizing the influence of interference is obtained.

An example of the configuration of radar transmitter 100 has been described.

[Configuration of Radar Receiver 200]

In FIG. 5, radar receiver 200 includes Na reception antennas 202 (for example, also represented by Rx #1 to Rx #Na) to make up an array antenna. Radar receiver 200 includes Na antenna channel processors 201-1 to 201-Na, constant false alarm rate (CFAR) section 211, aliasing determiner 212, multiplexed code demultiplexer 213, and direction estimator 214.

Each reception antenna 202 receives a reflected wave signal that is a radar transmission signal reflected from a reflective object including a target for radar positioning and outputs the received reflected wave signal to an associated one of antenna channel processors 201 as a received signal.

Each antenna channel processor 201 includes receiving radio 203 and signal processor 206.

Receiving radio 203 includes mixer 204 and low pass filter (LPF) 205. Mixer 204, for example, mixes a received reflected wave signal with a chirp signal that is a radar transmission signal, input from radar transmission signal generator 101. LPF 205 outputs a beat signal that is a frequency according to a delay time of a reflected wave signal by applying LPF processing to an output signal of mixer 204. For example, as shown in FIG. 2, a differential frequency between the frequency of a transmission chirp signal (transmission frequency modulated wave) and the frequency of a received chirp signal (reception frequency modulated wave) is obtained as a beat frequency (in other words, a beat signal).

Signal processor 206 of each antenna channel processor 201-z (where z is any one of 1 to Na) includes AD converter 207, beat frequency analyzer 208, output switch 209, and Doppler analyzer 210.

In signal processor 206, AD converter 207, for example, converts a signal (for example, a beat signal) output from LPF 205 to discrete sample data discretely sampled.

Beat frequency analyzer 208, for example, applies a fast Fourier transform (FFT) process to N$_{data}$ discrete sample data obtained in a prescribed time range (range gate) at each transmission period Tr. With this configuration, in signal processor 206, a frequency spectrum of which the peak appears at a beat frequency according to a delay time of a reflected wave signal (radar reflected wave) is output. Beat frequency analyzer 208 may multiply a window function coefficient called, for example, Han window or Hamming window, as FFT process. Radar apparatus 10 is able to suppress side lobes that appear around a beat frequency peak by using a window function coefficient.

When the number of N$_{data}$ discrete sample data is not power of two, beat frequency analyzer 208 may, for example, apply FFT process by including zero-padded data as a power-of-two FFT size.

When, for example, mixer 204 has an orthogonal mixer configuration, an I signal component (same-phase component, in-phase component) and a Q signal component (orthogonal phase component, Quadrature component) as outputs of mixer 204. In this case, for example, an AD converted output of an I signal component and an AD converted output of a Q signal component may be obtained by applying LPF to each of the I signal component and the Q signal component of the outputs of mixer 204 and then applying AD conversion to the outputs. When mixer 204 has an orthogonal mixer configuration, beat frequency analyzer 208 is able to detect an aliasing beat frequency in the range from f$_{mb}$ to 2f$_{mb}$ as a negative beat frequency by, for example, setting the cut-off frequency f$_{LPF}$ of LPF 205 to about 2f$_{mb}$, so a distance detection range is expanded. f$_{mb}$ represents a maximum beat frequency detectable without aliasing in accordance with sampling theorem in the FFT process of beat frequency analyzer 208 and may be expressed by, for example, f$_{mb}$=N$_{data}$/(2T$_{RG}$)=f$_{sa}$/2. Here, T$_{RG}$ represents the time range of a range gate, and f$_{sa}$ represents AD sampling frequency.

Here, a beat frequency response output from beat frequency analyzer 208 in z-th signal processor 206, obtained through the m-th chirp pulse transmission, is represented by RFT$_z$(f$_b$, m). Here, f$_b$ represents beat frequency index and corresponds to the index (bin number) of FFT. For example, f$_b$=0, . . . , N$_{data}$/2−1, z=1, . . . , Na, and m=1, . . . , N$_C$. As the beat frequency index f$_b$ decreases, the beat frequency index f$_b$ indicates a beat frequency of which a delay time of a reflected wave signal is small (in other words, a distance to a target is close).

The beat frequency index f$_b$ may be converted to distance information by using the following expression 8. Hereinafter, the beat frequency index f$_b$ is also referred to as "distance index f$_b$".

(Equation 8)

$$R(f_b) = \frac{C_0}{2B_w} f_b \quad (8)$$

Here, B$_w$ represents a frequency modulated band width within a range gate in a chirp signal, and C$_0$ denotes a light velocity.

When mixer 204 has an orthogonal mixer configuration, for example, a signal detected as a negative beat frequency (for example, f$_b$=N$_{data}$/2, . . . , −1) can be regarded as aliasing of a positive beat frequency (f$_b$=N$_{data}$/2, . . . , N$_{data}$−1). For this reason, it may be expressed as, for example, f$_b$=0, . . . , N$_{data}$−1.

Output switch 209 selectively switches and outputs the output of beat frequency analyzer 208 to OC_INDEX-th Doppler analyzer 210 out of Loc Doppler analyzers 210 at each transmission period in accordance with an orthogonal code element index OC_INDEX output from code generator 104. In other words, output switch 209 selects OC_INDEX-th Doppler analyzer 210 at the m-th transmission period Tr.

Signal processor 206 includes, for example, Loc Doppler analyzers 210-1 to 210-Loc. For example, data is input to noc-th Doppler analyzer 210 by output switch 209 at each duration of Loc transmission periods (Loc×Tr). For this reason, noc-th Doppler analyzer 210 performs Doppler analysis at each distance index $f_b$ by using data of Ncode transmission periods (for example, beat frequency response $RFT_z(f_b, m)$ output from beat frequency analyzer 208) within Nc transmission periods. Here, noc is the index of a code element, and noc=1, . . . , Loc.

For example, when Ncode is a power of two value, FFT process may be applied in Doppler analysis. In this case, FFT size is Ncode, and a maximum Doppler frequency at which no aliasing occurs and which is derived from sampling theorem is $\pm 1/(2\text{Loc} \times \text{Tr})$. The Doppler frequency interval of the Doppler frequency index $f_s$ is $1/(\text{Ncode} \times \text{Loc} \times \text{Tr})$, and the range of Doppler frequency index $f_s$ is $f_s = -\text{Ncode}/2, \ldots, 0, \ldots, \text{Ncode}/2 - 1$.

For example, the output $VFT_z^{noc}(f_b, f_s)$ of Doppler analyzer 210 of z-th signal processor 206 is expressed by the following expression 9. j is an imaginary unit, and z=1 to Na.

$$VFT_z^{noc}(f_b, f_s) = \qquad \text{(Equation 9)}$$

$$\sum_{s=0}^{N_{code}-1} RFT_z(f_b, L_{OC} \times s + noc) \exp\left[-j\frac{2\pi s f_s}{N_{code}}\right]$$

When Ncode is not a power of two value, for example, a value may be caused to include zero-padded data to have a power-of-two data size (FFT size) and subjected to FFT process. When, for example, the FFT size in Doppler analyzer 210 in the case where zero-padded data is included is $N_{codewzero}$, the output $VFT_z^{noc}(f_b, f_s)$ of Doppler analyzer 210 in z-th signal processor 206 is expressed by the following expression 10.

(Equation 10)

$$VFT_z^{noc}(f_b, f_s) = \sum_{s=0}^{N_{codewzero}-1} RFT_z(f_b, L_{OC} \times s + noc) \exp\left[-j\frac{2\pi s f_s}{N_{codewzero}}\right]$$

Here, noc is the index of a code element, and noc=1, . . . , Loc. FFT size is $N_{codewzero}$, and a maximum Doppler frequency at which no aliasing occurs and which is derived from sampling theorem is $\pm 1/(2\text{Loc} \times \text{Tr})$. The Doppler frequency interval of the Doppler frequency index $f_s$ is $1/(N_{codewzero} \times \text{Loc} \times \text{Tr})$, and the range of the Doppler frequency index $f_s$ is $f_s = -N_{codewzero}/2, \ldots, 0, \ldots, N_{codewzero}/2 - 1$.

Hereinafter, the case where Ncode is a power of two value will be described as an example. When zero padding is used in Doppler analyzer 210, the same applies and similar effects are obtained when Ncode is replaced with $N_{codewzero}$ in the following description.

Doppler analyzer 210 may multiply a window function coefficient called, for example, Han window or Hamming window, at the time of FFT process. Radar apparatus 10 is able to suppress side lobes that appear around a beat frequency peak by using a window function.

The process in each of the components of signal processor 206 has been described above.

In FIG. 5, CFAR section 211 performs CFAR process (in other words, adaptive threshold determination) by using the outputs of Loc Doppler analyzers 210 of each of first to Na-th signal processors 206 and extracts distance indexes $f_{b\_cfar}$ and Doppler frequency indexes $f_{s\_cfar}$ that give a peak signal.

CFAR section 211, for example, adds the outputs $VFT_z^{noc}(f_b, f_s)$ of Doppler analyzers 210 of each of first to Na-th signal processors 206 in power as expressed by the following expression 11 and performs two-dimensional CFAR process made up of a distance axis and a Doppler frequency axis (which corresponds to a relative speed) or a CFAR process combining one-dimensional CFAR processes. A process described in, for example, NPL 3 may be applied as a two-dimensional CFAR process or a CFAR process combining one-dimensional CFAR processes.

(Equation 11)

$$PowerFT(f_b, f_s) = \sum_{z=1}^{N_a} \sum_{noc=1}^{L_{oc}} |VFT_z^{noc}(f_b, f_s)|^2$$

CFAR section 211 adaptively sets a threshold and outputs distance indexes $f_{b\_cfar}$, Doppler frequency indexes $f_{s\_cfar}$, and received power information $PowerFT(f_{b\_cfar}, f_{s\_cfar})$ with a received power greater than the threshold to aliasing determiner 212.

Next, an example of the operation of aliasing determiner 212 shown in FIG. 5 will be described.

Aliasing determiner 212, for example, performs aliasing determination on Doppler components $VFT_z^{noc}(f_{b\_cfar}, f_{s\_cfar})$ that are the outputs of Doppler analyzers 210 in accordance with the distance indexes $f_{b\_cfar}$ and the Doppler frequency indexes $f_{s\_cfar}$ extracted in CFAR section 211. Here, z=1, . . . , Na, and noc=1, . . . , Loc.

Aliasing determiner 212 may, for example, perform Doppler aliasing determination process on condition that the Doppler range of an assumed target is $\pm 1/(2 \times \text{Tr})$.

Here, when, for example, Ncode is a power of two value, Doppler analyzers 210 apply FFT process to each code element, so each Doppler analyzer 210 performs FFT process by using an output from beat frequency analyzer 208 at a period of ($\text{Loc} \times \text{Tr}$). For this reason, a Doppler range in which no aliasing occurs due to sampling theorem in Doppler analyzers 210 is $\pm 1/(2\text{Loc} \times \text{Tr})$.

Thus, the Doppler range of a target assumed in aliasing determiner 212 is wider than the Doppler range in which no aliasing occurs in Doppler analyzers 210. For example, aliasing determiner 212 performs aliasing determination process by assuming up to a Doppler range $\pm 1/(2 \times \text{Tr})$ that is Loc times as large as the Doppler range $\pm 1/(2\text{Loc} \times \text{Tr})$ in which no aliasing occurs in Doppler analyzers 210.

Hereinafter, an example of aliasing determination process in aliasing determiner 212 will be described.

Here, as an example, the case where the number $N_{CM}$ of multiplexed codes is three and code generator 104 uses three orthogonal codes $\text{Code}_1 = WH_4(3) = [1, 1, -1, -1]$, $\text{Code}_2 = WH_4(4) = [1, -1, -1, 1]$, and $\text{Code}_3 = WH_4(2) = [1, -1, 1, -1]$ out of Walsh-Hadamard codes with the code length Loc=4 will be described.

Aliasing determiner 212, for example, uses one ($= N_{allcode} - N_{CM}$) unused orthogonal code out of $N_{allcode}$ ($=4$) Walsh-Hadamard codes with the code length Loc=4 for aliasing determination. When, for example, the number $N_{CM}$ of multiplexed codes is three and codes for code multiplex transmission, determined by code generator 104, are $\text{Code}_1 = WH_4(3) = [1, 1, -1, -1]$, $\text{Code}_2 = WH_4(4) = [1, -1, -1, 1]$, and $\text{Code}_3 = WH_4(2) = [1, -1, 1, -1]$, an unused orthogonal code is $\text{UnCode}_1 = WH_4(1) = [1, 1, 1, 1]$.

When, for example, radar apparatus 10 performs code multiplex transmission by using orthogonal codes with the code length Loc=4, Doppler analyzers 210 apply FFT process to each code element as described above, so each Doppler analyzer 210 performs FFT process by using an output from beat frequency analyzer 208 at a period of (Loc×Tr)=(4×Tr). Thus, a Doppler range in which no aliasing occurs due to sampling theorem in Doppler analyzers 210 is ±1/(2Loc×Tr)=±1/(8×Tr).

Aliasing determiner 212 may, for example, perform determination as to aliasing in the range that is as wide as the product of the code length Loc of the orthogonal code sequence and the range of Doppler analysis (Doppler range) in Doppler analyzers 210. For example, aliasing determiner 212 performs aliasing determination process by assuming the Doppler range=±1/(2×Tr), which is four (=Loc) times as large as the Doppler range±1/(8×Tr) in which no aliasing occurs in Doppler analyzers 210.

Figure 7:
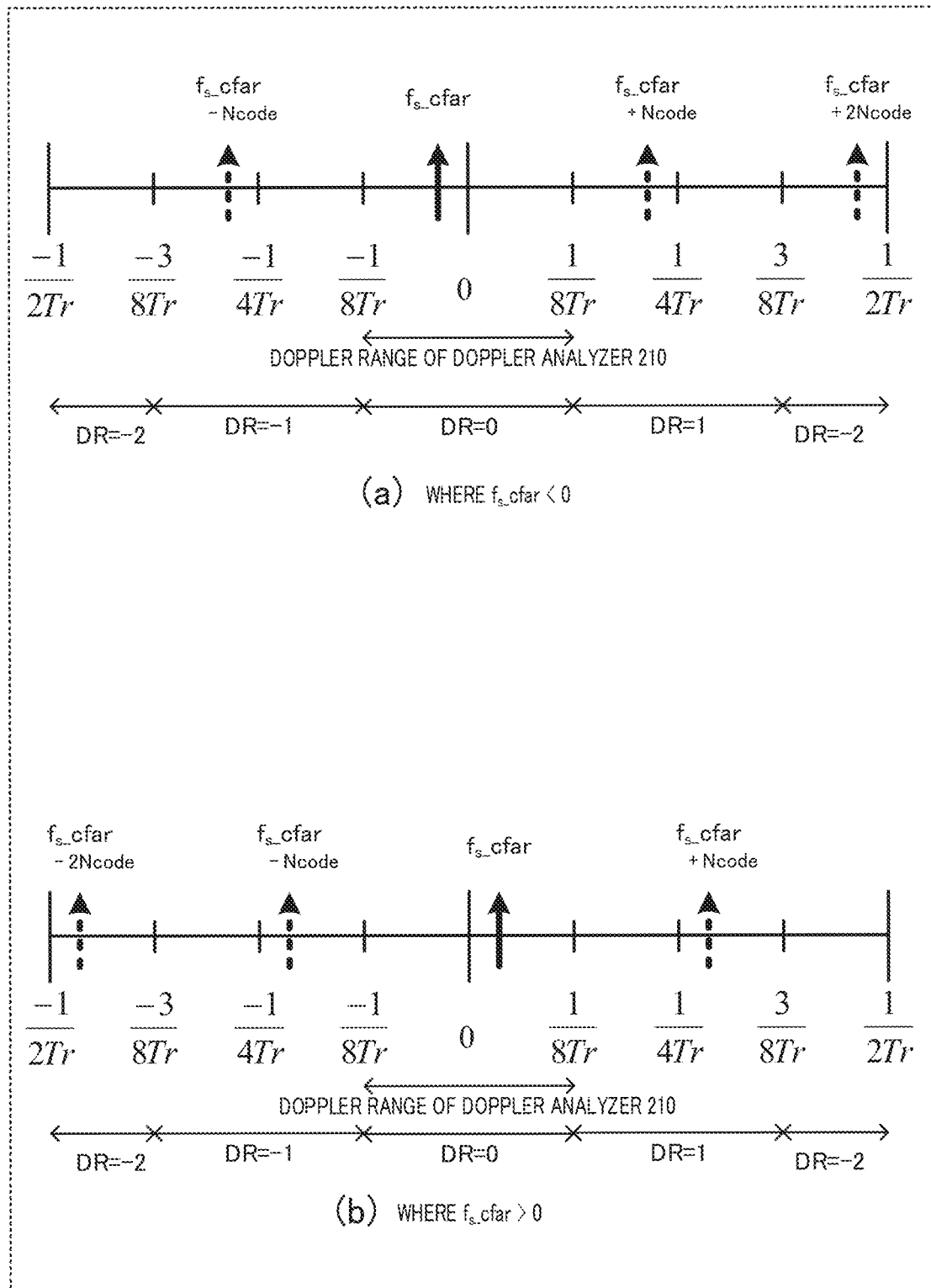
FIG. 7 illustrates diagrams showing examples of Doppler aliasing determination.

Here, there is a possibility that Doppler components $VFT_z^{noc}(f_{b\_cfar}, f_{s\_cfar})$ that are outputs of Doppler analyzers 210 associated with the distance indexes $f_{b\_cfar}$ and the Doppler frequency indexes $f_{s\_cfar}$ extracted in CFAR section 211 include, for example, Doppler components including aliasing as shown in (a) and (b) of FIG. 7 in the Doppler range of ±1/(2×Tr).

For example, as shown in (a) of FIG. 7, there is a possibility that, where $f_{s\_cfar}$<0, Doppler components $VFT_z^{noc}(f_{b\_cfar}, f_{s\_cfar})$ are four (=Loc) Doppler components, e.g., $f_{s\_cfar}$−Ncode, $f_{s\_cfar}$, $f_{s\_cfar}$+Ncode, and $f_{s\_cfar}$+2Ncode in the Doppler range±1/(2×Tr).

For example, as shown in (b) of FIG. 7, there is a possibility that, where $f_{s\_cfar}$>0, Doppler components $VFT_z^{noc}(f_{b\_cfar}, f_{s\_cfar})$ are four (=Loc) Doppler components, e.g., $f_{s\_cfar}$−2Ncode, $f_{s\_cfar}$−Ncode, $f_{s\_cfar}$, and $f_{s\_cfar}$+Ncode in the Doppler range±1/(2×Tr).

Aliasing determiner 212, for example, performs code separation process in the Doppler range±1/(2×Tr) as shown in (a) and (b) of FIG. 7 by using an unused orthogonal code. For example, aliasing determiner 212 may correct a change in phase of four (=Loc) Doppler components including aliasing as shown in (a) and (b) of FIG. 7 over an unused orthogonal code.

Aliasing determiner 212, for example, determines whether each Doppler component includes aliasing in accordance with received powers of Doppler components code-demultiplexed by using the unused orthogonal code. For example, aliasing determiner 212 may detect a Doppler component with a minimum received power out of the Doppler components including aliasing and determine the detected Doppler component as a true Doppler component. In other words, aliasing determiner 212 may determine that, of the Doppler components including aliasing, Doppler components with other received powers different from the minimum received power are false Doppler components.

Through the aliasing determination process, aliasing determiner 212 is able to reduce the ambiguity of the Doppler range including aliasing. Through the aliasing determination process, aliasing determiner 212 is able to expand the range in which a Doppler frequency can be detected without ambiguity to a range higher than or equal to −1/(2Tr) and lower than 1/(2Tr) as compared to the Doppler range in Doppler analyzers 210 (for example, a range higher than or equal to −1/(8Tr) and lower than 1/(8Tr).

As a result, when code separation is performed by using an unused orthogonal code, for example, a phase change in true Doppler component is properly corrected, and orthogonality between each orthogonal code for code multiplex transmission and an unused orthogonal code is maintained.

Thus, an unused orthogonal code and a code multiplex transmission signal are uncorrelated, and aliasing determiner 212 detects a received power of about noise level.

On the other hand, for example, a phase change in a false Doppler component is erroneously corrected, and orthogonality between each orthogonal code for code multiplex transmission and an unused orthogonal code is not maintained. Thus, a correlation component (interference component) occurs between the unused orthogonal code and the code multiplex transmission signal, so, for example, aliasing determiner 212 detects a received power higher than noise level.

Thus, as described above, aliasing determiner 212 may determine a Doppler component with a minimum received power out of Doppler components code-demultiplexed by using an unused orthogonal code as a true Doppler component and determine the other Doppler components with a received power different from the minimum received power as false Doppler components.

For example, aliasing determiner 212 corrects a phase change in Doppler component including aliasing in accordance with outputs of Doppler analyzers 210 in each antenna channel processor 201 and calculates received powers $DeMulUnCode_{nuc}(f_{b\_cfar}, f_{s\_cfar}$ DR) after code separation using an unused orthogonal code $UnCode_{nuc}$ in accordance with the following expression 12.

(Equation 12)

$$DeMulUnCode_{nuc}(f_{b\_cfar}, f_{s\_cfar}, DR) = \sum_{z=1}^{Na} |(UnCode_{nuc})^* \cdot \{\beta(DR) \otimes \alpha(f_{s\_cfar}) \otimes VFTALL_z(f_{b\_cfar}, f_{s\_cfar})\}^T|^2$$

Aliasing determiner 212 calculates the sum total of received powers after code separation using the unused orthogonal code $UnCode_{nuc}$ for the outputs of Doppler analyzers 210 in all antenna channel processors 201 by using the expression 12. With this configuration, aliasing determiner 212 is able to improve the accuracy of aliasing determination even when a received signal level is low. Aliasing determiner 212 may calculate received powers after code separation using the unused orthogonal code from the outputs of Doppler analyzers 210 in some antenna channel processors 201 instead of the expression 12. In this case as well, aliasing determiner 212 is able to, for example, maintain the accuracy of aliasing determination and reduce operation throughput in the range in which a received signal level is sufficiently high.

In the expression 12, nuc=1, . . . , $N_{allcode}$−$N_{CM}$. DR is an index indicating a Doppler aliasing range and, for example, takes an integer value in the range DR=ceil[−Loc/2], ceil[−Loc/2]+1, . . . , 0, . . . , ceil[Loc/2]−1.

In the expression 12, the operator "⊗" denotes the product of vectors having equal number of elements element by element. For example, the product of n-dimensional vectors A=[$a_1$, . . . , $a_n$] and B=[$b_1$, . . . , $b_n$] element by element is expressed by the following expression 13.

$$A \otimes B = [a_1, \ldots, a_n] \otimes [b_1, \ldots, b_n] = [a_1 b_1, \ldots, a_n b_n] \quad \text{(Equation 13)}$$

In the expression 12, the operator "•" represents a vector inner product operator. In the expression 12, character superscript T denotes vector transposition, and character superscript * (asterisk) denotes complex conjugate operator.

In the expression 12, $\alpha(f_{s\_cfar})$ represents "Doppler phase correction vector". In Doppler phase correction vector $\alpha(f_{s\_cfar})$, when, for example, a Doppler frequency index $f_{s\_cfar}$ extracted in CFAR section 211 falls within the output range (in other words, Doppler range) of Doppler analyzer 210, in which no Doppler aliasing is included, aliasing determiner 212 corrects a Doppler phase rotation amount due to time differences of Doppler analysis among Loc Doppler analyzers 210.

For example, the Doppler phase correction vector $\alpha(f_{s\_cfar})$ is expressed by the following expression 14. The Doppler phase correction vector $\alpha(f_{s\_cfar})$ expressed by the expression 14 is, for example, a vector of which elements are Doppler phase correction coefficients used to correct phase rotation amounts in Doppler components of Doppler frequency indexes $f_{s\_cfar}$, which occur due to time delays of Tr, 2Tr, ..., (Loc-1)Tr in an output $VFT_z^2(f_{b\_cfar}, f_{s\_cfar})$ of second Doppler analyzer 210 to an output $VFT_z^{Loc}(f_{b\_cfar}, f_{s\_cfar})$ of Loc-th Doppler analyzer 210 with reference to a Doppler analysis time of an output $VFT_z^1(f_{b\_cfar}, f_{s\_cfar})$ of first Doppler analyzer 210.

(Equation 14)

$$\alpha(f_{s\_cfar}) = \left[1, \exp\left\{-j\frac{2\pi f_{s\_cfar}}{N_{code}}\frac{1}{Loc}\right\},\right.$$
$$\left.\exp\left\{-j\frac{2\pi f_{s\_cfar}}{N_{code}}\frac{2}{Loc}\right\}, \ldots, \exp\left\{-j\frac{2\pi f_{s\_cfar}}{N_{code}}\frac{Loc-1}{Loc}\right\}\right]$$

In the expression 12, $\beta(DR)$ represents "aliasing phase correction vector". An aliasing phase correction vector $\beta(DR)$ is, for example, used to correct Doppler phase rotation amounts of integer multiples of $2\pi$ out of Doppler phase rotation amounts due to time differences of Doppler analysis among Loc Doppler analyzers 210 in consideration of the case where there is Doppler aliasing.

For example, the aliasing phase correction vector $\beta(DR)$ is expressed by the following expression 15.

(Equation 15)

$$\beta(DR) = \left[1, \exp\left(-j2\pi DR\frac{1}{Loc}\right),\right.$$
$$\left.\exp\left(-j2\pi DR\frac{2}{Loc}\right), \ldots, \exp\left(-j2\pi DR\frac{Loc-1}{Loc}\right)\right]$$

When, for example, Loc=4, DR takes an integer value of −2, −1, 0, or 1, and the aliasing phase correction vectors $\beta(DR)$ are expressed by the expression 16, the expression 17, the expression 18, and the expression 19.

(Equation 16)

$\beta(-2) = [1, -1, 1, -1]$ (Equation 17)

$\beta(-1) = \left[1, \exp\left(j\frac{\pi}{2}\right), \exp(j\pi), \exp\left[j\pi\frac{3}{2}\right]\right]$ (Equation 18)

$\beta(0) = [1, 1, 1, 1]$ (Equation 19)

$\beta(1) = \left[1, \exp\left(-j\frac{\pi}{2}\right), \exp(-j\pi), \exp\left[-j\pi\frac{3}{2}\right]\right]$ When, for example, Loc=4, the Doppler range (for example, −⅛Tr to +⅛Tr) in which Doppler components of Doppler frequency indexes $f_{s\_cfar}$, which are outputs of Doppler analyzers 210, are detected corresponds to DR=0 in (a) and (b) of FIG. 7. Through Doppler phase rotation of integer multiples of $2\pi$ for the Doppler frequency indexes $f_{s\_cfar}$ of DR=0 (for example, $\beta(1)$, $\beta(-1)$, and $\beta(-2)$), aliasing determiner 212 calculates Doppler components of the Doppler range corresponding to DR=1 (for example, ⅛Tr to ⅜Tr), Doppler components of the Doppler range corresponding to DR=−1 (for example, −⅜Tr to −⅛Tr), and Doppler components of the Doppler range corresponding to DR=−2 (for example, −½Tr to −⅜Tr, and ⅜Tr to ½Tr).

In the expression 12, $VFTALL_z(f_{b\_cfar}, f_{s\_cfar})$, for example, expresses components $VFT_z^{noc}(f_{b\_cfar}, f_{s\_cfar})$ (where noc=1, ..., Loc) associated with a distance index $f_{b\_cfar}$ and a Doppler frequency index $f_{s\_cfar}$ extracted in CFAR section 211 from among outputs $VFT_z^{noc}(f_b, f_s)$ of Loc Doppler analyzers 210 in z-th antenna channel processor 201 in vector form as expressed by the following expression 20.

$VFTALL_z(f_{b\_cfar}, f_{s\_cfar}) = [VFT_z^1(f_{b\_cfar}, f_{b\_cfar}), VFT_z^2$
$(f_{b\_cfar}, f_{s\_cfar}), \ldots, VFT_z^{Loc}(f_{b\_cfar}, f_{s\_cfar})]$   (Equation 20)

For example, aliasing determiner 212 calculates received powers $DeMulUnCode_{nuc}(f_{b\_cfar}, f_{s\_cfar}, DR)$ after code separation using an unused orthogonal code $UnCode_{nuc}$, of which a phase change of Doppler components including aliasing is corrected, in each of the ranges DR=ceil[−Loc/2], ceil[−Loc/2]+1, ..., 0, ..., ceil[Loc/2]−1 in accordance with the expression 12.

Aliasing determiner 212 detects DR of which a received power $DeMulUnCode_{nuc}(f_{b\_cfar}, f_{s\_cfar}, DR)$ is minimum among the ranges of DR. Hereinafter, as expressed by the following expression 21, of the ranges of DR, DR of which a received power $DeMulUnCode_{nuc}(f_{b\_cfar}, f_{s\_cfar}, DR)$ is minimum is represented by "$DR_{min}$".

(Equation 21)

$$DRmin = \left\{\arg DR \left| \min_{DR=ceil[-Loc/2,\ldots,ceil[Loc/2]-1} DeMulUnCode_{nuc}(f_{b\_cfar}, f_{s\_cfar}, DR)\right.\right\}$$

Hereinafter, the reason why Doppler aliasing determination is possible through the above-described aliasing determination process will be described.

A radar transmission signal component transmitted from ncm-th transmission antenna 106 (for example, Tx #ncm) and included in $VFTALL_z(f_{b\_cfar}, f_{s\_cfar})$ expressed by the expression 20 is, for example, expressed by the following expression 22 when noise components are ignored.

$\beta(DR_{true})^* \otimes \alpha(f_{s\_cfar})^* \otimes \gamma_{z,ncm} Code_{ncm}$   (Equation 22)

Here, $\gamma_{z,ncm}$ represents a complex reflection coefficient in the case where a signal that is a radar transmission signal transmitted from ncm-th transmission antenna 106 and reflected from a target is received by z-th antenna channel processor 201. $DR_{true}$ represents an index indicating a true Doppler aliasing range. $DR_{true}$ is an index value in the range of ceil[−Loc/2], ceil[−Loc/2]+1, . . . , 0, . . . , ceil[Loc/2]−1. Hereinafter, the reason why it is determined that $DR_{min}=DR_{true}$ will be described.

A total sum PowDeMul(nuc, DR, $DR_{true}$) of received powers after code separation using the unused orthogonal code $UnCode_{nuc}$ from radar transmission signal components transmitted from first to $N_{CM}$-th transmission antennas 106 is expressed by the following expression 23.

(Equation 23)

$$PowDeMul(nuc, DR, DR_{true}) =$$
$$\sum_{ncm=1}^{N_{CM}} |UnCode_{nuc}^* \cdot \{\beta(DR) \otimes \alpha(f_{b\_cfar}) \otimes \beta(DR_{true})^* \otimes \alpha(f_{s\_cfar})^* \otimes \gamma_{z,ncm} Code_{ncm}\}^T|^2 =$$
$$\sum_{ncm=1}^{N_{CM}} |\gamma_{z,ncm} UnCode_{nuc}^* \cdot \{\beta(DR) \otimes \beta(DR_{true})^* \otimes Code_{ncm}\}^T|^2 =$$
$$\sum_{ncm=1}^{N_{CM}} |\gamma_{z,ncm} \{\beta(DR) \otimes (DR_{true})^* \otimes UnCode_{nuc}^*\} \cdot \{Code_{ncm}\}^T|^2$$

PowDeMul(nuc, DR, $DR_{true}$) expressed by the expression 23 corresponds to an evaluation value of the term |$(UnCode_{nuc})^* \cdot \{\beta(DR) \otimes \alpha(f_{s\_cfar}) \otimes VFTALL_z(f_{b\_cfar}, f_{s\_cfar})\}^T|^2$ in the expression 12.

In the expression 23, when $DR=DR_{true}$, a correlation value between the unused orthogonal code $UnCode_{nuc}$ and an orthogonal code $Code_{ncm}$ for code multiplex transmission is zero (for example, $UnCode_{nuc}^* \cdot \{Code_{ncm}\}^T=0$), so PowDeMul(nuc, DR, $DR_{true}$)=0.

On the other hand, in the expression 23, when $DR \neq DR_{true}$, PowDeMul(nuc, DR, $DR_{true}$) depending on the correlation value between $\beta(DR) \otimes \beta(DR_{true})^* \otimes UnCode_{nuc}^*$ and an orthogonal code $Code_{ncm}$ for code multiplex transmission is output. Here, when PowDeMul (nuc, DR, $DR_{true}$) is not zero for each $UnCode_{nuc}$, e.g., when, for example, the following expression 24 is satisfied and $DR=DR_{true}$, the power PowDeMul(nuc, $DR_{true}$, $DR_{true}$) is minimum, and aliasing determiner 212 is able to detect $DR_{true}$ (=$DR_{min}$). For example, aliasing determiner 212 may perform Doppler aliasing determination in accordance with the expression 12.

(Equation 24)

$$\sum_{nuc=1}^{N_{allcode}-N_{CM}} PowDeMul(nuc, DR, DR_{true}) > 0$$

For example, to satisfy the expression 24, the term $\beta(DR)^* \otimes \beta(DR_{true}) \otimes UnCode_{nuc}$ may not coincide with another unused orthogonal code $UnCode_{nuc2}$. Here, nuc2≠nuc.

Therefore, when the number of unused orthogonal codes is one, the expression 24 is satisfied. When the number of unused orthogonal codes is multiple, for example, code generator 104 may select codes for code multiplex transmission such that the term $\beta(DR)^* \otimes \beta(DR_{true}) \otimes UnCode_{nuc}$ does not coincide with another unused orthogonal code.

Here, when a code, such as a Walsh-Hadamard code and an orthogonal M-sequence code, is used, orthogonal codes with the code length Loc may include a set of codes of which the odd-numbered code elements are the same and the even-numbered code elements are inverted in sign between mutual codes.

On the other hand, $\beta(0)=[1, 1, . . . , 1]$, and $\beta(-Loc/2)=[1, -1, 1, -1, . . . , 1, -1]$, so the term $\beta(0)^* \otimes \beta(-Loc/2) \otimes UnCode_{nuc}$ is converted to a code in which the odd-numbered code elements of $UnCode_{nuc}$ are the same and the even-numbered code elements of $UnCode_{nuc}$ are inverted in sign.

Therefore, when the number ($N_{allcode}-N_{CM}$) of unused orthogonal codes is greater than or equal to two, code generator 104 may, for example, select codes for code multiplex transmission or unused orthogonal codes such that, of orthogonal codes with the code length Loc, a set of codes of which any one of the odd-numbered code elements and the even-numbered code elements are the same and the other one of the odd-numbered code elements and the even-numbered code elements are inverted in sign between mutual codes is not included in the unused orthogonal codes.

For example, Walsh-Hadamard codes with the code length Loc=4 include $WH_4(1)=[1, 1, 1, 1]$ and $WH_4(2)=[1, -1, 1, -1]$, and $\beta(0)^* \otimes \beta(-Loc/2) \otimes WH_4(1)=WH_4(2)$ or $\beta(0)^* \otimes \beta(-Loc/2) \otimes WH_4(2)=WH_4(1)$ holds. For this reason, for example, code generator 104 may select codes for code multiplex transmission or unused orthogonal codes such that the unused orthogonal codes do not include a set of $WH_4(1)$ and $WH_4(2)$. Since $WH_4(3)=[1, 1, -1, -1]$ and $WH_4(4)=[1, -1, -1, 1]$ are also in a similar relation, code generator 104 may, for example, select codes for code multiplex transmission or unused orthogonal codes such that the unused orthogonal codes do not include a set of $WH_4(3)$ and $WH_4(4)$.

When the number of unused orthogonal codes $UnCode_{nuc}$ is multiple, received powers DeMulUnCodeAll($f_{b\_cfar}$, $f_{s\_cfar}$, DR) after code separation using all the unused orthogonal codes may be used as expressed by the following expression 25 instead of the received powers $DeMulUnCode_{nuc}(f_{b\_cfar}, f_{s\_cfar}, DR)$.

(Equation 24)

$$DeMulUnCodeAll(f_{b\_cfar}, f_{s\_cfar}, DR) =$$
$$\sum_{nun=1}^{N_{allcode}-N_{CM}} DeMulUnCode_{nun}(f_{b\_cfar}, f_{s\_cfar}, DR)$$

By obtaining received powers after code separation using all the unused orthogonal codes, aliasing determiner 212 is able to improve the accuracy of aliasing determination even when received signal level is low.

For example, aliasing determiner 212 calculates DeMulUnCodeAll($f_{b\_cfar}$, $f_{s\_cfar}$, DR) in each range DR=ceil[-Loc/2], ceil[-Loc/2]+1, . . . , 0, . . . , ceil[Loc/2]−1 and detects DR of which a received power DeMulUnCodeAll ($f_{b\_cfar}$, $f_{s\_cfar}$, DR) is minimum (in other words, $DR_{min}$). When the expression 25 is used, a received power that is minimum in a DR range is represented by "$DR_{min}$" as expressed by the following expression 26 hereinafter.

$$DR\text{min} = \left\{ \arg DR \,\Big|\, \min_{DR=} DeMulUnCodeAll(f_{b\_cfar}, f_{s\_cfar}, DR) \right\} \quad \text{(Equation 26)}$$

Aliasing determiner 212 may, for example, perform a process of determining (in other words, measuring) the probability of aliasing determination by comparing a minimum received power $DeMulUnCode_{nuc}$($f_{b\_cfar}$, $f_{s\_cfar}$, $DR_{min}$) after code separation using an unused orthogonal code $UnCode_{nuc}$ with a received power. In this case, aliasing determiner 212 may, for example, determine the probability of aliasing determination in accordance with the following expressions 27 and 28.

$$DeMulUnCode_{nuc}(f_{b\_cfar}, f_{s\_cfar}, DR\text{ min}) < \text{Threshold}_{DR} \times \text{PowerFT}(f_{b\_cfar}, f_{s\_cfar}) \quad \text{(Equation 27)}$$

$$DeMulUnCode_{nuc}(f_{b\_cfar}, f_{s\_cfar}, DR_{min}) \geq \text{Threshold}_{DR} \times \text{PowerFT}(f_{b\_cfar}, f_{s\_cfar}) \quad \text{(Equation 28)}$$

When, for example, the minimum received power $DeMulUnCode_{nuc}$($f_{b\_cfar}$, $f_{s\_cfar}$, $DR_{min}$) after code separation using the unused orthogonal code $UnCode_{nuc}$ is lower than a value obtained by multiplying a received power value PowerFT($f_{b\_cfar}$, $f_{s\_cfar}$) of a distance index $f_{b\_cfar}$ and a Doppler frequency index $f_{b\_cfar}$ by a predetermined value $\text{Threshold}_{DR}$ in CFAR section 211 (for example, the expression 27), aliasing determiner 212 determines that aliasing determination is sufficiently probable. In this case, radar apparatus 10 may, for example, perform subsequent processes (for example, code separation process).

On the other hand, when, for example, the minimum received power $DeMulUnCode_{nuc}$($f_{b\_cfar}$, $f_{s\_cfar}$, $DR_{min}$) after code separation using the unused orthogonal code $UnCode_{nuc}$ is equal to or higher than the value obtained by multiplying the received power value PowerFT($f_{b\_cfar}$, $f_{s\_cfar}$) by the $\text{Threshold}_{DR}$ (for example, the expression 28), aliasing determiner 212 determines that the accuracy of aliasing determination is not sufficient (for example, noise components). In this case, radar apparatus 10, for example, may omit to perform subsequent processes (for example, code separation process).

Through such a process, aliasing determiner 212 is able to reduce determination errors in aliasing determination and remove noise components. The predetermined value $\text{Threshold}_{DR}$ may be set within, for example, the range of greater than zero and less than one. As an example, in consideration of the fact that noise components are included, $\text{Threshold}_{DR}$ may be set within the range of about 0.1 to about 0.5.

When the number of unused orthogonal codes $UnCode_{nuc}$ is multiple, aliasing determiner 212 may perform a process of determining (in other words, measuring) the probability of aliasing determination by comparing DeMulUnCodeAll ($f_{b\_cfar}$, $f_{s\_cfar}$, DR), instead of the received power $DeMulUnCode_{nuc}$($f_{b\_cfar}$, $f_{s\_cfar}$, DR), with a received power. In this case, aliasing determiner 212 may, for example, determine the probability of aliasing determination by using DeMulUnCodeAll($f_{b\_cfar}$, $f_{s\_cfar}$, DR) instead of $DeMulUnCode_{nuc}$($f_{b\_cfar}$, $f_{s\_cfar}$, DR) in the expressions 27 and 28. By obtaining a received power after code separation using all the unused orthogonal codes, aliasing determiner 212 is able to improve the accuracy of the probability of aliasing determination even when received signal level is low.

A calculation expression for a received power $DeMulUnCode_{nuc}$($f_{b\_cfar}$, $f_{s\_cfar}$, DR) after code separation using an unused orthogonal code $UnCode_{nuc}$ may be, for example, the following expression 29 instead of the expression 12.

(Equation 24)

$$DeMulUnCode_{nuc}(f_{b\_cfar}, f_{s\_cfar}, DR) = \sum_{z=1}^{Na} |(\beta(DR) \otimes UnCode_{nuc})^* \cdot \{\alpha(f_{s\_cfar}) \otimes VFTALL_z(f_{b\_cfar}, f_{s\_cfar})\}^T|^2$$

In the expression 29, the term $\beta(DR) \otimes UnCode_{nuc}$ does not depend on the index of Doppler component (Doppler frequency index) $f_s$, so, for example, it is possible to reduce computation in aliasing determiner 212 by providing a table in advance.

An example of the operation of aliasing determiner 212 has been described.

Next, an example of the operation of multiplexed code demultiplexer 213 will be described.

Multiplexed code demultiplexer 213 performs a process of separating a code multiplexed signal in accordance with an aliasing determination result in aliasing determiner 212 and codes for code multiplex transmission.

For example, multiplexed code demultiplexer 213 performs a code separation process on Doppler components $VFTALL_z$($f_{b\_cfar}$, $f_{s\_cfar}$) that are the outputs of Doppler analyzers 210 associated with a distance index $f_{b\_cfar}$ and a Doppler frequency index $f_{s\_cfar}$ extracted in CFAR section 211 in accordance with an aliasing phase correction vector $\beta(DR_{min})$ using $DR_{min}$ that is an aliasing determination result in aliasing determiner 212 as expressed by the following expression 30. Aliasing determiner 212 is able to determine an index that is a true Doppler aliasing range (in other words, determine that $DR_{min} = DR_{true}$) in a Doppler range higher than or equal to $-1/(2Tr)$ and lower than $1/(2Tr)$, multiplexed code demultiplexer 213 is able to zero a correlation value between orthogonal codes used for code multiplexing in the Doppler range higher than or equal to $-1/(2Tr)$ and lower than $1/(2Tr)$. Therefore, multiplexed code demultiplexer 213 is able to perform a separation process with suppressed interference between code multiplexed signals.

$$DeMul_z^{ncm}(f_{b\_cfar}, f_{s\_cfar}) = (Code_{ncm})^* \bullet \{\beta(DR_{min}) \otimes \alpha(f_{s\_cfar}) \otimes VFTALL_z(f_{b\_cfar}, f_{s\_cfar})\}^Y \quad \text{(Equation 30)}$$

Here, $DeMul_z^{ncm}$($f_{b\_cfar}$, $f_{s\_cfar}$) is an output (for example, a code separation result) after code separation from a code multiplexed signal using an orthogonal code $Code_{ncm}$ for an output from Doppler analyzer 210 for a distance index $f_{b\_cfar}$ and a Doppler frequency index $f_{s\_cfar}$ in z-th antenna channel processor 201. z=1, . . . , Na, and ncm=1, . . . , $N_{CM}$ ($N_{Tx}$).

Through the above-described code separation process, radar apparatus 10 is able to obtain a signal separated from a signal code-multiplex transmitted by using an orthogonal code $Code_{ncm}$ assigned to ncm-th transmission antenna Tx #ncm in accordance with an aliasing determination result assuming up to the Doppler range $\pm 1/(2 \times Tr)$ that is Loc times as large as the Doppler range±1/(2Loc×Tr), in which no aliasing occurs in Doppler analyzer 210, in aliasing determiner 212.

Radar apparatus 10, for example, performs Doppler phase correction including Doppler aliasing (for example, a process based on aliasing phase correction vector $\beta(DR_{min})$) on the output of Doppler analyzer 210 for each code element during code separation process. For this reason, mutual interference between code multiplexed signals can be, for example, reduced to about noise level. In other words, radar apparatus 10 is able to reduce inter-code interference and suppress influences on the deterioration of detection performance in radar apparatus 10.

An example of the operation of multiplexed code demultiplexer 213 has been described.

In FIG. 5, direction estimator 214 performs target direction estimation process in accordance with a code separation result $DeMul_z^{ncm}(f_{b\_cfar}, f_{s\_cfar})$ input from multiplexed code demultiplexer 213 for the output of Doppler analyzer 210, associated with a distance index $f_{b\_cfar}$ and a Doppler frequency index $f_{s\_cfar}$.

Direction estimator 214 may, for example, perform direction estimation (DOA) by using a signal $DeMul_z^{ncm}(f_{b\_cfar}, f_{s\_cfar})$ obtained through code separation process from a code multiplexed signal transmitted from transmission antennas 106 (for example, ncm=1, . . . , $N_{Tx}$).

[Example of Antenna Arrangement]

Radar apparatus 10, for example, employs an arrangement of transmission antennas 106 and reception antennas 202 that improve angular resolution and suppress grating lobes or side lobes by increasing the aperture length of a virtual reception array.

Hereinafter, an example of antenna arrangement of transmission antennas 106 and reception antennas 202 and an example of direction estimation process in direction estimator 214 in the case where each example of arrangement is applied will be described.

In the following examples of arrangement, in radar apparatus 10, the arrangement of transmission antennas 106 may be replaced with the arrangement of reception antennas 202, and the arrangement of reception antennas 202 may be replaced with the arrangement of transmission antennas 106. In radar apparatus 10, even when an antenna arrangement is interchanged between transmission antennas 106 and reception antennas 202, similar effects to those of the following examples of arrangement are obtained.

Alternatively, the arrangement of radar apparatus 10 may be such that a horizontal direction (which corresponds to, for example, a first direction) and a vertical direction (which corresponds to, for example, a second direction perpendicular to the first direction) in the following examples of arrangement are interchanged. When the horizontal direction and the vertical direction are interchanged in an antenna arrangement, effects resulting from the configuration in which the horizontal direction and the vertical direction are interchanged in the following examples of arrangement are obtained with radar apparatus 10.

An MIMO antenna arrangement according to the present embodiment is, for example, an arrangement that satisfies the following condition (for example, Condition 1 or Condition 2). Hereinafter, each of Condition 1 and Condition 2 will be described.

<Condition 1>

(1) $N_{Tx}$ transmission antennas 106 are arranged in the horizontal direction (which corresponds to, for example, the first direction) and the vertical direction (which corresponds to, for example, the second direction perpendicular to the first direction). Of $N_{Tx}$ transmission antennas 106, one transmission antenna 106 is arranged so as to be overlappingly included in both transmission antennas 106 arranged in the horizontal direction and transmission antenna 106 arranged in the vertical direction.

(2) Of Na reception antennas 202, (Na−Nz) reception antennas 202 other than Nz (Nz≥1) reception antennas 202 are arranged in the horizontal direction and the vertical direction. Of (Na−Nz) reception antennas 202, one reception antenna 202 is arranged so as to be overlappingly included in both reception antennas 202 arranged in the horizontal direction and reception antennas 202 arranged in the vertical direction.

(3) The antenna spacings of transmission antennas 106 arranged in the horizontal direction are set so as to be wider than the aperture length of reception antennas 202 (which correspond to, for example, first antennas) arranged in the horizontal direction. At least one of the antenna spacings of reception antennas 202 arranged in the horizontal direction is set to a horizontal base spacing (or a prescribed spacing) $D_H$. The antenna spacings of transmission antennas 106 and the antenna spacings of reception antennas 202 each may be a spacing between the position centers of the antennas, may be a spacing between the feeding points of antennas, or may be a spacing based on the shape of each antenna (for example, the spacing between the ends of the antennas or the spacing between the right ends of the antennas). A spacing may be read as distance.

(4) At least one of Nz reception antennas 202 (which correspond to, for example, third antennas) is arranged at a vertical position different from a vertical position (a position on a vertical axis) at which reception antennas 202 arranged in the horizontal direction are arranged and at a horizontal position (a position on a horizontal axis) adjacent at the horizontal base spacing $D_H$ to reception antennas 202 (for example, second antennas) arranged in the vertical direction.

Hereinafter, an example of Condition 1 will be described.

Regarding (1) of Condition 1, for example, $N_{Tx}$ transmission antennas 106 are arranged in any one of an L shape ($N_{Tx}$≥3), a T shape ($N_{Tx}$≥4), and a cross shape ($N_{Tx}$≥5).

Figure 8:
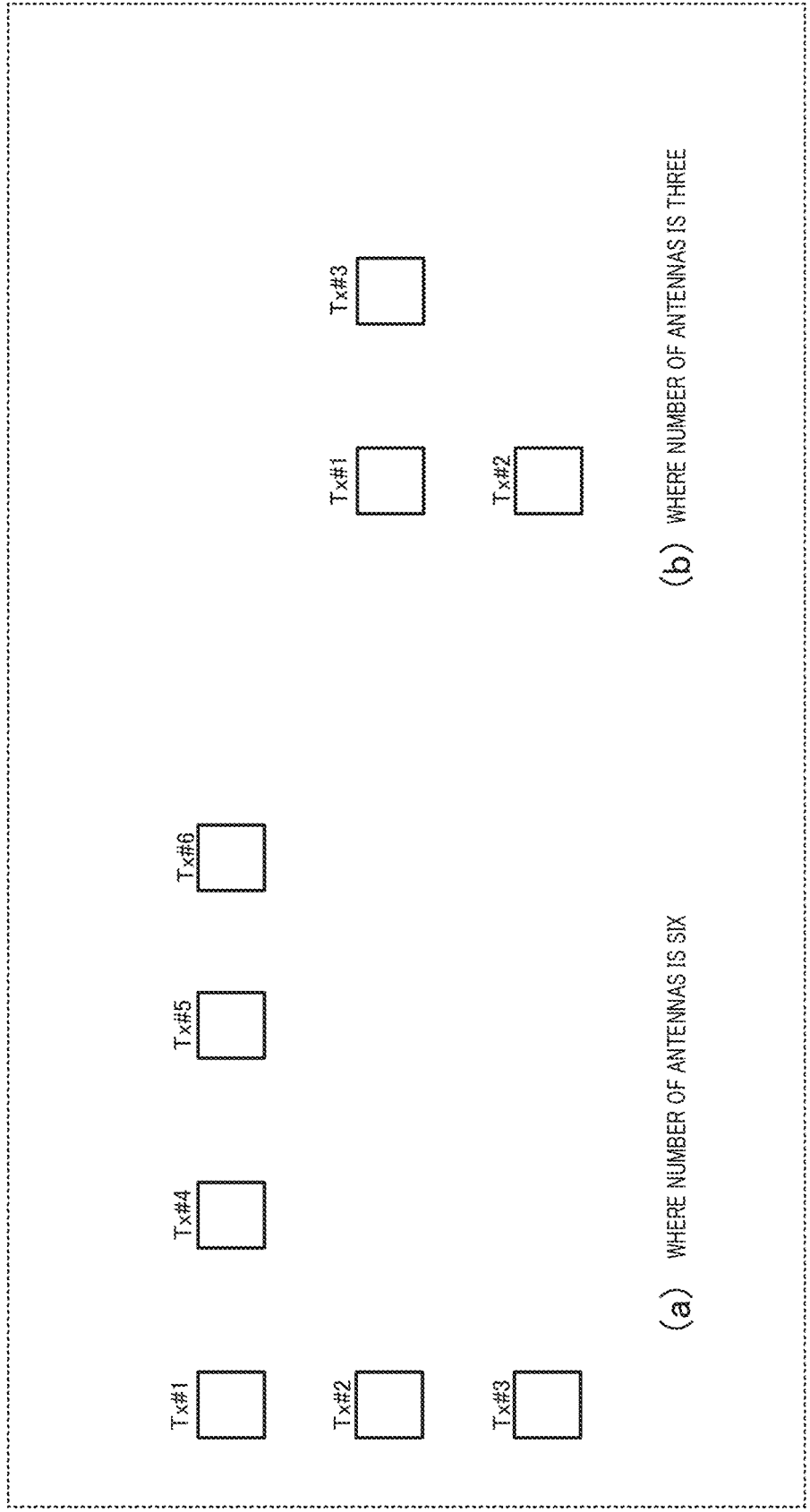
FIG. 8 illustrates diagrams each showing an example of an antenna arrangement.

(a) of FIG. 8 shows an example of an L-shape arrangement in the case where $N_{Tx}$=6. (a) of FIG. 8 shows an equal spacing arrangement; however, the arrangement is not limited thereto. The arrangement may be an unequal spacing arrangement. The arrangement of $N_{Tx}$ transmission antennas 106 may be such that the arrangement of (a) of FIG. 8 is rotated by a selected angle (for example, 90°, 180°, or 270°). Alternatively, the arrangement of $N_{Tx}$ transmission antennas 106 may be such that the above-described arrangement is mirror-inverted.

(a) of FIG. 8 shows a state where, of transmission antennas 106, the number $Nt_H$ of antennas arranged in the horizontal direction is four and the number $Nt_V$ of antennas arranged in the vertical direction is three; however, a combination of $Nt_H$ and $Nt_V$ is not limited thereto. For example, the combination may be a combination that satisfies the relationships that $Nt_H$≥2, $Nt_V$≥2, and $Nt_H+Nt_V=N_{Tx}+1$. For example, combinations of $Nt_H$ and $Nt_V$ in L-shape arrangement in the case where $N_{Tx}$=6 include four combinations, e.g., ($Nt_H$, $Nt_V$)=(2, 5), (3, 4), (4, 3), and (5, 2).

In the case of L-shape arrangement, the number of transmission antennas may be $N_{Tx}$≥3. (b) of FIG. 8 shows an example of L-shape arrangement in the case where $N_{Tx}$=3.

Figure 9:
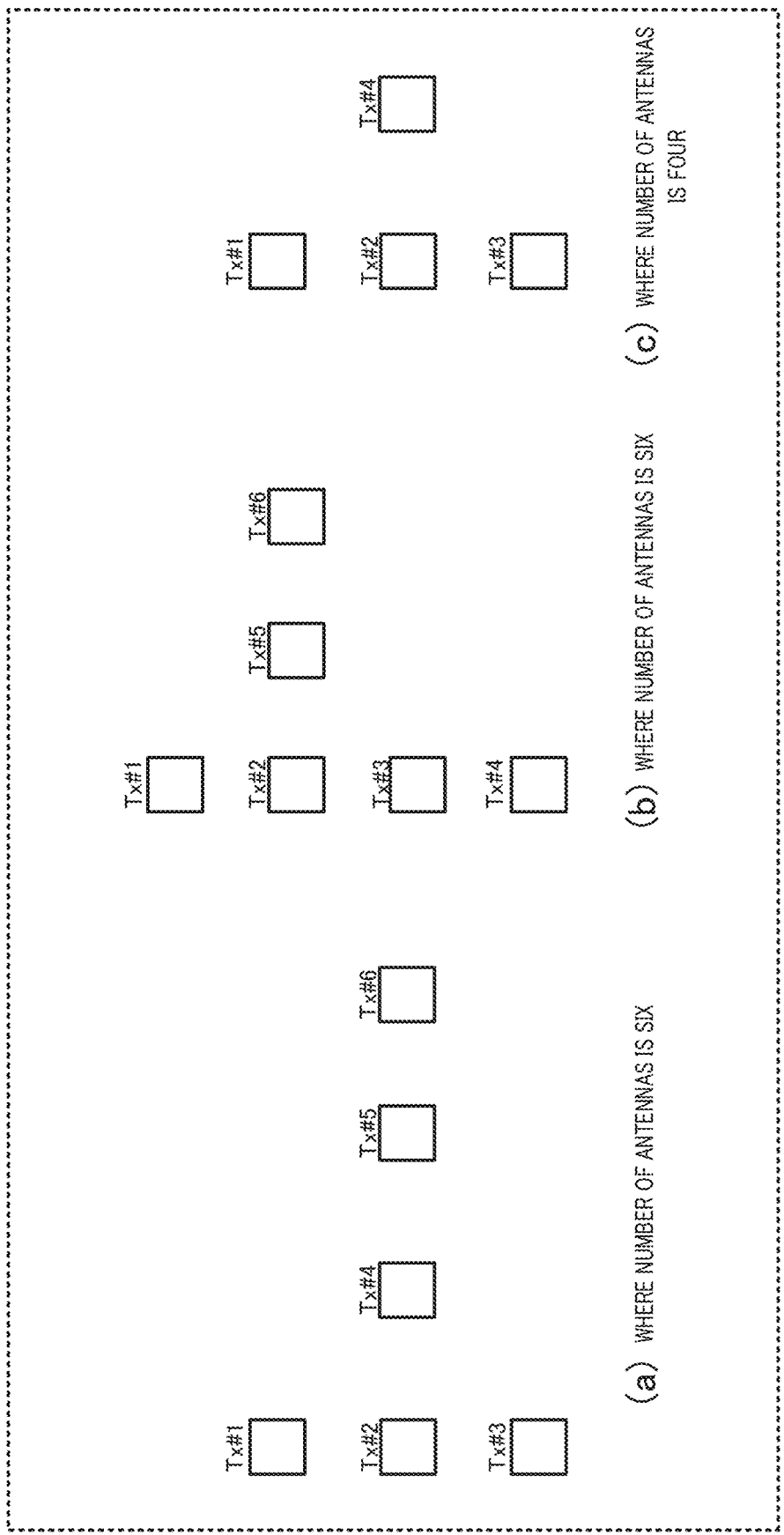
FIG. 9 illustrates diagrams each showing an example of an antenna arrangement.

Next, (a) and (b) of FIG. 9 shows examples of a T-shape arrangement in the case where $N_{Tx}$=6. (a) and (b) of FIG. 9 shows an equal spacing arrangement; however, the arrangement is not limited thereto. The arrangement may be an unequal spacing arrangement. The arrangement of $N_{Tx}$ transmission antennas 106 may be such that the arrangement of each of (a) and (b) of FIG. 9 is rotated by a selected angle (for example, 90°, 180°, or 270°). Alternatively, the arrangement of $N_{Tx}$ transmission antennas 106 may be such that the above-described arrangement is mirror-inverted.

(a) of FIG. 9 shows a case where, of transmission antennas 106, the number $Nt_H$ of antennas arranged in the horizontal direction is four and the number $Nt_V$ of antennas arranged in the vertical direction is three, and (b) of FIG. 9 shows a case where, of transmission antennas 106, the number $Nt_H$ of antennas arranged in the horizontal direction is three and the number $Nt_V$ of antennas arranged in the vertical direction is four; however, a combination of $Nt_H$ and $Nt_V$ is not limited thereto. For example, the combination may be a combination that satisfies the relationships that $Nt_H \geq 2$, $Nt_V \geq 2$, and $Nt_H + Nt_V = N_{Tx} + 1$. For example, combinations of $Nt_H$ and $Nt_V$ in T-shape arrangement in the case where $N_{Tx} = 6$ include four combinations, e.g., $(Nt_H, Nt_V) = (2, 5), (3, 4), (4, 3),$ and $(5, 2)$.

In the case of T-shape arrangement, the number of transmission antennas may be $N_{Tx} \geq 4$. (c) of FIG. 9 shows an example of a T-shape arrangement in the case where $N_{Tx} = 4$.

Figure 10:
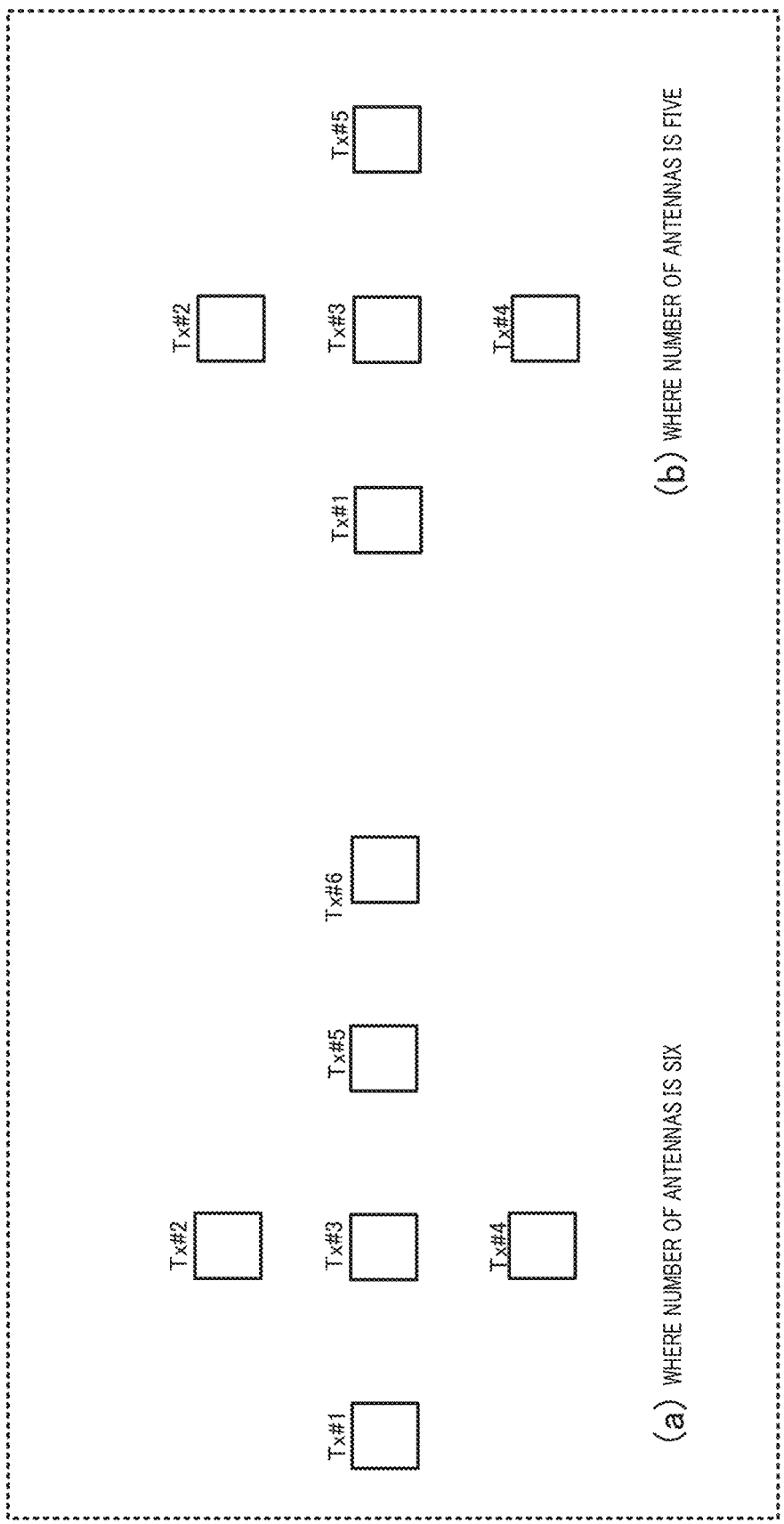
FIG. 10 illustrates diagrams each showing an example of an antenna arrangement.

Next, (a) of FIG. 10 shows an example of a cross-shape arrangement in the case where $N_{Tx} = 6$. (a) of FIG. 10 shows an equal spacing arrangement; however, the arrangement is not limited thereto. The arrangement may be an unequal spacing arrangement. The arrangement of $N_{Tx}$ transmission antennas 106 may be such that the arrangement of (a) of FIG. 10 is rotated by a selected angle (for example, 90°, 180°, or 270°). Alternatively, the arrangement of $N_{Tx}$ transmission antennas 106 may be such that the above-described arrangement is mirror-inverted.

(a) of FIG. 10 shows a state where, of transmission antennas 106, the number $Nt_H$ of antennas arranged in the horizontal direction is four and the number $Nt_V$ of antennas arranged in the vertical direction is three; however, a combination of $Nt_H$ and $Nt_V$ is not limited thereto. For example, the combination may be a combination that satisfies the relationships that $Nt_H \geq 3$, $Nt_V \geq 3$, and $Nt_H + Nt_V = N_{Tx} + 1$. For example, combinations of $Nt_H$ and $Nt_V$ in cross-shape arrangement in the case where $N_{Tx} = 6$ include two combinations, e.g., $(Nt_H, Nt_V) = (3, 4),$ and $(4, 3)$.

In the case of cross-shape arrangement, the number of transmission antennas may be $N_{Tx} \geq 5$. (b) of FIG. 10 shows an example of a cross-shape arrangement in the case where $N_{Tx} = 5$.

Examples related to (1) of Condition 1 have been described.

Regarding (2) of Condition 1, for example, (Na−Nz) reception antennas 202 are arranged in any one of an L shape (Na−Nz≥3), a T shape (Na−Nz≥4), and a cross shape (Na−Nz≥5).

The arrangement of (Na−Nz) reception antennas 202 may be the same-shape arrangement as the arrangement of transmission antennas 106 or may be a different shape arrangement from the arrangement of transmission antennas 106. When, for example, transmission antennas 106 are arranged in an L shape, reception antennas 202 may be arranged in an L shape or may be arranged in a different shape (for example, a T shape or a cross shape). A combination of the arrangement of transmission antennas 106 and the arrangement of reception antennas 202 is not limited thereto and may be a combination of other shape arrangements.

Here, where, of (Na−Nz) reception antennas 202, the number of antennas arranged in the horizontal direction is $Nr_H$ and the number of antennas arranged in the vertical direction is $Nr_V$, $Nr_H \geq 2$ and $Nr_V \geq 2$ in the case of L-shape or T-shape arrangement, $Nr_H \geq 3$ and $Nr_V \geq 3$ in the case of cross-shape arrangement, and the relationship $Nr_H + Nr_V = Na - Nz + 1$ is satisfied in the case of any arrangement.

Examples related to (2) of Condition 1 have been described.

(3) of Condition 1 is a condition in which, in a reception antenna arrangement obtained from transmission antennas 106 and reception antennas 202, the antennas of $Nt_H \times Nr_H$ that is the product of the number $Nt_H$ of transmission antennas 106 arranged in the horizontal direction and the number $Nr_H$ of reception antennas 202 arranged in the horizontal direction can be arranged, and is a condition in which a maximum number of virtual reception antennas can be arranged in the horizontal direction without any overlap.

(4) of Condition 1 is referred to as, for example, "separation performance improving arrangement condition". Nz reception antennas 202 or Nz transmission antennas 106 that satisfy the separation performance improving arrangement condition are referred to as "separation performance improving antennas". Hereinafter, an example of the separation performance improving arrangement condition will be described.

Figure 11:
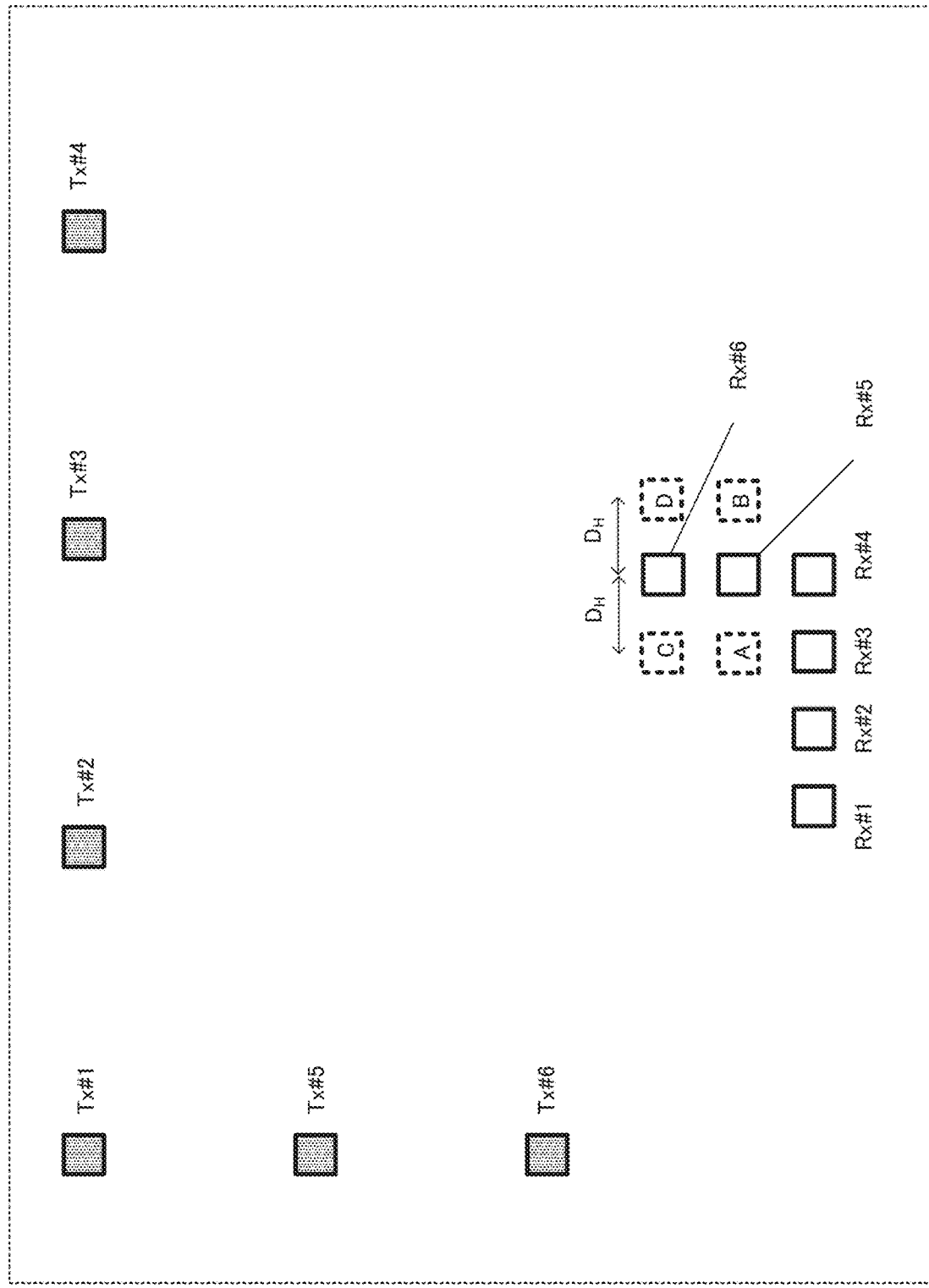
FIG. 11 is a diagram showing an example of an antenna arrangement.

FIG. 11 is a diagram showing an example in which $N_{Tx}$ (=6) transmission antennas 106 (for example, Tx #1 to Tx #6) are arranged in an L shape and (Na−Nz) (=6) reception antennas 202 (for example, Rx #1 to Rx #6) are arranged in an L shape. For example, as shown in FIG. 11, in Condition 1, of transmission and reception antennas, separation performance improving antennas may be set in reception antennas 202 having relatively narrow antenna spacings in the vertical direction.

In FIG. 11, candidates for the arrangement of separation performance improving antennas, which satisfies the separation performance improving arrangement condition, are positions A, B, C, and D indicated by the dotted-line rectangular frames.

When, for example, Nz=1, the total number Na of reception antennas 202 is seven, and unarranged one (=Nz) reception antenna 202 is arranged adjacent at the base spacing $D_H$ (in other words, located $D_H$ apart) in the horizontal direction from any one of reception antennas Rx #5, Rx #6 shown in FIG. 11. In other words, unarranged one reception antenna 202 is arranged at any one of positions A, B, C, and D of the dotted-line rectangular frames shown in FIG. 11. With this configuration, the separation performance improving arrangement condition is satisfied.

When Nz reception antennas 202 are arranged at such positions, radar apparatus 10 is able to reduce the influence of signal components between multiple waves in the case where there are multiple target reflected waves and is able to improve separation performance (for example, horizontal separation performance). An example of the effect of improving separation performance in radar apparatus 10 will be described by using a computer simulation result (described later).

When Nz reception antennas 202 (which correspond to, for example, third antennas) are arranged at a vertical position different from the vertical position of reception antennas 202 (which correspond to, for example, first antennas) arranged in the horizontal direction and arranged at a horizontal position adjacent to reception antennas 202 (which correspond to, for example, second antennas) arranged in the vertical direction, Nz reception antennas 202 may be arranged adjacent to reception antennas 202 arranged in the horizontal direction (A, C in FIG. 11) or arranged on the other side (B, D in FIG. 11).

Here, the arrangement on the other side (B, D in FIG. 11), as compared to the arrangement adjacent to reception antennas 202 arranged in the horizontal direction (A, C in FIG. 11), is effective to increase the horizontal antenna aperture in a virtual reception antenna arrangement, and it is possible to narrow the horizontal beam width, so the arrangement further contributes to resolution improvement in radar apparatus 10. In this case, when antenna elements each having a large vertical size are used, it is more suitable.

On the other hand, the arrangement adjacent to the antennas arranged in the horizontal direction (A, C in FIG. 11), as compared to the arrangement on the other side (B, D in FIG. 11), is able to reduce the influence of signal components between multiple waves when there are multiple target reflected waves and is able to further improve separation performance not only in the horizontal direction but also in the vertical direction in radar apparatus 10.

In FIG. 11, the L-shaped transmission and reception antennas have been described. For T-shaped or cross-shaped transmission and reception antennas as well, for example, Nz reception antennas 202 may be arranged on a side in the horizontal direction where a larger number of reception antennas 202 arranged in the horizontal direction are arranged with respect to the position (horizontal position) at which reception antennas 202 are arranged in the vertical direction. With this arrangement, when, for example, there are multiple target reflected waves, it is possible to further reduce the influence of signal components between multiple waves. Similarly, for example, Nz reception antennas 202 may be arranged on a side in the horizontal direction where a smaller number of reception antennas 202 arranged in the horizontal direction are arranged with respect to the position (horizontal position) at which reception antennas 202 are arranged in the vertical direction. With this arrangement, for example, it is effective to increase the horizontal antenna aperture, and it is possible to narrow the horizontal beam width, so resolution in radar apparatus 10 is improved.

When, for example, Nz=2, the total number Na of reception antennas 202 is eight, at least one of unarranged two (=Nz) reception antennas 202 is arranged so as to satisfy the separation performance improving arrangement condition (for example, arranged at any one of positions A, B, C, and D of the dotted-line rectangular frames of FIG. 11). When both unarranged two (=Nz) reception antennas are arranged so as to satisfy the separation performance improving arrangement condition, for example, one of reception antennas 202 may be arranged adjacent at the horizontal base spacing $D_H$ to Rx #5 shown in FIG. 11 (arranged at any one of A and B in FIG. 11), and the other one of reception antennas 202 may be arranged adjacent at the horizontal base spacing $D_H$ to Rx #6 shown in FIG. 11 (arranged at any one of C and D in FIG. 11). With this arrangement, radar apparatus 10 is able to further improve separation performance (for example, in the horizontal direction) in the case where there are multiple target reflected waves.

When Nz≥3 as well, at least one of unarranged Nz reception antennas 202 may be arranged so as to satisfy the separation performance improving arrangement condition (for example, arranged at any one of positions A, B, C, and D of the dotted line rectangular frames in FIG. 11. For example, the number of reception antennas 202 arranged so as to satisfy the separation performance improving arrangement condition increases among Nz reception antennas 202, it is possible to further reduce the influence of signal components between multiple waves when there are multiple target reflected waves, so the separation performance of radar apparatus 10 is further improved.

Examples of Condition 1 have been described.

The arrangement of transmission antennas 106, which satisfies Condition 1 described above, may be applied to the arrangement of reception antennas 202, and the arrangement of reception antennas 202, which satisfies Condition 1, may be applied to the arrangement of transmission antennas 106. In this case as well, similar effects to those described above are obtained. Hereinafter, a condition in this case is referred to as "Condition 1a". Thus, Condition 1a is as follows. An example of Condition 1a is similar to details in which, in the example of Condition 1 described above, transmission antennas and reception antennas are respectively replaced with reception antennas and transmission antennas, so the description is omitted.

<Condition 1a>

(1) Na reception antennas 202 are arranged in the horizontal direction (which corresponds to, for example, the first direction) and the vertical direction (which corresponds to, for example, the second direction perpendicular to the first direction). Of Na reception antennas 202, one reception antenna 202 is arranged so as to be overlappingly included in both reception antennas 202 arranged in the horizontal direction and reception antennas 202 arranged in the vertical direction.

(2) Of $N_{Tx}$ transmission antennas 106, ($N_{Tx}$−Nz) transmission antennas 106 other than Nz (Nz≥1) transmission antennas 106 are arranged in the horizontal direction and the vertical direction. Of ($N_{Tx}$−Nz) transmission antennas 106, one transmission antenna 106 is arranged so as to be overlappingly included in both transmission antennas 106 arranged in the horizontal direction and transmission antennas 106 arranged in the vertical direction.

(3) The antenna spacings of reception antennas 202 arranged in the horizontal direction as set so as to be wider than the aperture length of transmission antennas 106 arranged in the horizontal direction (which correspond to, for example, first antennas). At least one of the antenna spacings of transmission antennas 106 arranged in the horizontal direction is set to the horizontal base spacing (or the prescribed spacing) $D_H$.

(4) At least one of Nz transmission antennas 106 (which correspond to, for example, third antennas) is arranged at a vertical position different from the vertical position at which transmission antennas 106 arranged in the horizontal direction (which correspond to, for example, first antennas) are arranged and at a horizontal position adjacent at the horizontal base spacing $D_H$ to transmission antennas 106 arranged in the vertical direction (which correspond to, for example, second antennas).

Figure 12:
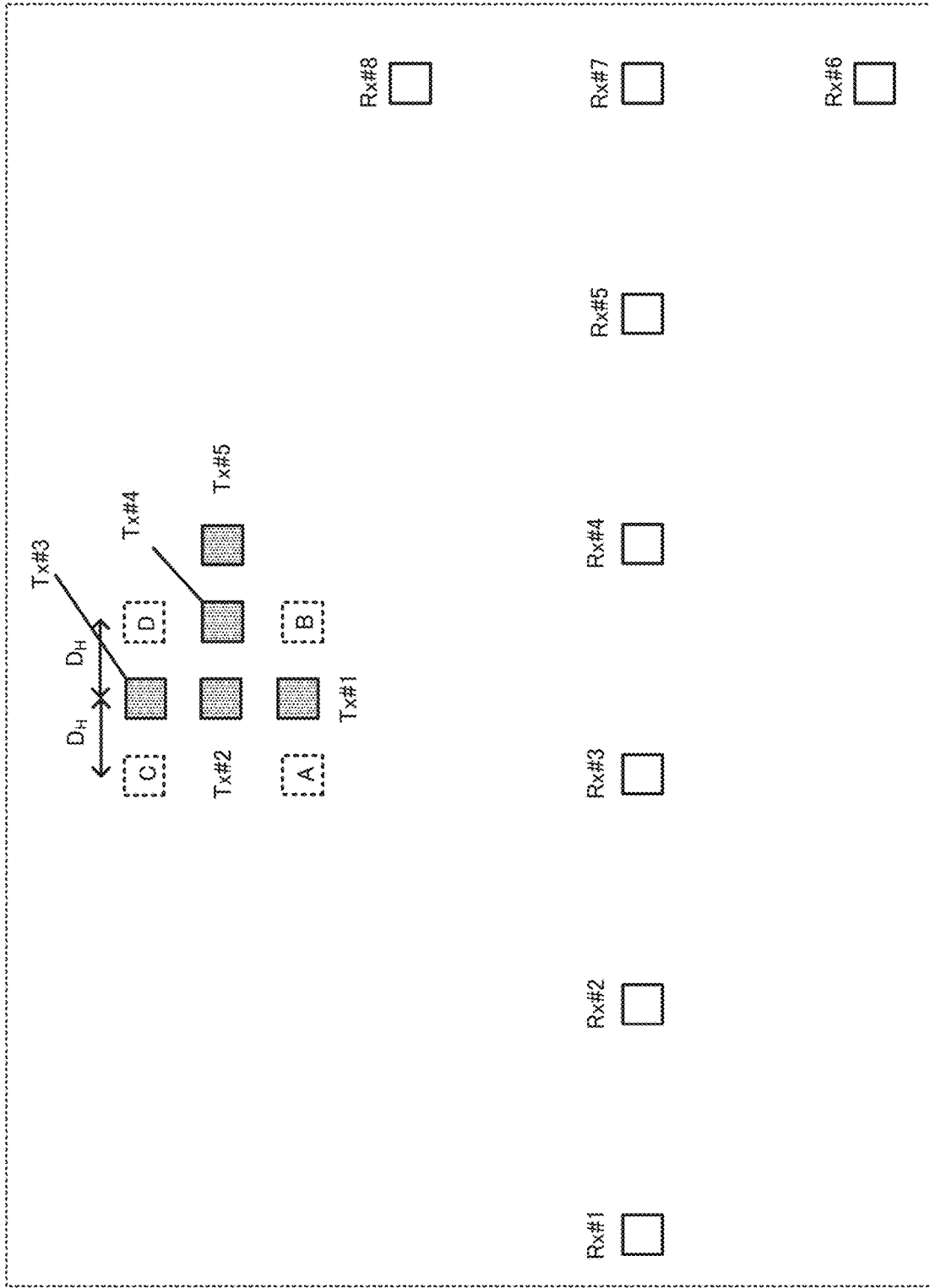
FIG. 12 is a diagram showing an example of an antenna arrangement.

FIG. 12 is a diagram showing an example of an antenna arrangement that satisfies Condition 1a. FIG. 12 shows an example in which Na (=8) reception antennas 202 (for example, Rx #1 to Rx #8) are arranged in a T shape and ($N_{Tx}$−Nz) (=5) transmission antennas 106 (for example, Tx #1 to Tx #5) are arranged in a T shape. For example, as shown in FIG. 12, in Condition 1a, of transmission and reception antennas, separation performance improving antennas may be set in transmission antennas 106 having relatively narrow antenna spacings in the vertical direction.

In FIG. 12, candidates for the arrangement of separation performance improving antennas, which satisfies the separation performance improving arrangement condition, are positions A, B, C, and D indicated by dotted-line rectangular frames.

When, for example, Nz=1, the total number $N_{Tx}$ of transmission antennas 106 is six, and unarranged one (=Nz) transmission antenna 106 is arranged adjacent at the horizontal base spacing $D_H$ (in other words, located $D_H$ apart) from any one of transmission antennas Tx #1, Tx #3 shown in FIG. 12. In other words, unarranged one transmission antenna 106 is arranged at any one of positions A, B, C, and D of the dotted-line rectangular frames shown in FIG. 12. With this configuration, the separation performance improving arrangement condition is satisfied.

When Nz transmission antennas 106 are arranged at such positions, radar apparatus 10 is able to reduce the influence of signal components between multiple waves in the case where there are multiple target reflected waves and is able to improve separation performance (for example, horizontal separation performance). An example of the effect of improving separation performance in radar apparatus 10 will be described by using a computer simulation result (described later).

When Nz transmission antennas 106 are arranged at a vertical position different from the vertical position at which transmission antennas 106 are arranged in the horizontal direction and at a horizontal position adjacent to transmission antennas 106 arranged in the vertical direction, Nz transmission antennas 106 may be arranged adjacent to transmission antennas 106 arranged in the horizontal direction (B, D in FIG. 12) or arranged on the other side (A, C in FIG. 12).

Here, the arrangement on the other side (A, C in FIG. 12), as compared to the arrangement adjacent to transmission antennas 106 arranged in the horizontal direction (B, D in FIG. 12), is effective to increase the horizontal antenna aperture in a virtual reception antenna arrangement, and it is possible to narrow the horizontal beam width, so the arrangement further contributes to resolution improvement in radar apparatus 10. In this case, when antenna elements each having a large vertical size are used, it is more suitable.

On the other hand, the arrangement adjacent to the antennas arranged in the horizontal direction (B, D in FIG. 12), as compared to the arrangement on the other side (A, C in FIG. 12), is able to reduce the influence of signal components between multiple waves when there are multiple target reflected waves, and it is possible to further improve separation performance not only in the horizontal direction but also in the vertical direction in radar apparatus 10.

When, for example, Nz=2, the total number $N_{Tx}$ of transmission antennas 106 is 7, at least one of unarranged two (=Nz) transmission antennas 106 is arranged so as to satisfy the separation performance improving arrangement condition (for example, arranged at any one of positions A, B, C, and D of the dotted-line rectangular frames of FIG. 12). When both unarranged two (=Nz) transmission antennas are arranged so as to satisfy the separation performance improving arrangement condition, for example, one of transmission antennas 106 may be arranged adjacent at the horizontal base spacing $D_H$ to Tx #1 shown in FIG. 12 (arranged at any one of A and B in FIG. 12), and the other one of transmission antennas 106 may be arranged adjacent at the horizontal base spacing $D_H$ to Tx #3 shown in FIG. 12 (arranged at any one of C and D in FIG. 12). With this arrangement, radar apparatus 10 is able to further improve separation performance (for example, in the horizontal direction) in the case where there are multiple target reflected waves.

When Nz≥3 as well, at least one of unarranged Nz transmission antennas 106 may be arranged so as to satisfy the separation performance improving arrangement condition (for example, arranged at any one of the positions A, B, C, and D of the dotted line rectangular frames in FIG. 12. For example, the number of transmission antennas 106 arranged so as to satisfy the separation performance improving arrangement condition increases among Nz transmission antennas, it is possible to further reduce the influence of signal components between multiple waves when there are multiple target reflected waves, so the separation performance of radar apparatus 10 is further improved.

Similar effects are obtained when, in Condition 1 and Condition 1a, the horizontal direction is replaced with the vertical direction and the vertical direction is replaced with the horizontal direction.

<Condition 2>

Condition 2 is, for example, similar to details in which, in Condition 1, the horizontal direction is replaced with the vertical direction and the vertical direction is replaced with the horizontal direction.

(1) $N_{Tx}$ transmission antennas 106 are arranged in the horizontal direction (which corresponds to, for example, the second direction) and the vertical direction (which corresponds to, for example, the first direction). Of $N_{Tx}$ transmission antennas 106, one transmission antenna 106 is arranged so as to be overlappingly included in both transmission antennas 106 arranged in the horizontal direction and transmission antennas 106 arranged in the vertical direction.

(2) Of Na reception antennas 202, (Na–Nz) reception antennas 202 other than Nz (Nz≥1) reception antennas 202 are arranged in the horizontal direction and the vertical direction. Of (Na–Nz) reception antennas 202, one reception antenna 202 is arranged so as to be overlappingly included in both reception antennas 202 arranged in the horizontal direction and reception antennas 202 arranged in the vertical direction.

(3) The antenna spacings of transmission antennas 106 arranged in the vertical direction are set so as to be wider than the aperture length of reception antennas 202 (which correspond to, for example, first antennas) arranged in the vertical direction. At least one of the antenna spacings of reception antennas 202 arranged in the vertical direction is set to a vertical base spacing $D_V$.

(4) At least one of Nz reception antennas 202 (which correspond to, for example, third antennas) is arranged at a horizontal position different from the horizontal position at which reception antennas 202 arranged in the vertical direction (which correspond to, for example, first antennas) are arranged and at a vertical position adjacent at the vertical base spacing $D_V$ to reception antennas 202 arranged in the horizontal direction (which correspond to, for example, second antennas).

Figure 13:
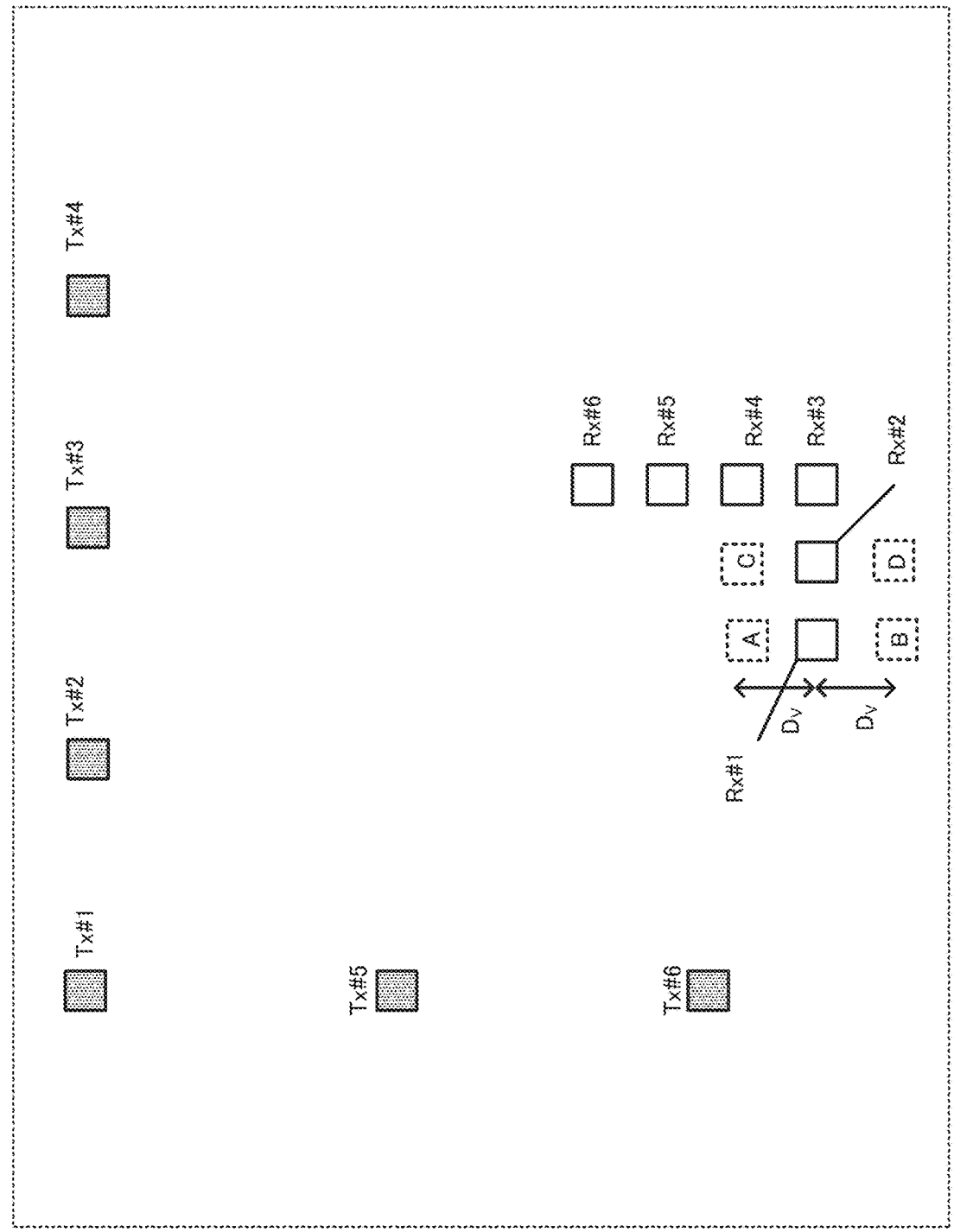
FIG. 13 is a diagram showing an example of an antenna arrangement.

FIG. 13 is a diagram showing an example in which $N_{Tx}$ (=6) transmission antennas 106 (for example, Tx #1 to Tx #6) are arranged in an L shape and (Na–Nz) (=6) reception antennas 202 (for example, Rx #1 to Rx #6) are arranged in an L shape. For example, as shown in FIG. 13, in Condition 2, of transmission and reception antennas, separation performance improving antennas may be set in reception antennas 202 having relatively narrow antenna spacings in the horizontal direction.

In FIG. 13, candidates for the arrangement of separation performance improving antennas, which satisfies the separation performance improving arrangement condition, are positions A, B, C, and D indicated by dotted-line square frames.

When, for example, Nz=1, the total number Na of reception antennas 202 is seven, and unarranged one (=Nz) reception antenna 202 is arranged adjacent at the base spacing $D_V$ (in other words, located $D_V$ apart) in the vertical direction from any one of reception antennas Rx #1, Rx #2 shown in FIG. 13. In other words, unarranged one reception antenna 202 is arranged at any one of positions A, B, C, and D of the dotted-line rectangular frames shown in FIG. 13. With this configuration, the separation performance improving arrangement condition is satisfied.

When Nz reception antennas 202 are arranged at such positions, radar apparatus 10 is able to reduce the influence of signal components between multiple waves in the case where there are multiple target reflected waves, and it is possible to improve separation performance (for example, vertical separation performance). An example of the effect of improving separation performance in radar apparatus 10 will be described by using a computer simulation result (described later).

When Nz reception antennas 202 (which correspond to, for example, third antennas) are arranged at a horizontal position different from the horizontal position at which reception antennas 202 arranged in the vertical direction (which correspond to, for example, first antennas) and arranged at a vertical position adjacent to reception antennas 202 arranged in the horizontal direction (which correspond to, for example, second antennas), Nz reception antennas 202 may be arranged adjacent to reception antennas 202 arranged in the vertical direction (A, C in FIG. 13) or arranged on the other side (B, D in FIG. 13).

Here, the arrangement on the other side (B, D in FIG. 13), as compared to the arrangement adjacent to reception antennas 202 arranged in the vertical direction (A, C in FIG. 13), is effective to increase the vertical antenna aperture in a virtual reception antenna arrangement, and it is possible to narrow the vertical beam width, so the arrangement further contributes to resolution improvement in radar apparatus 10. In this case, when antenna elements each having a large horizontal size are used, it is more suitable.

On the other hand, the arrangement adjacent to the antennas arranged in the vertical direction (A, C in FIG. 13), as compared to the arrangement on the other side (B, D in FIG. 13), is able to reduce the influence of signal components between multiple waves when there are multiple target reflected waves, and it is possible to further improve separation performance not only in the vertical direction but also in the horizontal direction in radar apparatus 10.

In FIG. 13, the L-shaped transmission and reception antennas have been described. For T-shaped or cross-shaped transmission and reception antennas as well, for example, Nz reception antennas 202 may be arranged on a side in the vertical direction where a larger number of reception antennas 202 arranged in the vertical direction are arranged with respect to the position (vertical position) at which reception antennas 202 are arranged in the horizontal direction. With this arrangement, when, for example, there are multiple target reflected waves, it is possible to further reduce the influence of signal components between multiple waves. Similarly, for example, Nz reception antennas 202 may be arranged on a side in the vertical direction where a smaller number of reception antennas 202 arranged in the horizontal direction are arranged with respect to the position (vertical position) at which reception antennas 202 are arranged in the horizontal direction. With this arrangement, for example, it is effective to increase the horizontal antenna aperture, and it is possible to narrow the horizontal beam width, so resolution in radar apparatus 10 is improved.

When, for example, Nz=2, the total number Na of reception antennas 202 is eight, at least one of unarranged two (=Nz) reception antennas 202 is arranged so as to satisfy the separation performance improving arrangement condition (for example, arranged at any one of positions A, B, C, and D of the dotted-line rectangular frames of FIG. 13). When both unarranged two (=Nz) reception antennas are arranged so as to satisfy the separation performance improving arrangement condition, for example, one of reception antennas 202 may be arranged adjacent at the vertical base spacing $D_V$ to Rx #1 shown in FIG. 13 (arranged at any one of A and B in FIG. 13), and the other one of reception antennas 202 may be arranged adjacent at the vertical base spacing $D_V$ to Rx #2 shown in FIG. 13 (arranged at any one of C and D in FIG. 13). With this arrangement, radar apparatus 10 is able to further improve separation performance (for example, in the vertical direction) in the case where there are multiple target reflected waves.

When Nz≥3 as well, at least one of unarranged Nz reception antennas 202 may be arranged so as to satisfy the separation performance improving arrangement condition (for example, arranged at any one of the positions A, B, C, and D of the dotted line rectangular frames in FIG. 13. For example, the number of reception antennas 202 arranged so as to satisfy the separation performance improving arrangement condition increases among Nz reception antennas, it is possible to further reduce the influence of signal components between multiple waves when there are multiple target reflected waves, so the separation performance of radar apparatus 10 is further improved.

Examples of Condition 2 have been described.

<Condition 2a>

Condition 2a is, for example, similar to details in which, in Condition 1a described above, the horizontal direction is replaced with the vertical direction and the vertical direction is replaced with the horizontal direction.

(1) Na reception antennas 202 are arranged in the horizontal direction (which corresponds to, for example, the second direction) and the vertical direction (which corresponds to, for example, the first direction). Of Na reception antennas 202, one reception antenna 202 is arranged so as to be overlappingly included in both reception antennas 202 arranged in the horizontal direction and reception antennas 202 arranged in the vertical direction.

(2) Of $N_{Tx}$ transmission antennas 106, ($N_{Tx}$−Nz) transmission antennas 106 other than Nz (Nz≥1) transmission antennas 106 are arranged in the horizontal direction and the vertical direction. Of ($N_{Tx}$−Nz) transmission antennas 106, one transmission antenna 106 is arranged so as to be overlappingly included in both transmission antennas 106 arranged in the horizontal direction and transmission antennas 106 arranged in the vertical direction.

(3) The antenna spacings of reception antennas 202 arranged in the vertical direction are set to so as to be wider than the aperture length of transmission antennas 106 arranged in the vertical direction (which correspond to, for example, first antennas). At least one of the antenna spacings of transmission antennas 106 arranged in the vertical direction is set to the vertical base spacing (or the prescribed spacing) $D_V$.

(4) At least one of Nz transmission antennas 106 (which correspond to, for example, third antennas) is arranged at a horizontal position different from the horizontal position at which transmission antennas 106 arranged in the vertical direction (which correspond to, for example, first antennas) are arranged and at a vertical position adjacent at the vertical base spacing $D_H$ to transmission antennas 106 arranged in the horizontal direction (which correspond to, for example, second antennas).

Figure 14:
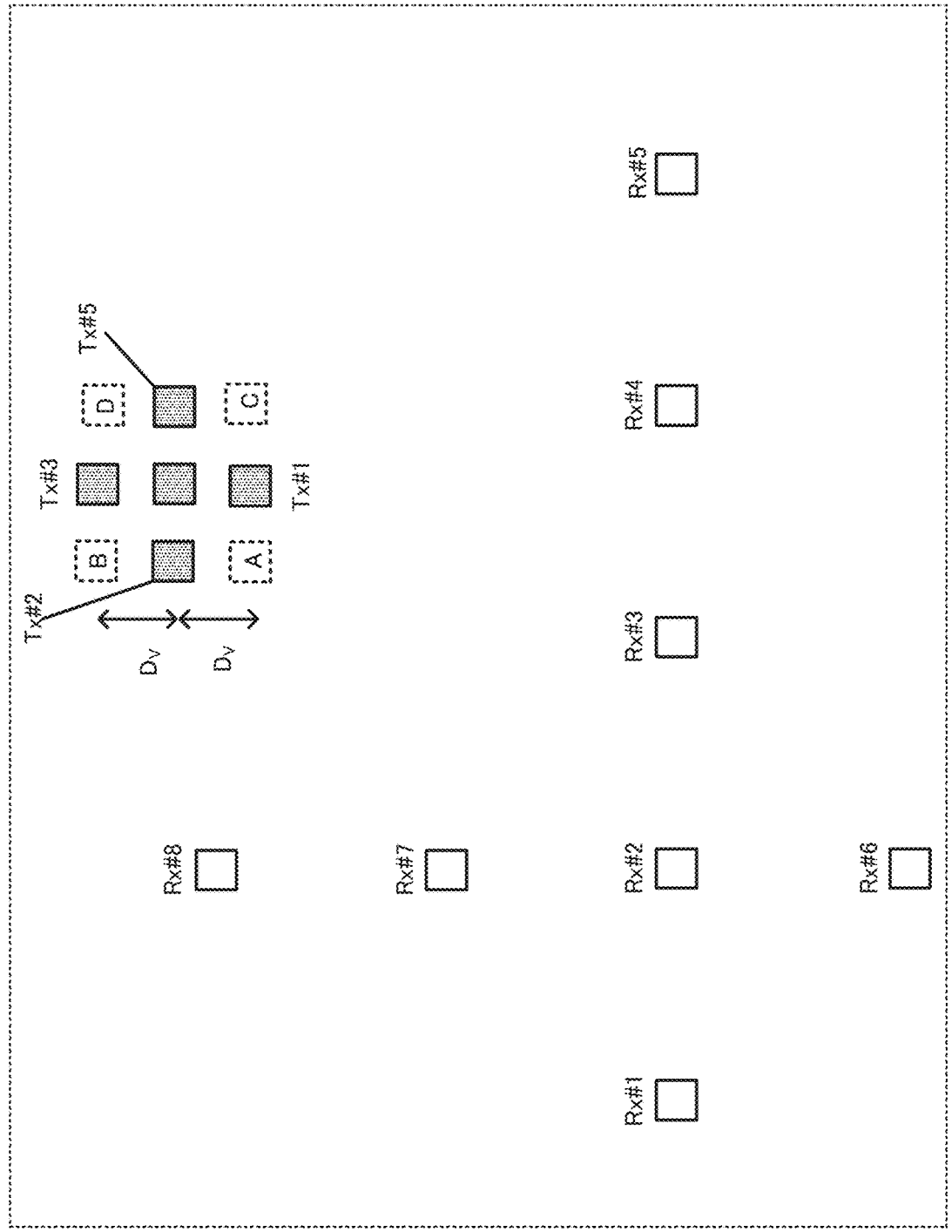
FIG. 14 is a diagram showing an example of an antenna arrangement.

FIG. 14 is a diagram showing an example of an antenna arrangement that satisfies Condition 2a. FIG. 14 shows an example in which Na (=8) reception antennas 202 (for example, Rx #1 to Rx #8) are arranged in a cross shape and ($N_{Tx}$−Nz) (=5) transmission antennas 106 (for example, Tx #1 to Tx #5) are arranged in a cross shape. For example, as shown in FIG. 14, in Condition 2a, of transmission and reception antennas, separation performance improving antennas may be set in transmission antennas 106 having relatively narrow antenna spacings in the horizontal direction.

In FIG. 14, candidates for the arrangement of separation performance improving antennas, which satisfies the separation performance improving arrangement condition, are positions A, B, C, and D indicated by dotted-line rectangular frames.

When, for example, Nz=1, the total number $N_{Tx}$ of transmission antennas 106 is six, and unarranged one (=Nz) transmission antenna 106 is arranged adjacent at the vertical base spacing $D_V$ from any one of transmission antennas Tx #2, Tx #5 shown in FIG. 14. In other words, unarranged one transmission antenna 106 is arranged at any one of positions A, B, C, and D of the dotted-line rectangular frames shown in FIG. 14. With this configuration, the separation performance improving arrangement condition is satisfied.

When Nz transmission antennas 106 are arranged at such positions, radar apparatus 10 is able to reduce the influence of signal components between multiple waves in the case where there are multiple target reflected waves, and it is possible to improve separation performance (for example, vertical separation performance). An example of the effect of improving separation performance in radar apparatus 10 will be described by using a computer simulation result (described later).

When, for example, Nz=2, the total number $N_{Tx}$ of transmission antennas 106 is seven, at least one of unarranged two (=Nz) transmission antennas 106 is arranged so as to satisfy the separation performance improving arrangement condition (for example, arranged at any one of positions A, B, C, and D of the dotted-line rectangular frames of FIG. 14). When both unarranged two (=Nz) transmission antennas are arranged so as to satisfy the separation performance improving arrangement condition, for example, one of transmission antennas 106 may be arranged adjacent at the vertical base spacing $D_V$ to Tx #2 shown in FIG. 14 (arranged at any one of A and B in FIG. 14), and the other one of transmission antennas 106 may be arranged adjacent at the vertical base spacing $D_V$ to Tx #5 shown in FIG. 14 (arranged at any one of C and D in FIG. 14). With this arrangement, radar apparatus 10 is able to further improve separation performance (for example, in the vertical direction) in the case where there are multiple target reflected waves.

When Nz≥3 as well, at least one of unarranged Nz transmission antennas 106 may be arranged so as to satisfy the separation performance improving arrangement condition (for example, arranged at any one of the positions A, B, C, and D of the dotted line rectangular frames in FIG. 14. For example, the number of transmission antennas 106 arranged so as to satisfy the separation performance improving arrangement condition increases among Nz transmission antennas, it is possible to further reduce the influence of signal components between multiple waves when there are multiple target reflected waves, so the separation performance of radar apparatus 10 is further improved.

Examples of Condition 2 and Condition 2a have been described.

In the case of the antenna arrangement shown in FIG. 14, the arrangement that satisfies the separation performance improving arrangement condition of Condition 1 (or Condition 1a) is also an arrangement of any one of positions A, B, C, and D of the dotted-line rectangular frames, and part or all of the arrangements that respectively satisfy the separation performance improving arrangement conditions of Condition 1 and Condition 2 may coincide with each other. Such an arrangement that satisfies both the separation performance improving arrangement conditions of Condition 1 and Condition 2 is able to further reduce the influence of signal components between multiple waves when there are multiple target reflected waves, and it is possible to further improve the separation performance of radar apparatus 10. For this reason, for example, the arrangement that satisfies both the separation performance improving arrangement conditions of Condition 1 and Condition 2 may be preferentially applied as the arrangement of Nz antennas.

Similarly, an arrangement that satisfies both the separation performance improving arrangement conditions of Condition 1a and Condition 2a is able to further reduce the influence of signal components between multiple waves when there are multiple target reflected waves, and it is possible to further improve the separation performance of radar apparatus 10. For this reason, for example, the arrangement that satisfies both the separation performance improving arrangement conditions of Condition 1a and Condition 2a may be preferentially applied as the arrangement of Nz antennas.

As described above, with the arrangement that satisfies Condition 1 (or Condition 1a), radar apparatus 10 is able to improve separation performance in the case where reflected waves of targets with different angles of arrival of reflected waves are received. Condition 1 (or Condition 1a) is, for example, a condition in which vertical separation performance is also improved but horizontal separation performance is preferentially improved.

With the arrangement that satisfies Condition 2 (or Condition 2a), radar apparatus 10 is able to improve separation performance in the case where reflected waves of targets with different angles of arrival of reflected waves are received. Condition 2 (or Condition 2a) is, for example, a condition in which horizontal separation performance is also improved but vertical separation performance is preferentially improved.

When, for example, in the antenna arrangement of radar apparatus 10, the horizontal virtual reception antenna aperture is wider than the vertical virtual reception antenna aperture, the number of virtual antennas arranged in the vertical direction is small, so application of Condition 1 (or Condition 1a) is more suitable than application of Condition 2 (or Condition 2a), and a further high separation performance improving effect is obtained even when the number of separation performance improving antennas Nz is small. On the other hand, when, for example, in the antenna arrangement of radar apparatus 10, the vertical virtual reception antenna aperture is wider than the horizontal virtual reception antenna aperture, the number of virtual antennas arranged in the horizontal direction is small, so application of Condition 2 (or Condition 2a) is more suitable than application of Condition 1 (or Condition 1a), and a further high separation performance improving effect is obtained even when the number of separation performance improving antennas Nz is small.

Each of Condition 1 and Condition 2 has been described.

In Condition 1 and Condition 1a (or Condition 2 and Condition 2a), as an example, of transmission and reception antennas, separation performance improving antennas may be set in antennas having relatively narrow antenna spacings in the vertical direction (or horizontal direction). Even when antennas are arranged at positions other than the antennas shown in the drawings, the present disclosure provides the above-described effects.

Next, an example of an antenna arrangement (for example, an example of a MIMO antenna arrangement) that satisfies Condition 1 and an example of a direction estimation result through computer simulation will be described.

Arrangement Example 1

Figure 15:
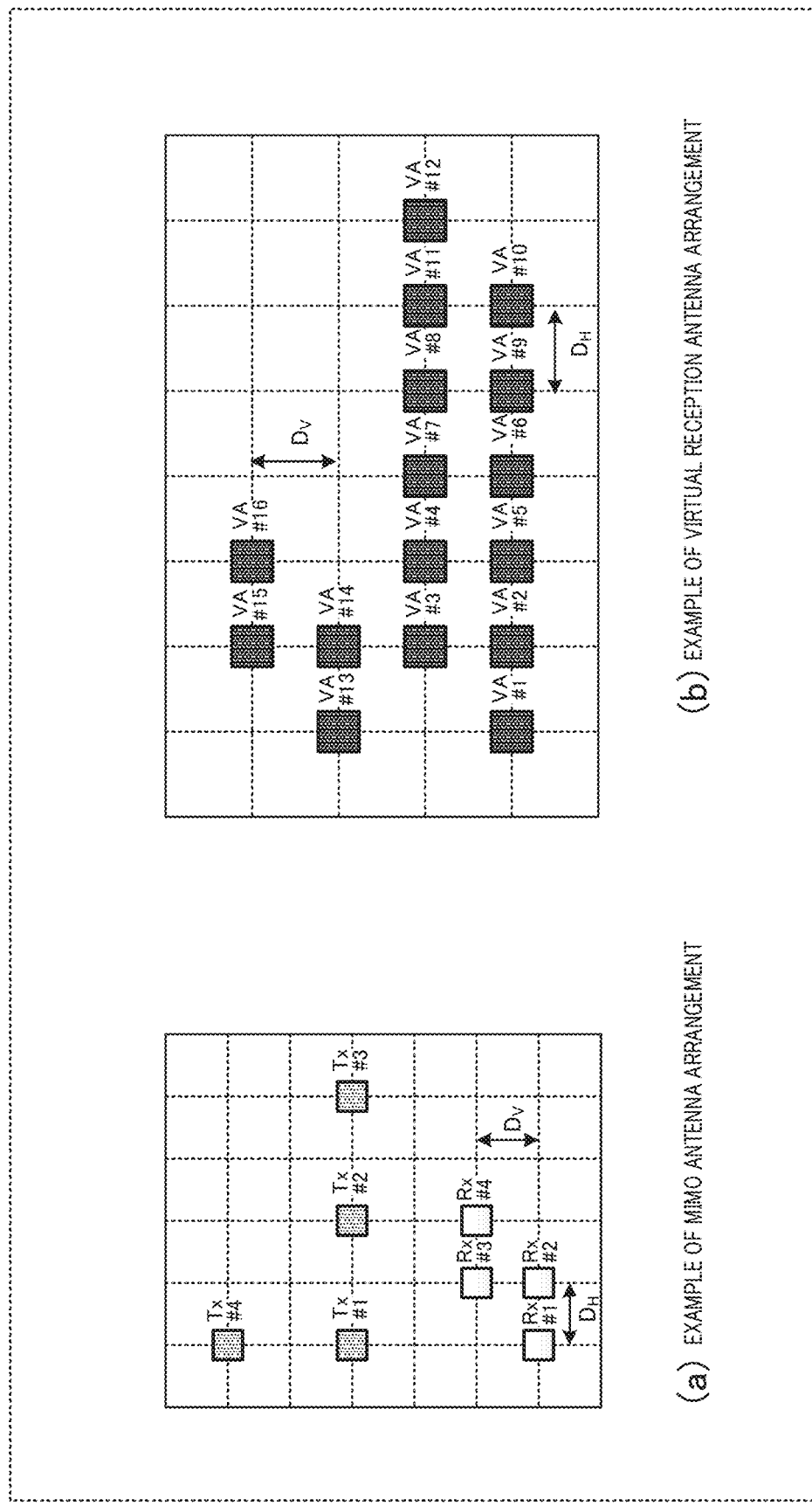
FIG. 15 illustrates a diagram showing an example of an arrangement of transmission and reception antennas and a diagram showing an example of an arrangement of a virtual reception array according to Arrangement Example 1.

(a) of FIG. 15 is a diagram showing an example of an arrangement of transmission antennas 106 (represented by, for example, Tx) and reception antennas 202 (represented by, for example, Rx) (for example, an example of a MIMO antenna arrangement) according to Arrangement Example 1.

In the example shown in (a) of FIG. 15, the number of $N_{Tx}$ of transmission antennas is four (for example, Tx #1, Tx #2, Tx #3, and Tx #4), and the number Na of reception antennas is four (for example, Rx #1, Rx #2, Rx #3, and Rx #4). In the reception antennas, the antenna of Nz=1 is antenna Rx #4.

(b) of FIG. 15 is a diagram showing an example of an arrangement of a virtual reception array obtained from the antenna arrangement shown in (a) of FIG. 15.

Here, the arrangement of the virtual reception array may be, for example, expressed as the following expression 31 in accordance with the positions (for example, the positions of feeding points) of transmission antennas 106 that make up a transmission array antenna and the positions (for example, the positions of feeding points) of reception antennas 202 that make up a reception array antenna.

(Equation 31)
$$\begin{cases} X_{V\_\#k} = (X_{T\_\#[ceil(k/Na)]} - X_{T\_\#1}) + (X_{R\_\#[mod(k-1,Na)+1]} - X_{R\_\#1}) \\ Y_{V\_\#k} = (Y_{T\_\#[ceil(k/Na)]} - Y_{T\_\#1}) + (Y_{R\_\#[mod(k-1,Na)+1]} - Y_{R\_\#1}) \end{cases}$$

Here, the position coordinates of each of transmission antennas 106 (for example, Tx #n) that make up the transmission array antenna are represented by $(X_{T\_\#n}, Y_{T\_\#n})$ (for example, where n=1, . . . , $N_{Tx}$), the position coordinates of each of reception antennas 202 (for example, Rx #m) that make up the reception array antenna are represented by $(X_{R\_\#m}, Y_{R\_\#m})$ (for example, where m=1, . . . , Na), and the position coordinates of each of the virtual antennas VA #k that make up the virtual reception array antenna are represented by $(X_{V\_\#k}, Y_{V\_\#k})$ (for example, where k=1, . . . , $N_{Tx}$×Na).

In the expression 31, VA #1 is, for example, expressed as the position reference (0, 0) of the virtual reception array.

In (a) of FIG. 15, the arrangement of transmission antennas Tx #1 to Tx #4 is an L-shape arrangement. For example, Tx #1 to Tx #3 are arranged in the horizontal direction, and Tx #1 and Tx #4 are arranged in the vertical direction (which corresponds to, for example, (1) of Condition 1). For example, with respect to the position coordinates $(X_{T\_\#1}, Y_{T\_\#1})$ of Tx #1, the position coordinates of Tx #2 to Tx #4 are $(X_{T\_\#2}, Y_{T\_\#2})=(X_{T\_\#1}+2D_H, Y_{T\_\#1})$, $(X_{T\_\#3}, Y_{T\_\#3})=(X_{T\_\#1}+4D_H, Y_{T\_\#1})$, and $(X_{T\_\#4}, Y_{T\_\#4})=(X_{T\_\#1}, Y_{T\_\#1}+2D_V)$. Here, the antenna spacings of transmission antennas Tx #1 to Tx #3 arranged in the horizontal direction are wider than the aperture length $D_H$ of reception antennas 202 arranged in the horizontal direction (which corresponds to, for example, (3) of Condition 1). In (a) of FIG. 15, the antenna spacings of transmission antennas Tx #1, Tx #4 arranged in the vertical direction are wider than the aperture length $D_V$ of reception antennas 202 arranged in the vertical direction; however, the configuration is not limited thereto.

On the other hand, in Na (=4) reception antennas Rx #1 to Rx #4 shown in (a) of FIG. 15, three (=Na−Nz) reception antennas Rx #1 to Rx #3 other than Nz (=1) antenna Rx #4 are arranged in an L shape (which corresponds to, for example, (2) of Condition 1), and the antenna spacing between reception antennas Rx #1 and Rx #2 arranged in the horizontal direction includes the horizontal base spacing $D_H$.

For example, the arrangement of reception antennas Rx #1 to Rx #3 shown in (a) of FIG. 15 is an arrangement in which the L shape is horizontally inverted, Rx #1 and Rx #2 are arranged in the horizontal direction, and Rx #2 and Rx #3 are arranged in the vertical direction. For example, with respect to the position coordinates $(X_{R\_\#1}, Y_{R\_\#1})$ of Rx #1, the position coordinates of Rx #2 and Rx #3 are $(X_{R\_\#2}, Y_{R\_\#2})=(X_{R\_\#1}+D_H, Y_{R\_\#1})$, and $(X_{R\_\#3}, Y_{R\_\#3})=(X_{R\_\#1}+D_H, Y_{R\_\#1}+D_V)$.

In (a) of FIG. 15, reception antenna Rx #4 corresponding to Nz=1 (for example, separation performance improving antenna) is arranged at a vertical position $(Y_{R\_\#1}+D_V)$ different from the vertical position $(Y_{R\_\#1})$ of each of reception antennas Rx #1 and Rx #2 arranged in the horizontal direction and at a horizontal position adjacent at the horizontal base spacing $D_H$ to reception antennas Rx #2 and Rx #3 arranged in the vertical direction (which corresponds to, for example, (4) of Condition 1). In other words, the position coordinates of Rx #4 $(X_{R\_\#4}, Y_{R\_\#4})=(X_{R\_\#1}+2D_H, Y_{R\_\#1}+D_V)$.

In the antenna arrangement shown in (a) of FIG. 15, the case where, when Rx #4 that is the Nz reception antenna corresponding to the separation performance improving antenna is arranged at a vertical position $(Y_{R\_\#1}+D_V)$ different from the vertical position $(Y_{R\_\#1})$ of each of reception antennas Rx #1 and Rx #2 arranged in the horizontal direction and at a horizontal position adjacent to reception antenna Rx #3, Rx #4 is arranged on the other side of the reception antennas arranged in the horizontal direction, e.g., the position coordinates $(X_{R\_\#4}, Y_{R\_\#4})$ of Rx #4 are $(X_{R\_\#1}+2D_H, Y_{R\_\#1}+D_V)$, has been described; however, the configuration is not limited thereto. Reception antenna Rx #4 may be, for example, arranged adjacent to the reception antennas arranged in the horizontal direction, e.g., the position coordinates $(X_{R\_\#4}, Y_{R\_\#4})$ of Rx #4 are $(X_{R\_\#1}, Y_{R\_\#1}+D_V)$.

In this way, the MIMO antenna arrangement shown in (a) of FIG. 15 is an arrangement that satisfies (Condition 1) described above.

With the arrangement of transmission antennas Tx #1 to Tx #4 and the arrangement of reception antennas Rx #1 to Rx #4, shown in (a) of FIG. 15, the position coordinates of virtual antennas VA #1 to VA #16 that make up the virtual reception array antenna shown in (b) of FIG. 15 can be calculated by the expression 31. For example, the position coordinates of virtual antennas VA #1 to VA #16 are $(X_{V\_\#1}, Y_{V\_\#1})=(0, 0)$, $(X_{V\_\#2}, Y_{V\_\#2})=(D_H, 0)$, $(X_{V\_\#3}, Y_{V\_\#3})=(D_H, D_V)$, $(X_{V\_\#4}, Y_{V\_\#4})=(2D_H, D_V)$, $(X_{V\_\#5}, Y_{V\_\#5})=(2D_H, 0)$, $(X_{V\_\#6}, Y_{V\_\#6})=(3D_H, 0)$, $(X_{V\_\#7}, Y_{V\_\#7})=(3D_H, D_V)$, $(X_{V\_\#8}, Y_{V\_\#8})=(4D_H, D_V)$, $(X_{V\_\#9}, Y_{V\_\#9})=(4D_H, 0)$, $(X_{V\_\#10}, Y_{V\_\#10})=(5D_H, 0)$, $(X_{V\_\#11}, Y_{V\_\#11})=(5D_H, D_V)$, $(X_{V\_\#12}, Y_{V\_\#12})=(6D_H, D_V)$, $(X_{V\_\#13}, Y_{V\_\#13})=(0, 2D_V)$, $(X_{V\_\#14}, Y_{V\_\#14})=(D_H, 2D_V)$, $(X_{V\_\#15}, Y_{V\_\#15})=(D_H, 3D_V)$, and $(X_{V\_\#16}, Y_{V\_\#16})=(2D_H, 3D_V)$.

Here, when $N_{Tx}$ transmission antennas 106 are arranged in any one of an L shape ($N_{Tx}≥3$), a T shape ($N_{Tx}≥3$), and a cross shape ($N_{Tx}≥4$) and, of Na reception antennas 202, (Na−Nz) reception antennas other than Nz (Nz≥1) reception antennas are arranged in any one of an L shape (Na−Nz≥3), a T shape (Na−Nz≥4), and a cross shape (Na−Nz≥5), where, of transmission antennas 106, the number of antennas arranged in the horizontal direction is $Nt_H$ and the number of antennas arranged in the vertical direction is $Nt_V$, and, of reception antennas 202, the number of antennas arranged in the horizontal direction is $Nr_H$ and the number of antennas arranged in the vertical direction is $Nr_V$, $Nt_H+Nt_V=N_{Tx}+1$ and $Nr_H+Nr_V=Na-Nz+1$ are satisfied. For example, in the case of FIG. 15A, $Nt_H=3$, $Nt_V=2$, $Nr_H=2$, $Nr_V=2$, $Nt_H+Nt_V=5$, and $Nr_H+Nr_V=4$, so the above expressions are satisfied.

In (a) of FIG. 15, the antenna spacings $D_{TH}$ of transmission antennas 106 arranged in the horizontal direction are set so as to be greater than the product $D_{RH}\times(Nr_H-1)=D_H$ of a value $(Nr_H-1)$, which is the number $Nr_H$ (=2) of reception antennas 202 arranged in the horizontal direction−1, and the antenna spacing $D_{RH}=D_H$. With this setting, of the antennas that make up the virtual reception array antenna shown in (b) of FIG. 15, the number $Nv_H$ of virtual antennas arranged in the horizontal direction is $Nt_H\times Nr_H$ elements (in (b) of FIG. 15, six elements VA #1, VA #2, VA #5, VA #6, VA #9, VA #10). In other words, with the above setting, virtual antennas VA #1, VA #2, VA #5, VA #6, VA #9, VA #10 arranged in the horizontal direction can be arranged without any overlap.

For example, when the antenna spacing $D_{TH}$ is set to the product $D_{RH}\times Nr_H$ (=$2D_H$) of the number $Nr_H$ (=2) of reception antennas 202 arranged in the horizontal direction and the antenna spacing $D_{RH}=D_H$, $Nt_H\times Nr_H$ (=6) element virtual antennas arranged in the horizontal direction out of the antennas that make up the virtual reception array antenna are arranged in a straight line at equal spacings $D_{RH}=D_H$.

Similarly, in (a) of FIG. 15, the antenna spacings $D_{TV}$ at which transmission antennas 106 are arranged in the vertical direction are set so as to be greater than the product $D_{RV}\times(Nr_V-1)=D_V$ of a value, which is the number $Nr_V$ (=2) of reception antennas 202 arranged in the vertical direction−1, and the antenna spacing $D_{RV}=D_V$. With this setting, of the antennas that make up the virtual reception array antenna shown in (b) of FIG. 15, the number $Nv_V$ of virtual antennas arranged in the vertical direction is $Nt_V\times Nr_V$ elements (in (b) of FIG. 15, four elements VA #2, VA #3, VA #14, VA #15). In other words, with the above setting, virtual antennas VA #2, VA #3, VA #14, VA #15 arranged in the vertical direction can be arranged without any overlap.

For example, when the antenna spacing $D_{TV}$ is set to the product $D_{RV}\times Nr_V$ (=$2D_V$) of the number $Nr_V$ (=2) of reception antennas 202 arranged in the vertical direction and the antenna spacing $D_{RV}=D_V$, $Nt_V\times Nr_V$ (=4) element virtual antennas arranged in the vertical direction out of the antennas that make up the virtual reception array antenna are arranged in a straight line at equal spacings $D_{RV}=D_V$.

Here, $D_H$ and $D_V$ are respectively the horizontal base spacing and the vertical base spacing and are shorter than the wavelength ($\lambda$) of a radar transmission signal. For example, $D_H$ and $D_V$ each may be set to about $0.45\lambda$ to about $0.8\lambda$ (in other words, any value within the range of $0.45\lambda$ to $0.8\lambda$). $\lambda$ represents the wavelength of carrier frequency of a radar transmission signal. For example, when a chirp signal is used as a radar transmission signal, $\lambda$ is the wavelength of a center frequency in a frequency sweep band of the chirp signal.

In this way, in a virtual reception array arrangement made up of a MIMO antenna arrangement that satisfies Condition 1 (for example, the same applies to the case of Condition 1a, Condition 2, and Condition 2a), the product of the number of elements of virtual reception antennas arranged in the horizontal direction and the number of elements of virtual reception antennas arranged in the vertical direction is $Nv_H\times Nv_V=Nt_H\times Nr_H\times Nt_V\times Nr_V$. In transmission and reception antennas, with the arrangement of an L shape (a T shape, or a cross shape), $Nt_H>1$, $Nt_V>1$, $Nr_H>1$, and $Nr_V>1$. Thus, the number of elements of the virtual reception antenna is greater than the product $N_{Tx}\times Na$ of the number of transmission antennas and the number of reception antennas (for example, $Nv_H\times Nv_V>N_{Tx}\times Na$). Therefore, it is possible to improve the effect of increasing the number of elements in the vertical direction and the number of elements in the horizontal direction in the virtual reception antenna.

Next, an example of direction estimation process in direction estimator 214 in the case where the above-described antenna arrangement is applied will be described.

For example, direction estimator 214 generates a virtual reception array correlation vector $h(f_{b\_cfar}, f_{s\_cfar})$ of transmission antennas 106, expressed in the equation 32, by using received signals $DeMul_z^{ncm}(f_{b\_cfar}, f_{s\_cfar})$ obtained through code separation process from code multiplexed signals transmitted from transmission antennas 106 and performs direction estimation process.

The virtual reception array correlation vector $h(f_{b\_cfar}, f_{s\_cfar})$ contains elements of $N_{Tx}\times Na$ that is the product of the number $N_{Tx}$ of transmission antennas and the number Na of reception antennas. The virtual reception array correlation vector $h(f_{b\_cfar}, f_{s\_cfar})$ is used to perform a process of performing direction estimation based on phase differences between reception antennas 202 over a reflected wave signal from a target. Here, z=1, ..., Na. In the MIMO antenna arrangement of Arrangement Example 1, when, for example, (a) of FIG. 15 is used, $N_{Tx}=4$ and Na=4, so the virtual reception array correlation vector $h(f_{b\_cfar}, f_{s\_cfar})$ contains 16 elements that respectively correspond to received signals in VA #1 to VA #16 in the virtual reception antenna arrangement shown in (b) of FIG.

(Equation 32)

$$h(f_{b\_cfar}, f_{s\_cfar}) = \begin{bmatrix} DeMUL_1^1(f_{b\_cfar}, f_{s_{cfar}}) \\ DeMUL_2^1(f_{b\_cfar}, f_{s_{cfar}}) \\ \vdots \\ DeMUL_{Na}^1(f_{b\_cfar}, f_{s_{cfar}}) \\ DeMUL_1^2(f_{b\_cfar}, f_{s_{cfar}}) \\ \vdots \\ DeMUL_{Na}^2(f_{b\_cfar}, f_{s_{cfar}}) \\ \vdots \\ DeMUL_1^{N_{Tx}}(f_{b\_cfar}, f_{s_{cfar}}) \\ \vdots \\ DeMUL_{Na}^{N_{Tx}}(f_{b\_cfar}, f_{s_{cfar}}) \end{bmatrix} \quad (32)$$

Subsequently, direction estimator 214 performs horizontal and vertical direction estimation process by using a virtual reception array correlation vector $h(f_{b\_cfar}, f_{s\_cfar})$ that contains received signals of the virtual reception array made up of the above-described transmission-reception antenna arrangement.

For example, the above-described virtual reception array element numbers (VA #numbers) respectively correspond to the element numbers of column vectors of the virtual reception array correlation vector $h(f_{b\_cfar}, f_{s\_cfar})$ expressed by the equation 32. For example, VA #1 corresponds to the first element $DeMul_1^{-1}(f_{b\_cfar}, f_{s\_cfar})$ of the column vector elements of $h(f_{b\_cfar}, f_{s\_cfar})$.

Direction estimator 214, for example, outputs a virtual reception array correlation vector $h_{\_after\_cal}(f_{b\_cfar}, f_{s\_cfar})$ for which an inter-antenna deviation is corrected by multiplying the virtual reception array correlation vector $h(f_{b\_cfar}, f_{s\_cfar})$ by an array correction value $h\_cal_{[y]}$ for correcting phase deviations and amplitude deviations between transmission array antennas and between reception array antennas as expressed by the expression 33, and performs horizontal and vertical direction estimation process in accordance with phase differences of an incoming reflected wave between reception antennas. Here, $y=1, \ldots, (N_{Tx} \times Na)$.

In the expression 33, CA is a $(N_{Tx} \times Na)$-dimensional square matrix including array correction coefficients for correcting phase deviations and amplitude deviations between transmission antennas and between reception antennas and coefficients for reducing influences of inter-element coupling between reception antennas as expressed by the expression 34. When coupling between antennas of the virtual reception array can be ignored, CA is a diagonal matrix and includes an array correction value $h\_cal_{[y]}$ for correcting phase deviations and amplitude deviations between transmission antennas and between reception antennas in diagonal components.

The virtual reception array correlation vector $h_{\_after\_cal}(f_{b\_cfar}, f_{s\_cfar})$ obtained by correcting inter-antenna deviations is a column vector consisting of $N_{Tx} \times Na$ elements. Hereinafter, the elements are represented by $h_1(f_{b\_cfar}, f_{s\_cfar}), \ldots, h_{NTx \times Na}(f_{b\_cfar}, f_{s\_cfar})$ and are used to describe direction estimation process.

(Equation 33)

$$h_{\_after\_cal}(f_{b\_cfar}, f_{s\_cfar}) = CA \times h(f_{b\_cfar}, f_{s\_cfar}) = \begin{bmatrix} h_1(f_{b\_cfar}, f_{s\_cfar}) \\ h_2(f_{b\_cfar}, f_{s\_cfar}) \\ \vdots \\ h_{N_{Tx} \times Na}(f_{b\_cfar}, f_{s\_cfar}) \end{bmatrix} \quad (33)$$

(Equation 34)

$$CA = \begin{bmatrix} h\_cal_{[1]} & 0 & \cdots & 0 \\ 0 & h\_cal_{[2]} & \ddots & \vdots \\ \vdots & \ddots & \ddots & 0 \\ 0 & \cdots & 0 & h\_cal_{[Nt \times Na]} \end{bmatrix}$$

Direction estimator 214 performs horizontal and vertical direction estimation by using the virtual reception array correlation vector $h_{\_after\_cal}(f_{b\_cfar}, f_{s\_cfar})$ obtained by correcting inter-antenna deviations. Direction estimator 214 may, for example, calculate a spatial profile by varying an azimuth direction θ and an elevation direction Φ in a direction-of-arrival estimation evaluation function value $P(θ, Φ, f_{b\_cfar}, f_{s\_cfar})$ within prescribed angular ranges in horizontal and vertical direction estimation. Direction estimator 214, for example, extracts a predetermined number of local maximum peaks of the calculated spatial profile in descending order and outputs the azimuth direction and elevation direction of each local maximum peak as a direction-of-arrival estimate (for example, positioning output).

There are various direction estimation evaluation function values $P(θ, Φ, f_{b\_cfar}, f_{s\_cfar})$ depending on a direction-of-arrival estimation algorithm. An estimation method using the array antenna described in, for example, NPL 4 may be used.

For example, a beam former method can be expressed as the following expression 35. Other methods such as Capon and MUSIC can be similarly applied.

$$P(θ_u, φ_v, f_{b\_cfar}, f_{s\_cfar}) = |a^H(θ_u, φ_v) h_{\_after\_cal}(f_{b\_cfar}, f_{s\_cfar})|^2 \quad \text{(Equation 35)}$$

Here, a character superscript H is a Hermitian transpose operator.

The direction $θ_u$ is a value varied at predetermined azimuth spacings $β_1$ within an azimuth range for performing direction-of-arrival estimation. For example, $θ_u$ may be set as follows.

$θ_u = θ_{min} + u \times β_1$, and $u=0, \ldots, NU-1$.

$NU = \text{floor}[(θ_{max} - θ_{min})/β_1]$

Here, floor(x) is a function that returns a maximum integer value not exceeding real number x.

The direction $φ_v$ is a value varied at predetermined elevation spacings $β_2$ within a predetermined elevation range for performing direction-of-arrival estimation. For example, $Φ_V$ may be set as follows.

$Φ_V = Φ_{min} + v \times β_2$, and $v=0, \ldots, NV-1$.

$NV = \text{floor}[(Φ_{max} - Φ_{min})/β_2]$

In the present embodiment, radar apparatus 10 may calculate a directional vector $α(θ_u, θ_v)$ in advance in accordance with the virtual reception array arrangement VA #1, . . . , VA #($N_{Tx} \times Na$). Here, the directional vector $α(θ_u, θ_v)$ is an $(N_{Tx} \times Na)$-dimensional column vector containing complex responses of the virtual reception array antenna in the case where a radar reflected wave comes from the azimuth direction θ and the elevation direction Φ as elements. The complex responses $a(θ_u, θ_v)$ of the virtual reception array antenna represent phase differences geometrically optically at interelement spacings of the virtual reception array antenna in the case where a radar reflected wave comes from the azimuth direction θ and the elevation direction Φ.

Next, an example of a direction estimation result (computer simulation result) in the case where the above-described antenna arrangement according to Arrangement Example 1 is applied will be described.

Example 1 of Direction Estimation Result of Arrangement Example 1

In Example 1, a direction estimation result in the case where radar apparatus 10 has received a reflected wave from one target will be described.

Figure 16:
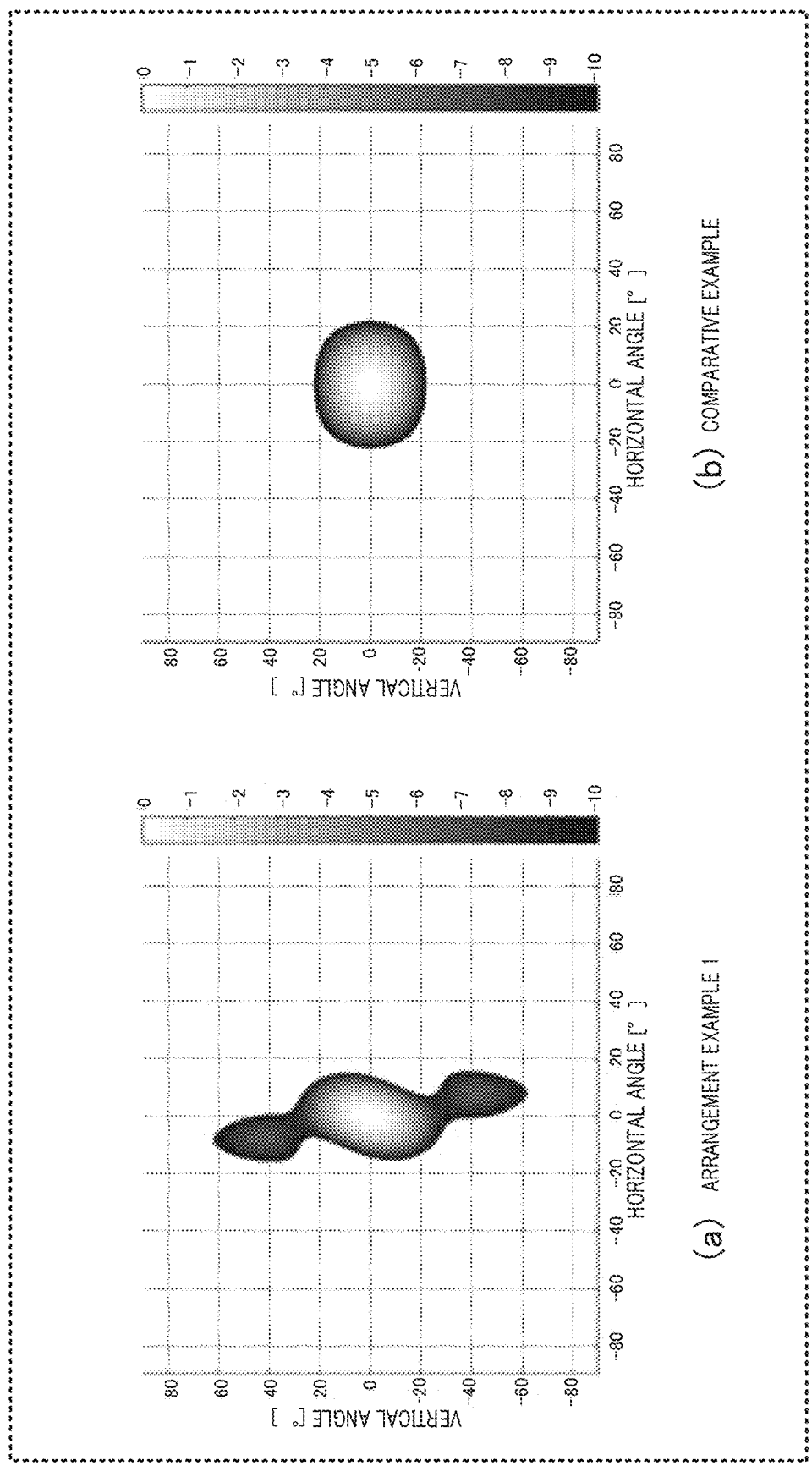
FIG. 16 illustrates diagrams showing an example of a computer simulation result of direction estimation process according to Arrangement Example 1.

(a) of FIG. 16 shows an example of a direction estimation result (computer simulation result) in the case where a beam former method is used as a direction-of-arrival estimation algorithm in direction estimator 214 in the case where the MIMO antenna arrangement (for example, (a) of FIG. 15) of Arrangement Example 1 is used. (b) of FIG. 16 shows an example of a direction estimation result in the case where the antenna arrangement shown in (a) of FIG. 1 is used as Comparative Example.

(a) and (b) of FIG. 16 shows an example of a direction estimation result in the case where, for example, $D_H = 0.5λ$ and $D_V = 0.5λ$ in the MIMO antenna arrangement.

(a) and (b) of FIG. 16 shows an example in which outputs of the direction-of-arrival estimation evaluation function value in the range of ±90 degrees in the horizontal direction and in the range of ±90 degrees in the vertical direction in the case where a true value of a target is set at a horizontal angle of zero degrees and a vertical angle of zero degrees are plotted.

A maximum peak is obtained at the target true value (here, horizontal zero degrees and vertical zero degrees) from the direction estimation result shown in (a) of FIG. 16, so it is confirmed that direction estimator 214 properly estimates a target direction.

In Arrangement Example 1 shown in (a) of FIG. 16, 3 dB beam width in the horizontal direction is about 16 degrees. In Comparative Example shown in (b) of FIG. 16, 3 dB beam width in the horizontal direction is about 26 degrees. In the antenna arrangement of Arrangement Example 1 ((a) of FIG. 15), the number $NV_H$ of virtual antennas arranged in the horizontal direction at the spacings $D_H$=0.5λ is six, while, in the antenna arrangement of Comparative Example ((a) of FIG. 1), the number $NV_H$ of virtual antennas arranged in the horizontal direction at the spacings $D_H$=0.5λ is four. With this configuration, the aperture length of the virtual antennas in the horizontal direction in Arrangement Example 1 is 1.7 times longer than or equal to the aperture length of the virtual antennas in the horizontal direction in Comparative Example, so, as shown in (a) and (b) of FIG. 16, the horizontal beam width in Arrangement Example 1 is narrower than the horizontal beam width in Comparative Example.

In Arrangement Example 1 shown in (a) of FIG. 16, 3 dB beam width in the vertical direction is about 29 degrees. In Comparative Example shown in (b) of FIG. 16, 3 dB beam width in the vertical direction is about 26 degrees. For example, in the antenna arrangement of Arrangement Example 1 ((a) of FIG. 15), the number $NV_V$ of virtual antennas arranged in the vertical direction at the spacings $D_V$=0.52λ is four, while, in the antenna arrangement of Comparative Example ((a) of FIG. 1), the number $NV_V$ of virtual antennas arranged in the vertical direction at the spacings $D_V$=0.5λ is four. With this configuration, since the aperture lengths of the virtual antennas in the vertical direction of both Arrangement Example 1 and Comparative Example are the same, the vertical beam widths are similar.

Example 2 of Direction Estimation Result of Arrangement Example 1

In Example 1, a direction estimation result in the case where radar apparatus 10 has received reflected waves from two targets will be described.

Figure 17:
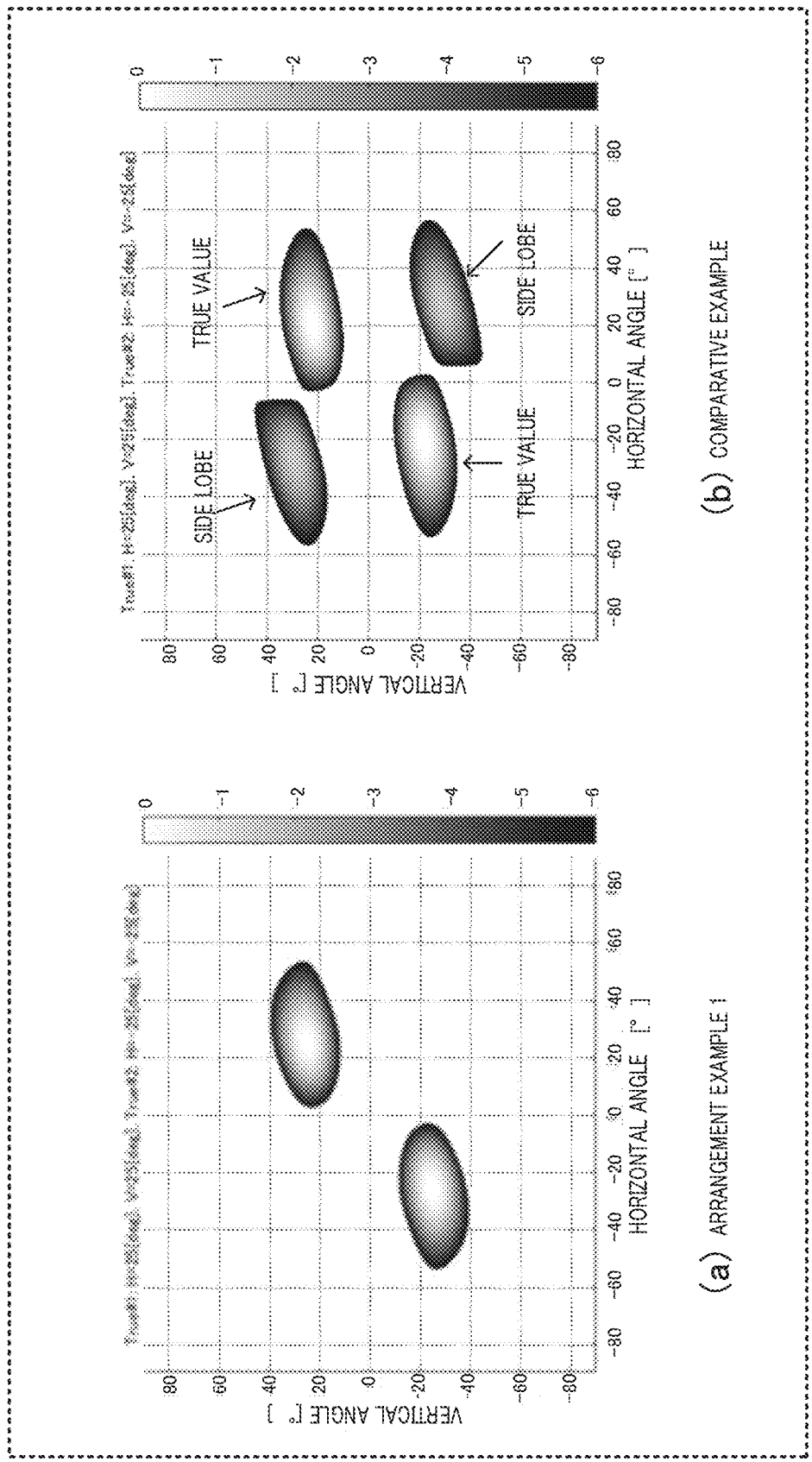
FIG. 17 illustrates diagrams showing an example of a computer simulation result of direction estimation process according to Arrangement Example 1.

(a) of FIG. 17 shows an example of a direction estimation result (computer simulation result) in the case where a beam former method is used as a direction-of-arrival estimation algorithm in direction estimator 214 in the case where the MIMO antenna arrangement (for example, (a) of FIG. 15) of Arrangement Example 1 is used.

Figure 18:
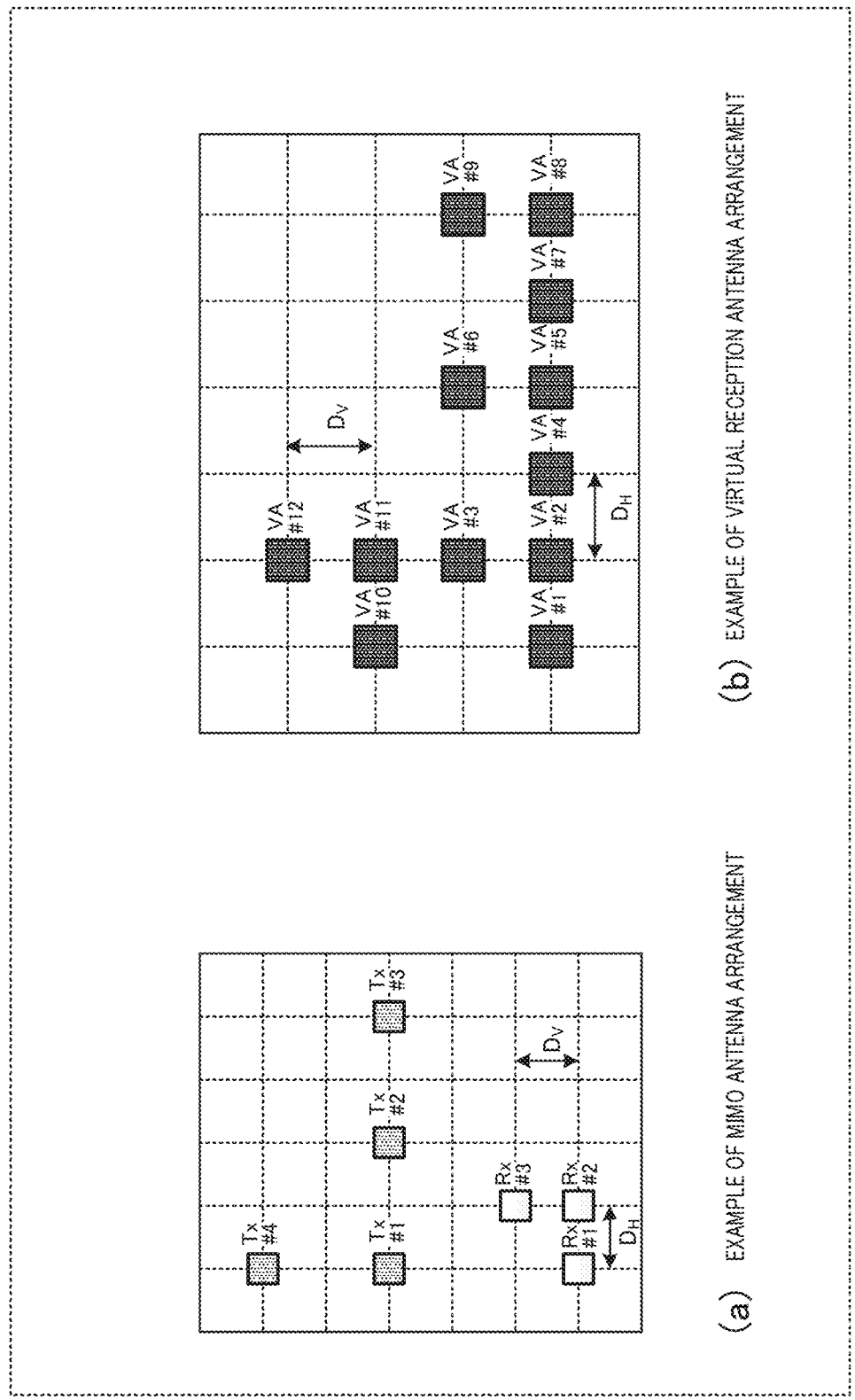
FIG. 18 illustrates a diagram showing an example of an arrangement of transmission and reception antennas and a diagram showing an example of an arrangement of a virtual reception array according to Arrangement Example 1.

(b) of FIG. 17 shows an example of a direction estimation result in the case where the antenna arrangement shown in (a) of FIG. 18 is used as Comparative Example. The antenna arrangement shown in (a) of FIG. 18 is, for example, an arrangement in which Rx #4 (in other words, separation performance improving antenna) is removed from the antenna arrangement of (a) of FIG. 15. (b) of FIG. 18 is a diagram showing an example of an arrangement of a virtual reception antenna obtained by the antenna arrangement shown in (a) of FIG. 18.

(a) and (b) of FIG. 17 shows an example of a direction estimation result in the case where, for example, $D_H$=0.5λ and $D_V$=0.5λ in the MIMO antenna arrangement.

(a) and (b) of FIG. 17 show an example in which outputs of the direction-of-arrival estimation evaluation function value in the range of ±90 degrees in the horizontal direction and in the range of ±90 degrees in the vertical direction in the case where a true value of target #1 is set at a horizontal angle of 25 degrees and a vertical angle of 25 degrees and a true value of target #2 is set at a horizontal angle of −25 degrees and a vertical angle of −25 degrees are plotted.

Maximum peaks are obtained at the directions of two target true values from the direction estimation result shown in (a) of FIG. 17, so it is confirmed that direction estimator 214 properly estimates target directions.

On the other hand, peaks are directed in the directions of two target true values from the direction estimation result shown in (b) of FIG. 17, and high-level side lobes are occurring in directions different from the target directions. For this reason, in Comparative Example, when there is a received power difference between reflected waves from the two targets, there is a possibility that a received power in the side lobe direction of the target with a higher received power becomes higher than the peak level of the target with a lower received power, so there is a possibility that a radar apparatus erroneously estimates the direction of the target with a lower received power. In this way, in the antenna arrangement shown in (a) of FIG. 18 (transmission L-shape and reception L-shape arrangement), a side lobe level can be higher in the case where multiple targets are present. The following matters are listed as factors.

<Arrangement in Vertical Direction>

In a virtual reception antenna, when one virtual antenna is arranged at a vertical position, in other words, at a position on a vertical axis at which one virtual antenna is arranged in the horizontal direction, it is difficult to separate multiple waves in the horizontal direction (for example, VA #12 shown in (b) of FIG. 18).

In a virtual reception antenna, when a plurality of virtual antennas is arranged at a vertical position, it is possible to separate multiple waves in the horizontal direction; however, when the horizontal spacings of the virtual antennas are greater than or equal to one wavelength (for example, VA #3, VA #6, and VA #9 shown in (b) of FIG. 18), it is difficult to separate multiple waves at specific horizontal spacings (azimuth spacings at which grating lobes occur). In other words, at a position on a vertical axis at which a plurality of virtual antennas is present in the horizontal direction, it is possible to separate multiple waves in the horizontal direction; however, when the horizontal spacings of the virtual antennas are greater than or equal to one wavelength, it is difficult to separate multiple waves at specific horizontal spacings.

<Arrangement in Horizontal Direction>

In a virtual reception antenna, when one virtual antenna is arranged at a horizontal position, in other words, at a position on a horizontal axis at which one virtual antenna is arranged in the vertical direction, it is difficult to separate multiple waves in the vertical direction (for example, VA #4 and VA #7 shown in (b) of FIG. 18).

In a virtual reception antenna, when a plurality of virtual antennas is arranged at a horizontal position, it is possible to separate multiple waves in the vertical direction; however, when the vertical spacings are greater than or equal to one wavelength (for example, VA #1 and VA #10 shown in (b) of FIG. 18), it is difficult to separate multiple waves at specific vertical spacings (elevation spacings at which grating lobes occur). In other words, at a position on a horizontal axis at which a plurality of virtual antennas is arranged in the vertical direction, it is possible to separate multiple waves in the vertical direction; however, when the vertical spacings of the virtual antennas are greater than or equal to one wavelength, it is difficult to separate multiple waves at specific vertical spacings.

In contrast, in Arrangement Example 1, as described above, when an antenna is added to the transmission L-shape and reception L-shape arrangement (for example, the antenna arrangement shown in (a) of FIG. 18) in accordance with Condition 1 or Condition 2, in at least one of the vertical direction and the horizontal direction, in a virtual reception antenna, the arrangement in which the number of virtual antennas is one is not present at a vertical (or horizontal) position, a plurality of virtual antennas is arranged at a vertical (or horizontal) position, and it is possible to separate multiple waves in the horizontal (or vertical) direction, and in a virtual reception antenna, when a plurality of virtual antennas is present at a vertical (or horizontal) position, the arrangement in which the spacings of horizontal positions (or vertical positions) are greater than or equal to one wavelength is reduced, and it is possible to separate multiple waves at specific horizontal (or vertical) spacings.

In this way, in Arrangement Example 1 ((a) of FIG. 15), by adding antenna Rx #4 to Comparative Example ((a) of FIG. 18) in accordance with Condition 1, for example, the vertical position at which one virtual antenna is arranged (the vertical position of VA #12 of (a) of FIG. 18) can be changed to the vertical positions at which a plurality of virtual antennas is arranged (for example, VA #15 and VA #16 of (b) of FIG. 15) with VA #16 shown in (b) of FIG. 15 (the virtual antenna corresponding to Rx #4 of (a) of FIG. 15), and it is possible to separate multiple waves in the horizontal direction.

For example, with VA #4, VA #8, and VA #12 (the virtual antennas corresponding to Rx #4) shown in (b) of FIG. 15, the virtual antennas (for example, VA #3, VA #4, VA #7, VA #8, VA #11, and VA #12) are arranged such that the horizontal antenna spacings become the base spacings $D_H$ at a vertical position including these virtual antennas. Thus, in Arrangement Example 1, the level of each side lobe is reduced as compared to Comparative Example.

For example, with VA #4 and VA #8 (the virtual antenna corresponding to Rx #4) shown in (b) of FIG. 15, the virtual antennas (for example, VA #4 and VA #5, and VA #8 and VA #9) are arranged such that the vertical antenna spacings become the base spacings $D_V$ at horizontal positions including these virtual antennas. Thus, in Arrangement Example 1, the level of each side lobe is reduced as compared to Comparative Example.

For example, the horizontal position at which one virtual antenna is arranged (the horizontal position of VA #4 of (a) of FIG. 18) can be changed to a horizontal position at which a plurality of virtual antennas is arranged in the vertical direction (for example, VA #4 and VA #5 of FIG. 15 (ab) with VA #4 shown in (b) of FIG. 15 (the virtual antennas corresponding to Rx #4 of (a) of FIG. 15), and it is possible to separate multiple waves in the vertical direction.

For example, the horizontal position at which one virtual antenna is arranged (the horizontal position of VA #7 of (a) of FIG. 18) can be changed to a horizontal position at which a plurality of virtual antennas is arranged in the vertical direction (for example, VA #8 and VA #9 of (b) of FIG. 15 with VA #8 shown in (b) of FIG. 15 (the virtual antennas corresponding to Rx #4 of (a) of FIG. 15) and it is possible to separate multiple waves in the vertical direction.

An example of a direction estimation result (computer simulation result) according to Arrangement Example 1 has been described.

Direction estimator 214 may, for example, output a direction estimation result and further output distance information based on a distance index $f_{b\_cfar}$ (for example, information converted by using the expression 8), a Doppler frequency index $f_{s\_cfar}$ of a target and Doppler velocity information of the target based on a determined result $DR_{min}$ in aliasing determiner 212 as a positioning result. Direction estimator 214 may output the positioning result to, for example, a control apparatus of a vehicle in an in-vehicle radar or an infrastructure control apparatus in an infrastructure radar (not shown).

Direction estimator 214 may, for example, calculate a Doppler frequency index $f_{es\_cfar}$ by using the expression 36 in accordance with the Doppler frequency index $f_{s\_cfar}$ and $DR_{min}$ that is the determined result in aliasing determiner 212. The Doppler frequency index $f_{es\_cfar}$ corresponds to, for example, a Doppler index in the case where the FFT size of Doppler analyzer 210 is expanded to Loc×Ncode. Hereinafter, $f_{es\_cfar}$ is referred to as "extended Doppler frequency index".

$$f_{es\_cfar} = f_{s\_cfar} + DR_{min} \times \text{Ncode} \quad \text{(Equation 36)}$$

It is assumed up to a Doppler range±1/(2×Tr), and the range of the extended Doppler frequency index $f_{es\_cfar}$, corresponding to the Doppler range, is −Loc×Ncode/2 ≤ $f_{es\_cfar}$ < Loc×Ncode/2, so, in the expression 36, as a result of calculation, when $f_{es\_cfar}$ < −Loc×Ncode/2, $f_{es\_cfar}$+Loc× Ncode is set for $f_{es\_cfar}$. When $f_{es\_cfar}$ > Loc×Ncode/2, $f_{es\_cfar}$−Loc×Ncode is set for $f_{es\_cfar}$.

Doppler frequency information may be converted to a relative speed component and output. To convert the Doppler frequency index $f_{es\_cfar}$ to a relative speed component $v_d(f_{es\_cfar})$, the Doppler frequency index $f_{es\_cfar}$ may be converted by using the expression 37. Here, λ is the wavelength of the carrier frequency of an RF signal output from a transmission radio (not shown). When a chirp signal is used as a radar transmission signal, λ is the wavelength of a center frequency in a frequency sweep band of the chirp signal. $\Delta_f$ is a Doppler frequency interval in FFT process in Doppler analyzer 210. For example, in the present embodiment, $\Delta_f = 1/\{Loc \times N_{code} \times T_r\}$.

(Equation 37)

$$v_d(f_{es\_cfar}) = \frac{\lambda}{2} f_{es\_cfar} \Delta_f$$

An example of the operation of radar apparatus 10 has been described.

As described above, in Arrangement Example 1, in radar apparatus 10, in the arrangement of transmission antennas 106 and reception antennas 202, for example, the aperture length of the virtual antennas can be expanded with a smaller number of antennas with the antenna arrangement of Condition 1, Condition 1a, Condition 2, or Condition 2a described above, with the result that separation performance for separating multiple waves is improved while angle measurement accuracy of at least one of the vertical direction and the horizontal direction is maintained.

According to the present embodiment, the target detection accuracy of radar apparatus 10 is improved.

In Arrangement Example 1, when at least one of the number of transmission antennas and the number of reception antennas is increased, virtual reception antennas are further added in the arrangement expressed by the expression 31 to the configuration described in Arrangement Example 1 (for example, (a) of FIG. 15). In other words, other virtual reception antennas are further added to the virtual reception antenna arrangement shown in (b) of FIG. 15. Therefore, the effects described in the present embodiment are retained, so similar effects are obtained even in the antenna arrangement including Arrangement Example 1. The same applies to the following arrangement examples.

Arrangement Example 2

Figure 19:
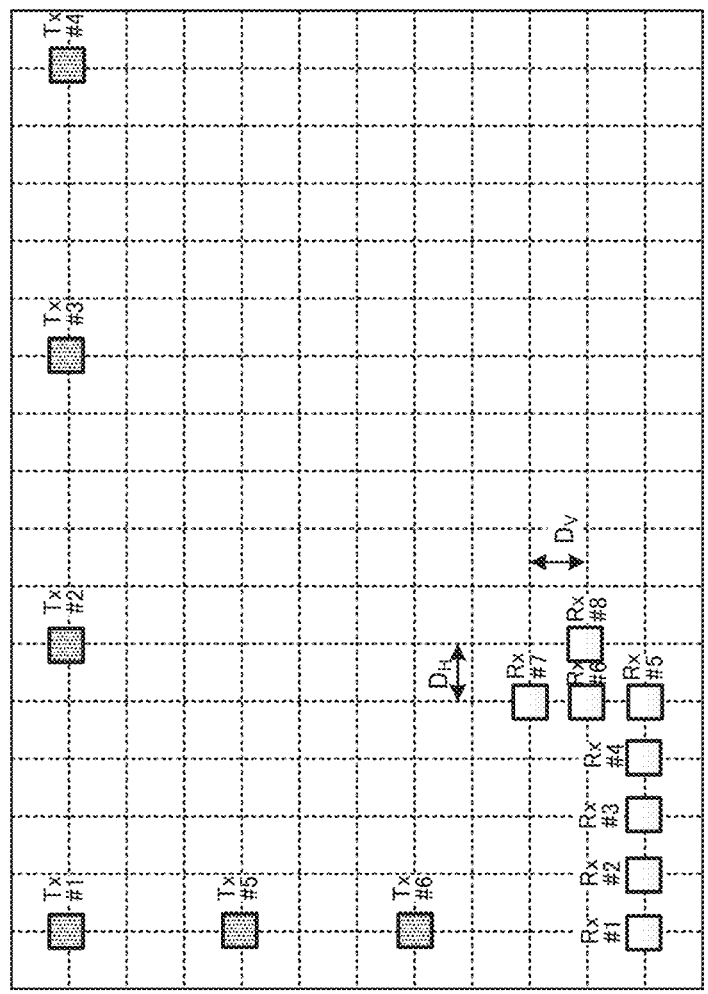
FIG. 19 is a diagram showing an example of an arrangement of transmission and reception antennas according to Arrangement Example 2.

FIG. 19 is a diagram showing an example of an arrangement of transmission antennas 106 (represented by, for example, Tx) and reception antennas 202 (represented by, for example, Rx) (for example, an example of a MIMO antenna arrangement) according to Arrangement Example 2.

In the example shown in FIG. 19, the number $N_{Tx}$ of transmission antennas is six (for example, Tx #1, Tx #2, . . . , and Tx #6), and the number Na of reception antennas is eight (for example, Rx #1, Rx #2, . . . , and Rx #8).

Figure 20:
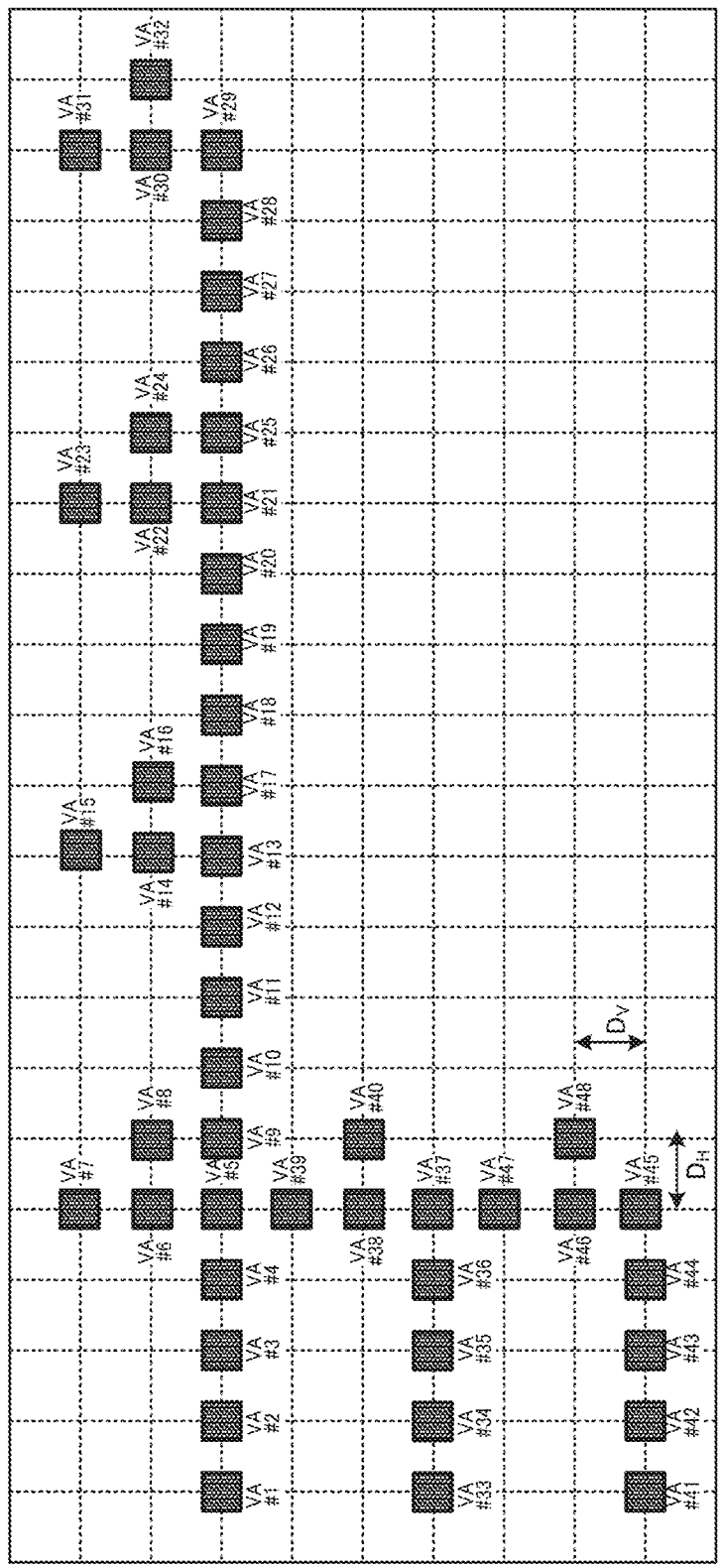
FIG. 20 is a diagram showing an example of an arrangement of a virtual reception array according to Arrangement Example 2.

FIG. 20 is a diagram showing an example of an arrangement of a virtual reception antenna obtained from the antenna arrangement shown in FIG. 19.

For example, the antenna arrangement of FIG. 19 is an arrangement in which, in both transmission and reception antennas, the number of antennas arranged in the horizontal direction is greater than the number of antennas arranged in the vertical direction (for example, $Nt_H > Nt_V$, and $Nr_H > Nr_V$). With such an arrangement, in the virtual reception antenna arrangement shown in FIG. 20, the number of antennas arranged in the horizontal direction is greater than the number of antennas arranged in the vertical direction, and the horizontal aperture length is expanded as compared to the vertical aperture length, so it is possible to improve horizontal angular resolution as compared to vertical angular resolution in radar apparatus 10.

Here, the arrangement of the virtual reception array antenna may be, for example, expressed as the expression 31 in accordance with the positions (for example, the positions of feeding points) of transmission antennas 106 that make up a transmission array antenna and the positions (for example, the positions of feeding points) of reception antennas 202 that make up a reception array antenna.

The position coordinates of each of transmission antennas 106 (for example, Tx #n) that make up the transmission array antenna are represented by $(X_{T\_\#n}, Y_{T\_\#n})$ (for example, where n=1, . . . , $N_{Tx}$), the position coordinates of each of reception antennas 202 (for example, Rx #m) that make up the reception array antenna are represented by $(X_{R\_\#m}, Y_{R\_\#m})$ (for example, where m=1, . . . , Na), and the position coordinates of each of the virtual antennas VA #k that make up the virtual reception array antenna are represented by $(X_{V\_\#k}, Y_{V\_\#k})$ (for example, where k=1, . . . , $N_{Tx} \times Na$).

In the expression 31, VA #1 is, for example, expressed as the position reference (0, 0) of the virtual reception array.

In FIG. 19, the arrangement of transmission antennas Tx #1 to Tx #6 is an L-shape arrangement. For example, Tx #1 to Tx #4 are arranged in the horizontal direction, and Tx #1, Tx #5, and Tx #6 are arranged in the vertical direction (which corresponds to, for example, (1) of Condition 1). For example, with respect to the position coordinates of Tx #1 $(X_{T\_\#1}, Y_{T\_\#1})$, the position coordinates of Tx #2 to Tx #6 are $(X_{T\_\#2}, Y_{T\_\#2})=(X_{T\_\#1}+5D_H, Y_{T\_\#1})$, $(X_{T\_\#3}, Y_{T\_\#3})=(X_{T\_\#1}+10D_H, Y_{T\_\#1})$, $(X_{T\_\#4}, Y_{T\_\#4})=(X_{T\_\#1}+15D_H, Y_{T\_\#1})$, $(X_{T\_\#5}, Y_{T\_\#5})=(X_{T\_\#1}, Y_{T\_\#1}+3D_V)$, and $(X_{T\_\#6}, Y_{T\_\#6})=(X_{T\_\#1}, Y_{T\_\#1}+6D_V)$. Here, the antenna spacings of transmission antennas Tx #1 to Tx #4 arranged in the horizontal direction are wider than the aperture length $4D_H$ of reception antennas 202 arranged in the horizontal direction (which corresponds to, for example, (3) of Condition 1). In FIG. 19, the antenna spacings of transmission antennas Tx #1, Tx #5, and Tx #6 arranged in the vertical direction are wider than the aperture length $2D_V$ of reception antennas arranged in the vertical direction; however, the configuration is not limited thereto.

On the other hand, in Na (=8) reception antennas Rx #1 to Rx #8 shown in FIG. 19, seven (=Na−Nz) reception antennas Rx #1 to Rx #7 other than Nz (=1) antenna Rx #8 that is the separation performance improving antenna are arranged in an L shape (which corresponds to, for example, (2) of Condition 1), and the antenna spacings of reception antennas Rx #1 to Rx #5 arranged in the horizontal direction are the horizontal base spacings $D_H$.

For example, the arrangement of reception antennas Rx #1 to Rx #7 shown in FIG. 19 is an arrangement in which an L shape is rotated 90° in the counterclockwise direction, Rx #1 to Rx #5 are arranged in the horizontal direction, and Rx #5 to Rx #7 are arranged in the vertical direction. For example, with respect to the position coordinates of Rx #1 $(X_{R\_\#1}, Y_{R\_\#1})$, the position coordinates of Rx #2 to Rx #7 are $(X_{R\_\#2}, Y_{R\_\#2})=(X_{R\_\#1}+D_H, Y_{R\_\#1})$, $(X_{R\_\#3}, Y_{R\_\#3})=(X_{R\_\#1}+2D_H, Y_{R\_\#1})$, $(X_{R\_\#4}, Y_{R\_\#4})=(X_{R\_\#1}+3D_H, Y_{R\_\#1})$, $(X_{R\_\#5}, Y_{R\_\#5})=(X_{R\_\#1}+4D_H, Y_{R\_\#1})$, $(X_{R\_\#6}, Y_{R\_\#6})=(X_{R\_\#1}+4D_H, Y_{R\_\#1}+D_V)$, and $(X_{R\_\#7}, Y_{R\_\#7})=(X_{R\_\#1}+4D_H, Y_{R\_\#1}+2D_V)$.

In FIG. 19, reception antenna Rx #8 corresponding to Nz=1 (for example, separation performance improving antenna) is arranged at a position on the vertical axis $(Y_{R\_\#1}+D_V)$ different from a position on the vertical axis $(Y_{R\_\#1})$ of reception antennas Rx #1 to Rx #5 arranged in the horizontal direction and at a position at the horizontal base spacing $D_H$ away from reception antennas Rx #5 to Rx #7 arranged in the vertical direction (which corresponds to, for example, (4) of Condition 1). In other words, the position coordinates of Rx #8 $(X_{R\_\#8}, Y_{R\_\#8})=(X_{R\_\#1}+5D_H, Y_{R\_\#1}+D_V)$.

In the antenna arrangement shown in FIG. 19, the case where, when Rx #8 that is Nz reception antenna corresponding to the separation performance improving antenna is arranged at a position on the vertical axis $(Y_{R\_\#1}+D_V)$ different from a position on the vertical axis $(Y_{R\_\#1})$ of reception antennas 202 arranged in the horizontal direction and at a horizontal position adjacent to reception antenna Rx #6, Rx #8 is arranged on the other side of the reception antennas arranged in the horizontal direction, e.g., the position coordinates of Rx #8 $(X_{R\_\#8}, Y_{R\_\#8})=(X_{R\_\#1}+5D_H, Y_{R\_\#1}+D_V)$, has been described; however, the configuration is not limited thereto. Reception antenna Rx #8 may be arranged at $(X_{R\_\#8}, Y_{R\_\#8})=(X_{R\_\#1}+3D_H, Y_{R\_\#1}+D_V)$, $(X_{R\_\#8}, Y_{R\_\#8})=(X_{R\_\#1}+3D_H, Y_{R\_\#1}+2D_V)$, or $(X_{R\_\#8}, Y_{R\_\#8})=(X_{R\_\#1}+5D_H, Y_{R\_\#1}+2D_V)$.

In this way, the MIMO antenna arrangement shown in FIG. 19 is an arrangement that satisfies (Condition 1) described above.

In FIG. 19, the antenna spacings $D_{TH}$ of transmission antennas 106 arranged in the horizontal direction are set so as to be greater than the product $D_{RH} \times (Nr_H-1)=4D_H$ of a value, which is the number $Nr_H$ (=5) of reception antennas arranged in the horizontal direction−1, and the antenna spacing $D_{RH}=D_H$. With this setting, of the antennas that make up the virtual reception array antenna shown in FIG.

20, the number $Nv_H$ of virtual antennas arranged in the horizontal direction is $Nt_H \times Nr_H$ elements (in FIG. 20, 20 elements VA #1 to VA #5, VA #9 to VA #13, VA #17 to VA #21, and VA #25 to VA #29). In other words, with the above setting, virtual antennas VA #1 to VA #5, VA #9 to VA #13, VA #17 to VA #21, and VA #25 to VA #29 arranged in the horizontal direction can be arranged without any overlap.

For example, when the antenna spacings $D_{TH}$ are set to the product $D_{RH} \times Nr_H$ ($5D_H$) of the number $Nr_H$ (=5) of reception antennas 202 arranged in the horizontal direction and the antenna spacing $D_{RH} = D_H$, $Nt_H \times Nr_H$ (=20) element virtual antennas arranged in the horizontal direction out of the antennas that make up the virtual reception array antenna are arranged in a straight line at equal spacings $D_{RH} = D_H$.

Similarly, in FIG. 19, the antenna spacings $D_{TV}$ at which transmission antennas 106 are arranged in the vertical direction are set so as to be greater than the product $D_{RV} \times (Nr_V - 1) = 2D_V$ of a value, which is the number $Nr_V$ (=3) of reception antennas 202 arranged in the vertical direction−1, and the antenna spacing $D_{RV} = D_V$. With this setting, of the antennas that make up the virtual reception array antenna shown in FIG. 20, the number $Nv_V$ of virtual antennas arranged in the vertical direction is $Nt_V \times Nr_V$ elements (in FIG. 20, nine elements VA #5 to VA #7, VA #37 to VA #39, and VA #45 to VA #47). In other words, with the above setting, virtual antennas VA #5 to VA #7, VA #37 to VA #39, and VA #45 to VA #47 arranged in the vertical direction can be arranged without any overlap.

For example, when the antenna spacings $D_{TV}$ are set to the product $D_{RV} \times Nr_V$ (=$3D_V$) of the number $Nr_V$ (=3) of reception antennas 202 arranged in the vertical direction and the antenna spacing $D_{RV} = D_V$, $Nt_V \times Nr_V$ (=9) element virtual antennas arranged in the vertical direction out of the antennas that make up the virtual reception array antenna are arranged in a straight line at equal spacings $D_{RV} = D_V$.

Here, $D_H$ and $D_V$ are respectively the horizontal base spacing and the vertical base spacing and are prescribed spacings shorter than the wavelength ($\lambda$) of a radar transmission signal. For example, $D_H$ and $D_V$ each may be set to about 0.45$\lambda$ to about 0.8$\lambda$. $\lambda$ represents the wavelength of carrier frequency of a radar transmission signal. For example, when a chirp signal is used as a radar transmission signal, $\lambda$ is the wavelength of a center frequency in a frequency sweep band of the chirp signal.

In this way, in a virtual reception array arrangement made up of a MIMO antenna arrangement that satisfies Condition 1 (for example, the same applies to the case of Condition 1a, Condition 2, and Condition 2a), the product of the number of elements of virtual reception antennas arranged in the horizontal direction and the number of elements of virtual reception antennas arranged in the vertical direction is $Nv_H \times Nv_V = Nt_H \times Nr_H \times Nt_V \times Nr_V$. In transmission and reception antennas, with the arrangement of an L shape (a T shape, or a cross shape), $Nt_H > 1$, $Nt_V > 1$, $Nr_H > 1$, and $Nr_V > 1$. Thus, the number of elements of the virtual reception antennas is greater than the product $N_{Tx} \times Na$ of the number of transmission antennas and the number of reception antennas (for example, $Nv_H \times Nv_V > N_{Tx} \times Na$). Therefore, it is possible to improve the effect of increasing the number of elements in the vertical direction and the number of elements in the horizontal direction in the virtual reception antenna.

For example, as the number Nz of separation performance improving antennas reduces, the effect of increasing the number of elements in the vertical direction and the number of elements in the horizontal direction in the virtual reception antenna improves. On the other hand, even when the number Nz of separation performance improving antennas increases, the effect of increasing the number of elements is obtained. For example, as in the case of FIG. 19, where $N_{Tx}$=6 and Na=8, even when the number Nz of separation performance improving antennas is four, $Nr_H$=3 and $Nr_V$=3, so $Nt_H \times Nr_H \times Nt_V \times Nr_V = 4 \times 3 \times 3 \times 3 = 108$, and the number of elements of the virtual reception antenna is set so as to be greater than the product $N_{Tx} \times Na$ (=48) of the number of transmission antennas and the number of reception antennas.

Next, an example of a direction estimation result (computer simulation result) in the case where the above-described antenna arrangement according to Arrangement Example 2 is applied will be described.

Figure 21:
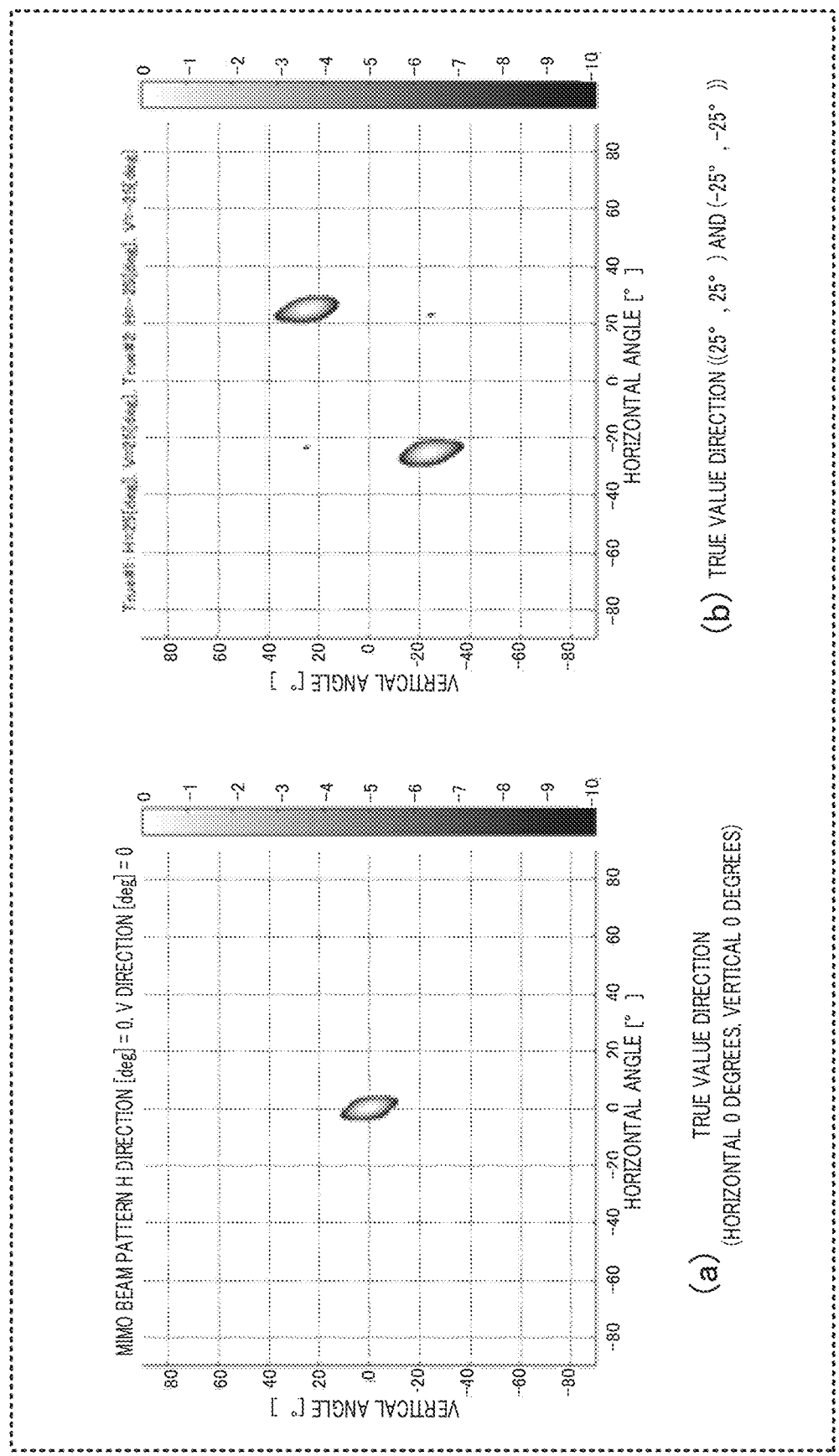
FIG. 21 illustrates diagrams showing an example of a computer simulation result of direction estimation process according to Arrangement Example 2.

(a) and (b) of FIG. 21 shows an example of a direction estimation result (computer simulation result) in the case where a beam former method is used as a direction-of-arrival estimation algorithm in direction estimator 214 in the case where the MIMO antenna arrangement (for example, FIG. 19) of Arrangement Example 2 is used.

(a) and (b) of FIG. 21 shows an example of a direction estimation result in the case where, for example, $D_H$=0.5$\lambda$ and $D_V$=0.5$\lambda$ in the MIMO antenna arrangement.

(a) of FIG. 21 shows an example in which outputs of the direction-of-arrival estimation evaluation function value in the range of ±90 degrees in the horizontal direction and in the range of ±90 degrees in the vertical direction in the case where a true value of one target is set at a horizontal angle of zero degrees and a vertical angle of zero degrees are plotted. (b) of FIG. 21 shows an example in which outputs of the direction-of-arrival estimation evaluation function value in the range of ±90 degrees in the horizontal direction and in the range of ±90 degrees in the vertical direction in the case where two target reflected waves with equal received powers are received (for example, target true values (horizontal, vertical) are (25°, 25°) and (−25°, −25°)).

A maximum peak is obtained at the target true value (here, horizontal zero degrees and vertical zero degrees) from the direction estimation result shown in (a) of FIG. 21, so it is confirmed that direction estimator 214 properly estimates a target direction. In (a) of FIG. 21, 3 dB beam width in the horizontal direction in the frontal direction is about 4.5 degrees, 3 dB beam width in the vertical direction is about 11 degrees, and horizontal angular resolution improves as compared to vertical angular resolution.

Peaks are obtained at the directions of the target true values (25°, 25°) and (−25°, −25°) from the direction estimation result shown in (b) of FIG. 21, so it is confirmed that direction estimator 214 properly estimates target directions. In (b) of FIG. 21, it is confirmed that peak levels (side lobe levels) in directions different from the true value directions are suppressed to about −10 dB.

An example of a direction estimation result (computer simulation result) according to Arrangement Example 2 has been described.

As described above, the MIMO array arrangement according to Arrangement Example 2 is an arrangement in which, in both transmission and reception antennas, the number of antennas arranged in the horizontal direction is greater than the number of antennas arranged in the vertical direction (for example, $Nt_H > Nt_V$, and $Nr_H > Nr_V$). With such an arrangement, in the virtual reception antenna arrangement, the number of antennas arranged in the horizontal direction is set so as to be greater than the number of antennas arranged in the vertical direction, and the horizontal aperture length is expanded as compared to the vertical aperture length. In proportion to the horizontal or vertical aperture length, angular resolution in each direction improves, so horizontal angular resolution is improved as compared to vertical angular resolution.

The MIMO array arrangement according to Arrangement Example 2, for example, more intensively expands the virtual antenna aperture in the horizontal direction than that in the vertical direction, so it is more suitable when a horizontal viewing angle is wider than a vertical viewing angle as in the case of the uses of in-vehicle radar. For example, in the uses of in-vehicle radar, when a horizontal viewing angle is wider than a vertical viewing angle, there is a high probability that multiple waves come at different horizontal viewing angles, so target detection performance is improved (for example, non-detection is reduced) with the antenna arrangement having higher horizontal resolution as in the case of Arrangement Example 2.

When, for example, the resolution of a horizontal viewing angle is greater than the resolution of a vertical viewing angle as in the case of the uses of in-vehicle radar, the vertical aperture length may be ensured an extent that estimation accuracy.

As the horizontal angular resolution increases, for example, it is possible to reduce the probability that multiple waves coming in the same horizontal direction are difficult to separate in the horizontal direction and non-detection of a target occurs due to a decrease in vertical resolution.

When, for example, the MIMO array arrangement according to Arrangement Example 2 is used, direction estimator 214 may estimate the direction of arrival in horizontal one dimension with the virtual reception antennas arranged in the horizontal direction (in other words, without using the virtual reception antennas arranged in the vertical direction) and apply vertical one dimension direction-of-arrival estimation process to the detected horizontal direction. In this case, since the number of virtual reception antennas arranged in the horizontal direction is large, the effect of reducing the computation of direction estimation process is obtained while the degradation of receiving quality (for example, signal to noise ratio (SNR)) at the time of one-dimensional direction-of-arrival estimation in the horizontal direction is suppressed.

(Variation 1 of Arrangement Example 2)

In the MIMO array arrangement (for example, FIG. 19) according to Arrangement Example 2, the case where the spacings of the antennas (Rx #5, Rx #6, Rx #7) arranged in the vertical direction in reception antennas 202 are set to the vertical base spacings $D_V$ has been described; however, the spacings of the antennas arranged in the vertical direction are not limited thereto.

Figure 22:
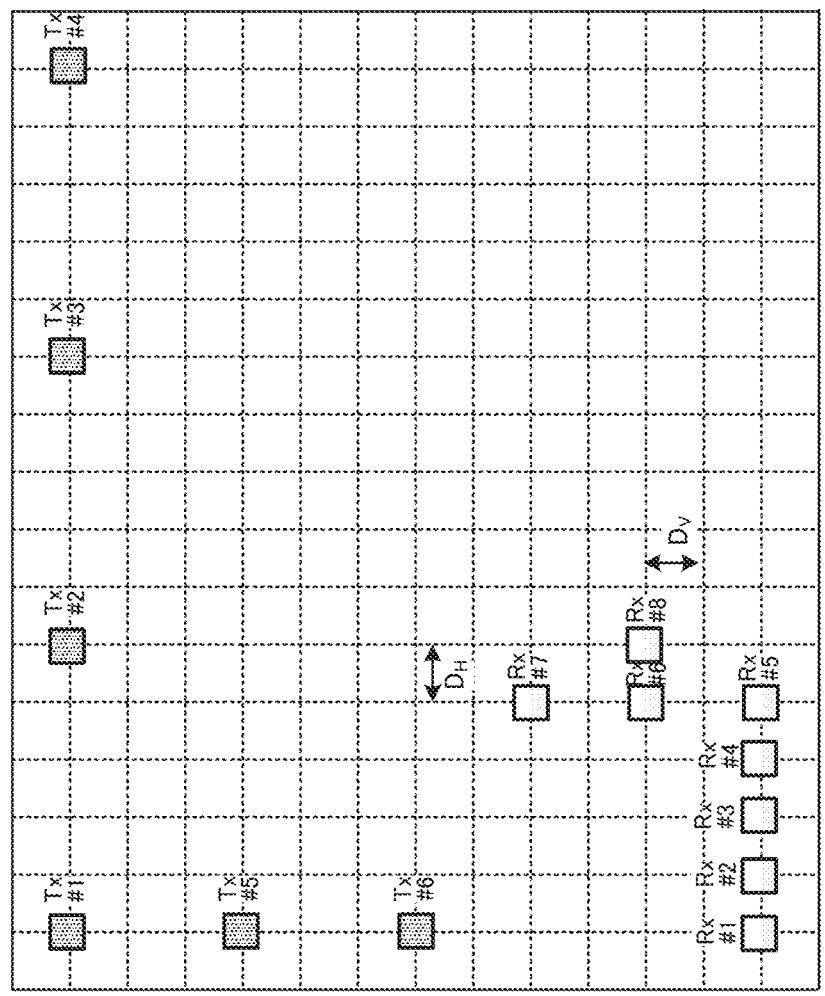
FIG. 22 is a diagram showing an example of an arrangement of transmission and reception antennas according to Arrangement Example 2.
Figure 23:
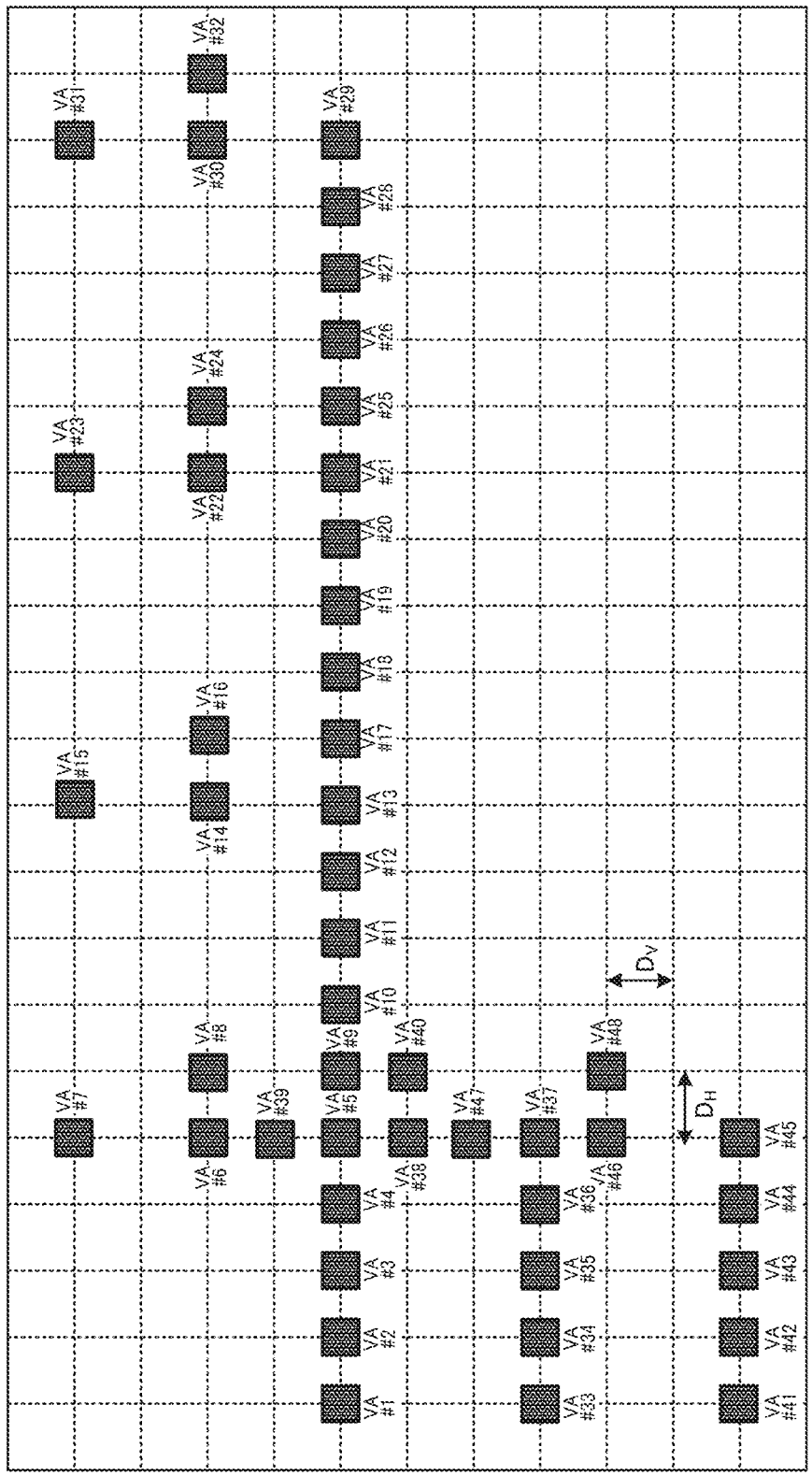
FIG. 23 is a diagram showing an example of an arrangement of a virtual reception array according to Arrangement Example 2.

FIG. 22 is a diagram showing an example of an arrangement of transmission antennas 106 (represented by, for example, Tx) and reception antennas 202 (represented by, for example, Rx) (for example, an example of a MIMO antenna arrangement) according to Variation 1 of Arrangement Example 2. In the example shown in FIG. 22, as in the case of FIG. 19, the number $N_{Tx}$ of transmission antennas is six (for example, Tx #1, Tx #2, . . . , and Tx #6), and the number Na of reception antennas is eight (for example, Rx #1, Rx #2, . . . , and Rx #8). FIG. 23 is a diagram showing an example of an arrangement of a virtual reception antenna obtained from the antenna arrangement shown in FIG. 22.

For example, as shown in FIG. 22, the arrangement may be such that the difference between the spacings $3D_V$ of the antennas (Tx #1, Tx #5, and Tx #6) arranged in the vertical direction in transmission antennas 106 and the spacings $2D_V$ of the antennas (Rx #5, Rx #6, and Rx #7) arranged in the vertical direction in reception antennas 202 is set to the vertical base spacings $D_V (=|3D_V-2D_V|)$. In this case, in the virtual reception antenna shown in FIG. 23, the spacings of the antennas (VA #5 to VA #7, VA #37 to VA #39, and VA #45 to VA #47) arranged in the vertical direction are unequal spacings but include the vertical base spacing $D_V$, so grating lobes in the vertical direction are suppressed. In the virtual reception antenna shown in FIG. 23, for example, as compared to FIG. 20, the antenna element size in the vertical direction can be increased, and the vertical aperture length expands, so vertical angular resolution is improved.

In the antenna arrangement of FIG. 22, the case where the spacings ($3D_V$) of transmission antennas (Tx #1, Tx #5, and Tx #6) arranged in the vertical direction and the spacings ($2D_V$) of reception antennas (Rx #5, Rx #6, and Rx #7) arranged in the vertical direction both are set to equal spacings has been described; however, the configuration is not limited thereto. The spacings may be set to unequal spacings. In this case, for example, the arrangement may include such an arrangement that the difference between at least one of the spacings of transmission antennas arranged in the vertical direction and the spacings of reception antennas arranged in the vertical direction is set to the vertical base spacing $D_V$.

In FIG. 22, the case where Condition 1 is applied has been described. Alternatively, Condition 1a, Condition 2, or Condition 2a may be applied. For example, in the arrangement to which Condition 1a is applied, the arrangement may be such that the difference between the spacings of transmission antennas arranged in the vertical direction and the spacings of reception antennas arranged in the vertical direction is set to the vertical base spacing $D_V$. Similarly, in the arrangement to which Condition 2 or Condition 2a is applied, for example, the arrangement may be such that the difference between the spacings of transmission antennas arranged in the horizontal direction and the spacings of reception antennas arranged in the horizontal direction is set to the horizontal base spacing $D_H$.

(Variation 2 of Arrangement Example 2)

In the MIMO array arrangement (for example, FIG. 19) according to Arrangement Example 2, the case where the spacings of the antennas (for example, Tx #1 to Tx #4) arranged in the horizontal direction in transmission antennas 106 are set to spacings (for example, in the case of FIG. 19, $5D_H$) that are obtained by adding $D_H$ to the aperture length of the antennas (for example, Rx #1 to Rx #5) arranged in the horizontal direction in reception antennas 202 has been described; however, the spacings of transmission antennas arranged in the horizontal direction are not limited thereto. The spacings may be further wider spacings.

In other words, as shown in FIG. 20, the case where, in the virtual reception antenna, antennas arranged in the horizontal direction are arranged at the equal horizontal base spacings $D_H$ has been described; however, the configuration is not limited thereto.

Figure 24:
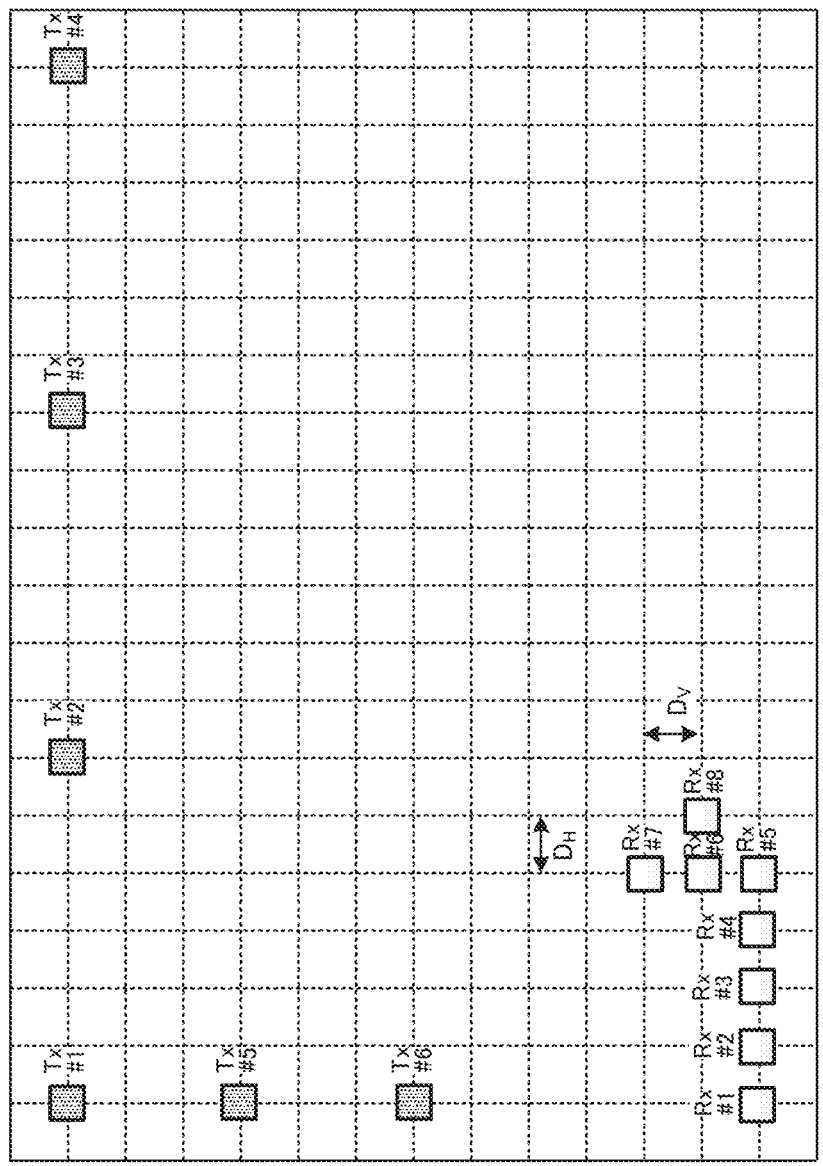
FIG. 24 is a diagram showing an example of an arrangement of transmission and reception antennas according to Arrangement Example 2.
Figure 25:
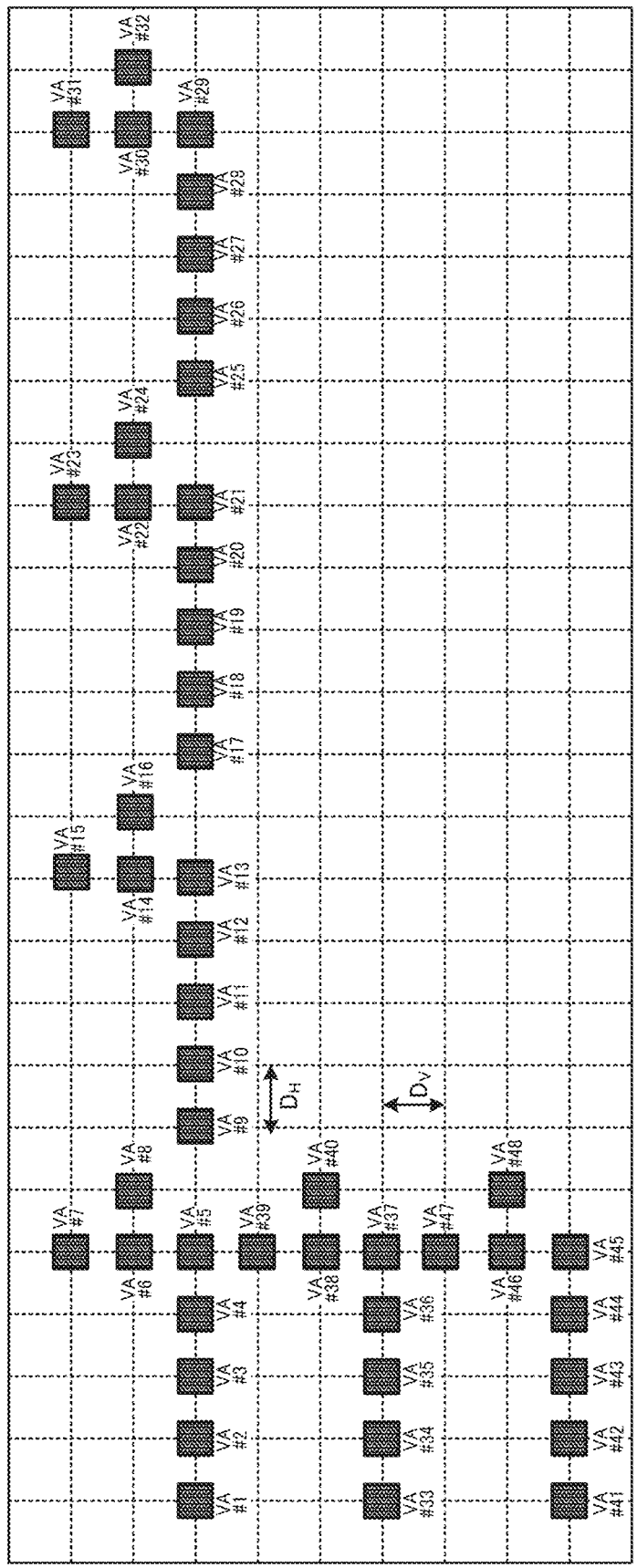
FIG. 25 is a diagram showing an example of an arrangement of a virtual reception array according to Arrangement Example 2.

FIG. 24 is a diagram showing an example of an arrangement of transmission antennas 106 (represented by, for example, Tx) and reception antennas 202 (represented by, for example, Rx) (for example, an example of a MIMO antenna arrangement) according to Variation 2 of Arrangement Example 2. In the example shown in FIG. 24, as in the case of FIG. 19, the number $N_{Tx}$ of transmission antennas is six (for example, Tx #1, Tx #2, . . . , and Tx #6), and the number Na of reception antennas is eight (for example, Rx #1, Rx #2, . . . , and Rx #8). FIG. 25 is a diagram showing an example of an arrangement of a virtual reception antenna obtained from the antenna arrangement shown in FIG. 24.

For example, as shown in FIG. 24, the spacings of the antennas (Tx #1 to Tx #4) arranged in the horizontal direction in transmission antennas 106 may be set to spacings ($6D_H$) obtained by adding $2D_H$ to the aperture length $4D_H$ of the antennas (Rx #1 to Rx #5) arranged in the horizontal direction in reception antennas 202. In this case, in the virtual reception antenna shown in FIG. 25, the antennas arranged in the horizontal direction (for example, VA #1 to VA #5, VA #9 to VA #13, VA #17 to VA #21, and VA #25 to VA #29) are arranged at unequal spacings; however, the horizontal aperture length of the virtual reception antenna expands, so horizontal resolution is further improved.

Figure 26:
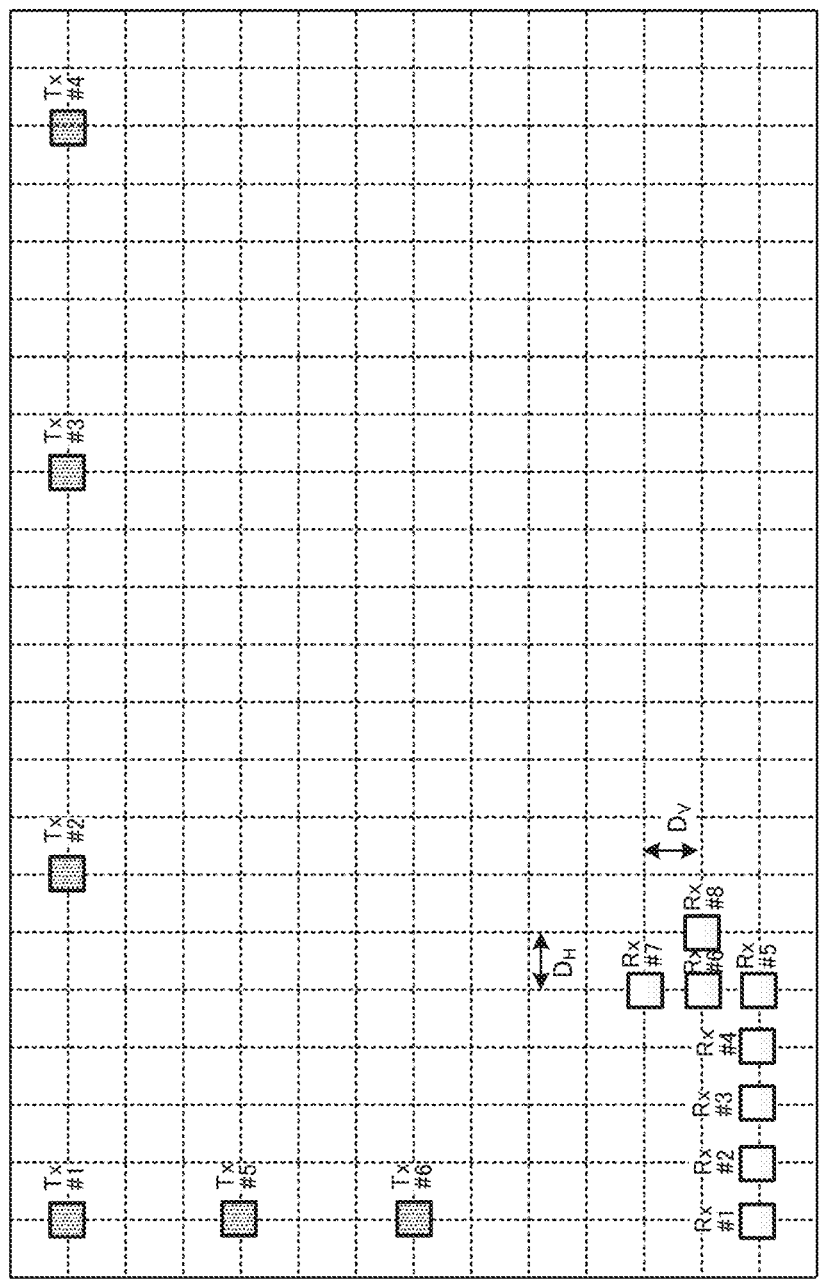
FIG. 26 is a diagram showing an example of an arrangement of transmission and reception antennas according to Arrangement Example 2.
Figure 27:
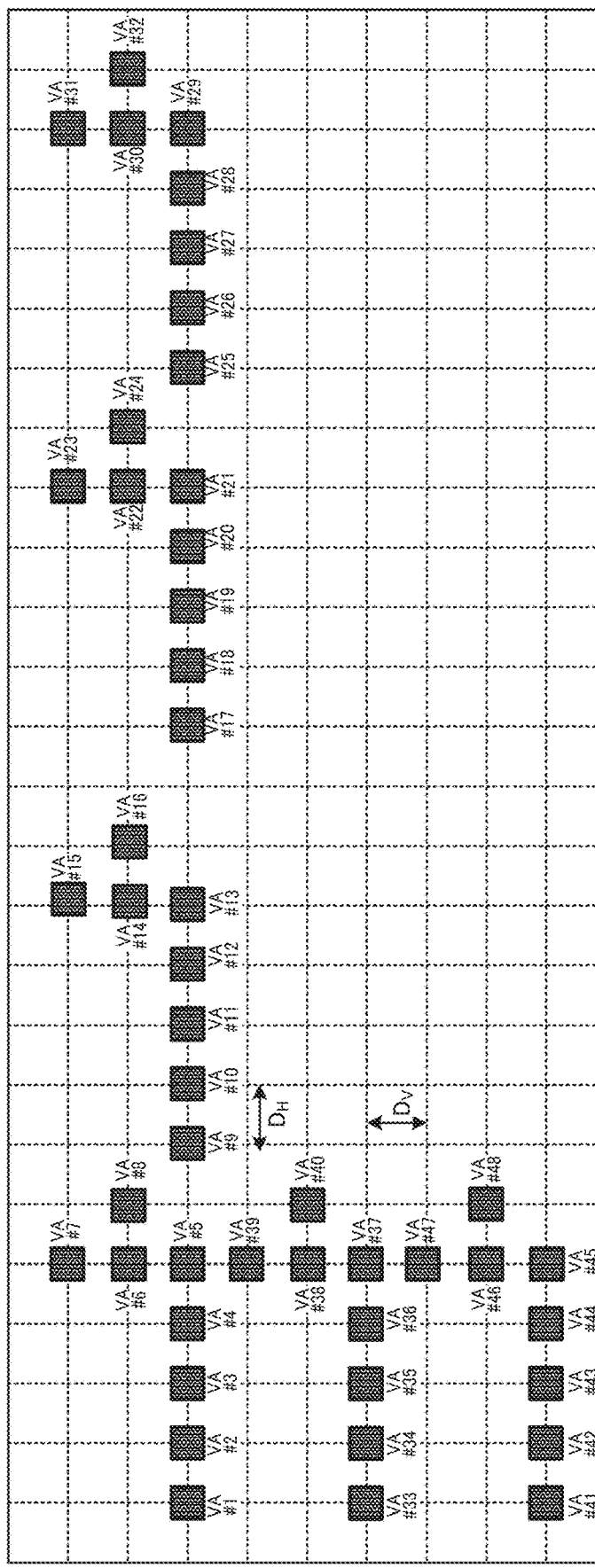
FIG. 27 is a diagram showing an example of an arrangement of a virtual reception array according to Arrangement Example 2.

FIG. 26 is a diagram showing another example of an arrangement of transmission antennas 106 (represented by, for example, Tx) and reception antennas 202 (represented by, for example, Rx) (for example, an example of a MIMO antenna arrangement) according to Variation 2 of Arrangement Example 2. In the example shown in FIG. 26, as in the case of FIG. 19, the number $N_{Tx}$ of transmission antennas is six (for example, Tx #1, Tx #2, . . . , and Tx #6), and the number Na of reception antennas is eight (for example, Rx #1, Rx #2, . . . , and Rx #8). FIG. 27 is a diagram showing an example of an arrangement of a virtual reception antenna obtained from the antenna arrangement shown in FIG. 26.

As shown in FIG. 26, the spacings of the antennas (Tx #1 to Tx #4) arranged in the horizontal direction in transmission antennas 106 may be set to spacings obtained by unevenly adding a spacing greater than $D_H$ to the aperture length $4D_H$ of the antennas (Rx #1 to Rx #5) arranged in the horizontal direction in reception antennas 202. In the example of FIG. 26, the spacing between Tx #1 and Tx #2 is set to $6D_H$, the spacing between Tx #2 and Tx #3 is set to $7D_H$, and the spacing between Tx #3 and Tx #4 is set to $6D_H$.

In this way, by nonuniformly setting the spacings of the transmission antennas arranged in the horizontal direction (Tx #1 to Tx #4) in FIG. 26, the antennas arranged in the horizontal direction (for example, VA #1 to VA #5, VA #9 to VA #13, VA #17 to VA #21, and VA #25 to VA #29) have further increased unevenness in the virtual reception antenna shown in FIG. 27. For this reason, side lobes at the time of direction-of-arrival estimation are further reduced. Since the horizontal aperture length of the virtual reception antenna further expands, horizontal resolution is further improved.

In FIGS. 24 and 26, the case where Condition 1 is applied has been described. Alternatively, Condition 1a, Condition 2, or Condition 2a may be applied. For example, in the arrangement to which Condition 1a is applied, the spacings of reception antennas arranged in the horizontal direction may be set to uneven spacings wider than a spacing obtained by adding the horizontal base spacing $D_H$ to the aperture length of transmission antennas arranged in the horizontal direction. Similarly, in the arrangement to which Condition 2 is applied, the spacings of transmission antennas arranged in the vertical direction may be set to uneven spacings wider than a spacing obtained by adding the vertical base spacing $D_V$ to the aperture length of reception antennas arranged in the vertical direction. Similarly, in the arrangement to which Condition 2a is applied, the spacings of reception antennas arranged in the vertical direction may be set to uneven spacings wider than a spacing obtained by adding the vertical base spacing $D_V$ to the aperture length of transmission antennas arranged in the vertical direction.

Variation 2 of Arrangement Example 2 has been described.

One embodiment of the present disclosure has been described above.

Arrangements in which the following modifications are further applied to the arrangement that satisfies Condition 1 described above may be applied (hereinafter, referred to as modified arrangements of Condition 1).

(Modified Arrangement of Condition 1)

For example, in Condition 1, of (Na−Nz) reception antennas 202, a plurality of antennas arranged at different positions in the vertical direction (which correspond to, for example, second antennas) is not limited to antennas arranged in a straight line in the vertical direction.

For example, of reception antennas 202 arranged so as to satisfy Condition 1, a separation performance improving antenna and an antenna adjacent at the horizontal base spacing $D_H$ to the separation performance improving antenna may be arranged at a horizontal position different from the horizontal position of the other reception antennas. In other words, a separation performance improving antenna and, of a plurality of reception antennas arranged in the vertical direction, an antenna at the same position as the separation performance improving antenna in the vertical direction may be arranged at horizontal positions different from the horizontal position of the other reception antennas arranged in the vertical direction.

For example, a separation performance improving antenna and a reception antenna adjacent at the base spacing $D_H$ in the horizontal direction to the separation performance improving antenna may be arranged so as to be shifted in the horizontal direction at an integer multiple of the horizontal base spacing $D_H$ from the arrangement that satisfies Condition 1.

Figure 28:
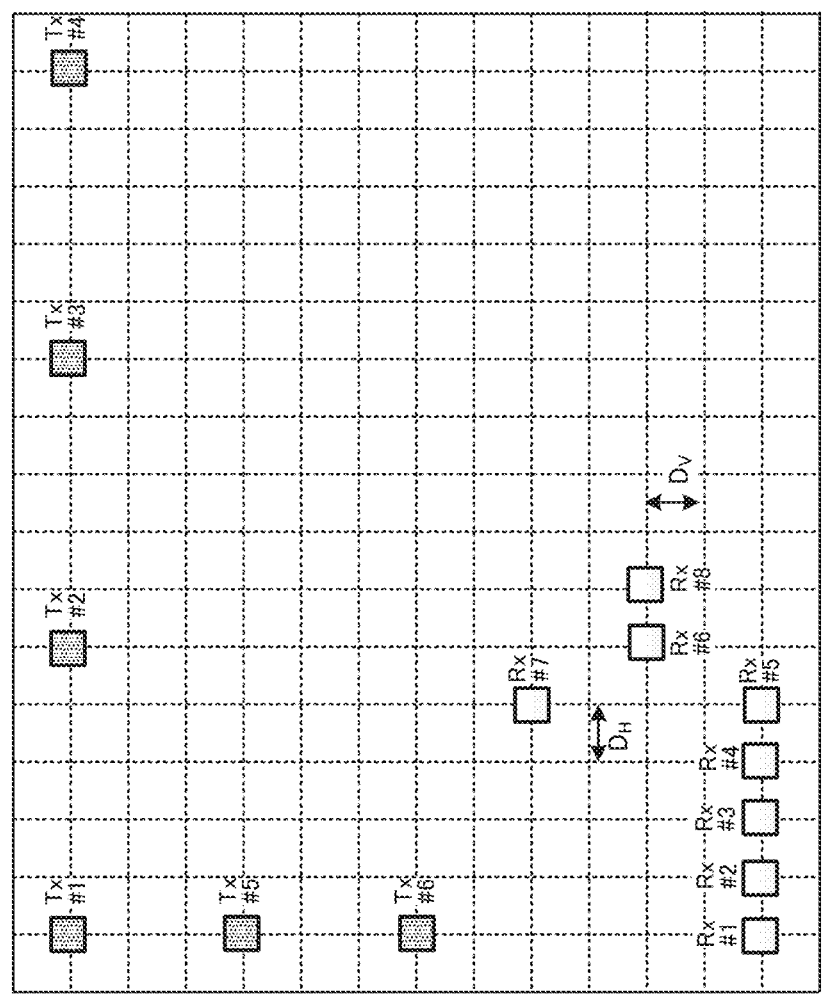
FIG. 28 is a diagram showing an example of an arrangement of transmission and reception antennas according to Arrangement Example 2.

FIG. 28 is a diagram showing an example of a modified arrangement of Condition 1 to the antenna arrangement that satisfies Condition 1, shown in FIG. 22. FIG. 29 is a diagram showing an example of an arrangement of a virtual reception antenna obtained from the antenna arrangement shown in FIG. 22.

As shown in FIG. 28, separation performance improving antenna Rx #8 and antenna Rx #6 adjacent at the horizontal base spacing $D_H$ to separation performance improving antenna Rx #8 are arranged at horizontal positions different from the horizontal position of the other reception antennas (Rx #1 to Rx #5, and Rx #7). In other words, in FIG. 28, the horizontal positions of Rx #6 and Rx #8 may be set so as to be shifted in the horizontal direction (to the right-hand side in FIG. 28) by the base spacing $D_H$ from the arrangement shown in FIG. 22.

With the modified arrangement of Condition 1, for example, an antenna arrangement with a greater size in the vertical direction is possible. For example, a sub-array in which a plurality of planar patch antennas is arranged in multiple rows in the vertical direction may be applied as an antenna element. When an antenna having a sub-array configuration is used, the directivity gain of the antenna in the vertical direction is improved, and the distance detection performance of radar apparatus 10 is improved.

When, for example, the horizontal positions of a separation performance improving antenna and a reception antenna adjacent at the base spacing $D_H$ in the horizontal direction to the separation performance improving antenna are changed, horizontal separation performance is not influenced, so such a modified arrangement is suitable.

The modified arrangement of Condition 1 has been described.

Similarly, an arrangement in which the following modifications are further applied to the arrangement that satisfies Condition 1a described above may be applied (hereinafter, referred to as modified arrangement of Condition 1a).

(Modified Arrangement of Condition 1a)

For example, of transmission antennas 106 arranged so as to satisfy Condition 1a, a separation performance improving antenna and an antenna adjacent at the horizontal base spacing $D_H$ to the separation performance improving antenna may be arranged at horizontal positions different from the horizontal positions of the other transmission antennas.

For example, a separation performance improving antenna and a transmission antenna adjacent at the base spacing $D_H$ in the horizontal direction to the separation performance improving antenna may be arranged so as to be shifted in the horizontal direction at an integer multiple of the horizontal base spacing $D_H$ from the arrangement that satisfies Condition 1a.

With the modified arrangement of Condition 1a, for example, an antenna arrangement with a greater size in the vertical direction is possible. For example, a sub-array in which a plurality of planar patch antennas is arranged in multiple rows in the vertical direction may be applied as an antenna element. When an antenna having a sub-array configuration is used, the directivity gain of the antenna in the vertical direction is improved, and the distance detection performance of radar apparatus 10 is improved.

When, for example, the horizontal positions of a separation performance improving antenna and a transmission antenna adjacent at the base spacing $D_H$ in the horizontal direction to the separation performance improving antenna are changed, horizontal separation performance is not influenced, so such a modified arrangement is suitable.

The modified arrangement of Condition 1a has been described.

As in the case of the modified arrangement of Condition 1 and the modified arrangement of Condition 1a, modified arrangements are also applied to Condition 2 and Condition 2a.

In the MIMO array arrangement according to one general example of the present disclosure, an arrangement in which the horizontal direction and the vertical direction are interchanged may be used, and a virtual reception array arrangement in which the horizontal direction and the vertical direction are interchanged is obtained. With this configuration, angular separation performance in which the horizontal direction and the vertical direction are interchanged is obtained.

In the above-described embodiment, the case where radar apparatus 10, for example, performs determination as to Doppler aliasing on a received signal (for example, an output of Doppler analyzer 210 for each code element of a code multiplexed signal) by using unused orthogonal codes for code multiplex transmission has been described. Through the determination as to Doppler aliasing, for example, radar apparatus 10 is able to determine aliasing in a Doppler range that is as wide as the product of the code length of the orthogonal code sequence and a Doppler analysis range in Doppler analyzer 210. Thus, according to the present embodiment, radar apparatus 10 is able to expand a Doppler range detectable without ambiguity to a Doppler range equivalent to that during one antenna transmission.

Radar apparatus 10 is, for example, able to suppress mutual interference between code multiplexed signals to about a noise level by performing Doppler phase correction including aliasing at the time of code separation based on a determined result of Doppler aliasing, so the deterioration of radar detection performance is suppressed, and code multiplex transmission of a MIMO radar is enabled.

Instead of the above-described code multiplexing method, another multiplexing method may be applied to radar apparatus 10. Radar apparatus 10 may omit to determine Doppler aliasing as described above. For example, code generator 104 may equalize the number $N_{CM}$ of multiplexed codes to the number $N_{allcode}$ of orthogonal codes out of $N_{allcode}$ orthogonal codes included in a code sequence with the code length Loc. Phase rotator 105 may perform code multiplexing by using all the $N_{allcode}$ orthogonal codes included in a code sequence with the code length Loc. In this case, aliasing determiner 212 of radar apparatus 10 is not applied, so the Doppler frequency range is ±1/(2Loc×Tr).

The number of MIMO antennas (for example, the number of transmission antennas and the number of reception antennas) is not limited to the numbers of antennas shown in the examples of the above-described antenna arrangements. For example, a MIMO antenna may have an antenna arrangement in at least one of the above-described antenna arrangement examples. A MIMO antenna may, for example, have an antenna arrangement that satisfies at least one of the above-described Condition 1, Condition 1a, Condition 2, and Condition 2a. In other words, radar apparatus 10 may include, for example, antennas (not shown) in addition to the antennas shown in the illustrated antenna arrangement examples.

In a radar apparatus according to one general example of the present disclosure, a radar transmitter and a radar receiver may be individually arranged at physically remote locations. In a radar receiver according to one general example of the present disclosure, a direction estimator and other components may be individually arranged at physically remote locations.

The radar apparatus according to an exemplary embodiment of the present disclosure includes, for example, a central processing unit (CPU), a storage medium such as a read only memory (ROM) that stores a control program, and a work memory such as a random access memory (RAM), which are not illustrated. In this case, the functions of the sections described above are implemented by the CPU executing the control program. However, the hardware configuration of the radar apparatus is not limited to that in this example. For example, the functional sections of the radar apparatus may be implemented as an integrated circuit (IC). Each functional section may be formed as an individual chip, or some or all of them may be formed into a single chip.

Various embodiments have been described with reference to the drawings hereinabove. Obviously, the present disclosure is not limited to these examples. Obviously, a person skilled in the art would arrive variations and modification examples within a scope described in claims, and it is understood that these variations and modifications are within the technical scope of the present disclosure. Each constituent element of the above-mentioned embodiments may be combined optionally without departing from the spirit of the disclosure.

The expression "section" used in the above-described embodiments may be replaced with another expression such as "circuit (circuitry)," "device," "unit," or "module."

The above embodiments have been described with an example of a configuration using hardware, but the present disclosure can be realized by software in cooperation with hardware.

Each functional block used in the description of each embodiment described above is typically realized by an LSI, which is an integrated circuit. The integrated circuit controls each functional block used in the description of the above embodiments and may include an input terminal and an output terminal. The LSI may be individually formed as chips, or one chip may be formed so as to include a part or all of the functional blocks. The LSI herein may be referred to as an IC, a system LSI, a super LSI, or an ultra LSI depending on a difference in the degree of integration.

However, the technique of implementing an integrated circuit is not limited to the LSI and may be realized by using a dedicated circuit, a general-purpose processor, or a special-purpose processor. In addition, a Field Programmable Gate Array (FPGA) that can be programmed after the manufacture of the LSI or a reconfigurable processor in which the connections and the settings of circuit cells disposed inside the LSI can be reconfigured may be used.

If future integrated circuit technology replaces LSIs as a result of the advancement of semiconductor technology or other derivative technology, the functional blocks could be integrated using the future integrated circuit technology. Biotechnology can also be applied.

SUMMARY OF THE DISCLOSURE

A radar apparatus according to one example of the present disclosure includes: transmission circuitry, which, in operation, transmits a transmission signal by using a plurality of transmission antennas; and reception circuitry, which, in operation, receives a reflected wave signal that is the transmission signal reflected from an object by using a plurality of reception antennas, in which either one of the plurality of transmission antennas or the plurality of reception antennas includes a plurality of first antennas arranged at different positions in a first direction, a plurality of second antennas arranged at different positions in a second direction perpendicular to the first direction, and a third antenna different from the first antenna or the second antenna, the first antennas and the second antennas include one overlapping antenna, the third antenna is arranged at a position different in the second direction from a position at which the plurality of first antennas is arranged and is arranged at a position that is a prescribed spacing apart in the first direction from a position at which the plurality of second antennas is arranged, at least one spacing of the plurality of first antennas is the prescribed spacing, the other one of the plurality of transmission antennas or the plurality of reception antennas includes a plurality of fourth antennas arranged in the first direction, and a plurality of fifth antennas arranged in the second direction, the plurality of fourth antennas and the plurality of fifth antennas include one overlapping antenna, and a spacing of the plurality of fourth antennas in the first direction is wider than an aperture length of the plurality of first antennas.

In the radar apparatus according to one example of the present disclosure, an aperture length of a virtual reception antenna made up of the plurality of transmission antennas and the plurality of reception antennas is wider in the first direction than in the second direction.

In the radar apparatus according to one example of the present disclosure, the third antenna is arranged in the first direction on a side where a larger number of the first antennas are arranged with respect to the position at which the plurality of second antennas is arranged.

In the radar apparatus according to one example of the present disclosure, the third antenna is arranged in the first direction on a side where a smaller number of the first antennas are arranged with respect to the position at which the plurality of second antennas is arranged.

In the radar apparatus according to one example of the present disclosure, the number of antennas in the first direction is greater than the number of antennas in the second direction in the plurality of transmission antennas and in the plurality of reception antennas.

In the radar apparatus according to one example of the present disclosure, in at least one of the first direction and the second direction, a difference between a spacing of the plurality of transmission antennas and a spacing of the plurality of reception antennas is a value of the prescribed spacing.

In the radar apparatus according to one example of the present disclosure, in at least one of the first direction and the second direction, an antenna spacing of either one of the plurality of transmission antennas or the plurality of reception antennas is longer than an antenna aperture length of the other one of the plurality of transmission antennas or the plurality of reception antennas.

In the radar apparatus according to one example of the present disclosure, the first direction is a horizontal direction.

In the radar apparatus according to one example of the present disclosure, the third antenna and at least one of the plurality of second antennas, arranged at the same position in the second direction as the third antenna, are arranged at positions different in the first direction from a position of another one of the plurality of second antennas.

In the radar apparatus according to one example of the present disclosure, antenna spacings in the first direction of at least either one or both of the plurality of transmission antennas and/or the plurality of reception antennas are unequal spacings.

In the radar apparatus according to one example of the present disclosure, the plurality of transmission antennas and the plurality of reception antennas are arranged in an L shape, a T shape, or a cross shape.

In the radar apparatus according to one example of the present disclosure, a value of the prescribed spacing is any value within a range of 0.45 times to 0.8 times as long as a wavelength.

While various embodiments have been described herein above, it is to be appreciated that various changes in form and detail may be made without departing from the sprit and scope of the invention(s) presently or hereafter claimed.

This application is entitled and claims the benefit of Japanese Patent Application No. 2020-174017, filed on Oct. 15, 2020, the disclosure of which including the specification, drawings and abstract is incorporated herein by reference in its entirety.

INDUSTRIAL APPLICABILITY

The present disclosure is suitable as a radar apparatus that detects a wide-angle range.

REFERENCE SIGNS LIST

10 Radar apparatus
100 Radar transmitter
101 Radar transmission signal generator
102 Modulated signal emitter
103 VCO
104 Code generator
105 Phase rotator
106-1 First transmission antenna
106-2 Second transmission antenna
200 Radar receiver 201 Antenna channel processor
202 Reception antenna
203 Receiving radio
204 Mixer
205 LPF
206 Signal processor
207 AD converter
208 Beat frequency analyzer
209 Output switch
210 Doppler analyzer
211 CFAR section
212 Aliasing determiner
213 Multiplexed code demultiplexer
214 Direction estimator
215 Phase Corrector
300 Positioning output

The invention claimed is:

1. A radar apparatus comprising:
transmission circuitry, which, in operation, transmits a transmission signal by using a plurality of transmission antennas; and
reception circuitry, which, in operation, receives a reflected wave signal that is the transmission signal reflected from an object by using a plurality of reception antennas, wherein
either one of the plurality of transmission antennas or the plurality of reception antennas includes a plurality of first antennas arranged at different positions in a first direction, a plurality of second antennas arranged at different positions in a second direction perpendicular to the first direction, the plurality of first antennas arranged at the same position in the second direction and the plurality of second antennas arranged at the same position in the first direction, and a third antenna different from any of the plurality of first antennas and the plurality of second antennas,
one of the plurality of first antennas constitutes one of the plurality of second antennas,
the third antenna is arranged at a first spacing in the first direction from the position of the plurality of second antennas, and is arranged at a second spacing in the second direction from the position of the plurality of first antennas,
a first aperture length of the plurality of first antennas in the first direction is greater than the first spacing, or a second aperture length of the plurality of second antennas in the second direction is greater than the second spacing,
the first spacing is an integer multiple of at least one spacing of the plurality of first antennas, and the second spacing is an integer multiple of at least one spacing of the plurality of second antennas,
the other one of the plurality of transmission antennas or the plurality of reception antennas includes a plurality of fourth antennas arranged in the first direction, and a plurality of fifth antennas arranged in the second direction, the plurality of fourth antennas arranged at the same position in the second direction and the plurality of fifth antennas arranged at the same position in the first direction, and
one of the plurality of fourth antennas constitutes one of the plurality of fifth antennas.

2. The radar apparatus according to claim 1, wherein
an aperture length of a virtual reception antenna made up of the plurality of transmission antennas and the plurality of reception antennas is wider in the first direction than in the second direction.

3. The radar apparatus according to claim 1, wherein
the third antenna is arranged in the first direction on a side where a larger number of the plurality of first antennas are arranged with respect to the position at which the plurality of second antennas is arranged.

4. The radar apparatus according to claim 1, wherein
the third antenna is arranged in the first direction on a side where a smaller number of the plurality of first antennas are arranged with respect to the position at which the plurality of second antennas is arranged.

5. The radar apparatus according to claim 1, wherein
the number of antennas in the first direction is greater than the number of antennas in the second direction in the plurality of transmission antennas and in the plurality of reception antennas.

6. The radar apparatus according to claim 5, wherein
in at least one of the first direction and the second direction, a difference between a spacing of the plurality of transmission antennas and a spacing of the plurality of reception antennas is an integer multiple-value of the first spacing or the second spacing.

7. The radar apparatus according to claim 5, wherein
in at least one of the first direction and the second direction, an antenna spacing of either one of the plurality of transmission antennas or the plurality of reception antennas is longer than an antenna aperture length of the other one of the plurality of transmission antennas or the plurality of reception antennas.

8. The radar apparatus according to claim 5, wherein
the first direction is a horizontal direction.

9. The radar apparatus according to claim 1, wherein
a spacing of the plurality of fourth antennas in the first direction is wider than the first aperture length of the plurality of first antennas.

10. The radar apparatus according to claim 1, wherein
antenna spacings in the first direction of at least either one or both of the plurality of transmission antennas and/or the plurality of reception antennas are unequal spacings.

11. The radar apparatus according to claim 1, wherein
the plurality of transmission antennas and the plurality of reception antennas are arranged in an L shape, a T shape, or a cross shape.

12. The radar apparatus according to claim 1, wherein
a value of the first spacing or the second spacing is any value within a range of 0.45 times to 0.8 times as long as a wavelength.

13. The radar apparatus according to claim 1, wherein
the first aperture length of the plurality of first antennas in the first direction is greater than the first spacing, and the second aperture length of the plurality of second antennas in the second direction is greater than the second spacing.

14. The radar apparatus of claim 1, wherein
a plurality of the third antennas are provided, and
all of the plurality of third antennas are arranged at the first spacing from the plurality of second antennas in the first direction, or are arranged at the second spacing from the plurality of first antennas in the second direction.

15. The radar apparatus according to claim 14, wherein
all of the plurality of third antennas are arranged at the first spacing from the plurality of second antennas in the first direction, and are arranged at the second spacing from the plurality of first antennas in the second direction.

16. The radar apparatus according to claim 1, wherein the first spacing is equal to at least one spacing of the plurality of first antennas.

17. The radar apparatus according to claim 16, wherein the second spacing is equal to at least one spacing of the plurality of second antennas.

* * * * *